United States Patent [19]

Sawase

[11] Patent Number: 5,456,641
[45] Date of Patent: Oct. 10, 1995

[54] LEFT/RIGHT DRIVE TORQUE ADJUSTING APPARATUS FOR VEHICLE AND LEFT/RIGHT DRIVE TORQUE ADJUSTING METHOD FOR VEHICLE

[75] Inventor: Kaoru Sawase, Anjo, Japan

[73] Assignee: Mitsubishi Jidosha Kogyo Kabushiki Kaisha, Tokyo, Japan

[21] Appl. No.: 76,837

[22] Filed: Jun. 15, 1993

[30] Foreign Application Priority Data

| Jun. 15, 1992 | [JP] | Japan | 4-155424 |
| Jun. 15, 1992 | [JP] | Japan | 4-155425 |
| Jun. 15, 1992 | [JP] | Japan | 4-155426 |
| Feb. 10, 1993 | [JP] | Japan | 5-23028 |

[51] Int. Cl.$^6$ ............................................. F16H 48/04
[52] U.S. Cl. ................................................ 475/86; 180/197
[58] Field of Search ............................ 180/197; 475/86

[56] References Cited

U.S. PATENT DOCUMENTS

| 4,761,043 | 8/1988 | Wupper et al. | 303/100 |
| 4,805,721 | 2/1989 | Takahashi et al. | 180/248 |
| 4,874,059 | 10/1989 | Kasegawa | 180/249 |
| 4,953,654 | 9/1990 | Imaseki et al. | 180/197 |
| 4,973,296 | 11/1990 | Shibahata | 475/231 |
| 4,984,649 | 1/1991 | Leiber et al. | 180/197 |
| 5,056,614 | 10/1991 | Tokushima et al. | 180/248 |
| 5,168,953 | 12/1992 | Naito | 180/197 |

FOREIGN PATENT DOCUMENTS

| 4138074 | 5/1992 | Germany . |
| 2203396 | 10/1988 | United Kingdom . |
| 2216473 | 10/1989 | United Kingdom . |
| 2251317 | 7/1992 | United Kingdom . |

OTHER PUBLICATIONS

Copy of SAE Paper No. 905078, "Stability and Controllability Augmentation by Adaptive Control of Steering and Differential in Trucks and Buses" by Momiyama & Iwamoto of Hino Motors and M. Nagai of Tokyo University of Agriculture and Technology, pp. 595–602 (no date listed).

Primary Examiner—Dirk Wright

[57] ABSTRACT

Between an input shaft and each of left-wheel and right-wheel axles, a speed change mechanism and a multi-plate clutch mechanism are interposed so that a rotational speed of the axle is changed (for example, increased) by a speed change mechanism and is transmitted to a hollow axle. The multi-plate clutch mechanism is interposed between the hollow axle and a differential case. By coupling the multi-plate clutch mechanism, drive torque is fed from one of the differential case and the hollow axle, said one member rotating at a higher speed, to the other member rotating at a lower speed. When the ratio $\alpha$ of a rotational speed of the left wheel to that of the right wheel becomes greater than the predetermined value $\alpha_0$ and transfer of torque in a desired direction is no longer feasible. The multi-plate clutch mechanisms are hence made free. The multi-plate clutch mechanisms are controlled by a control unit.

42 Claims, 30 Drawing Sheets

1

LEFT/RIGHT DRIVE TORQUE ADJUSTING APPARATUS FOR VEHICLE AND LEFT/RIGHT DRIVE TORQUE ADJUSTING METHOD FOR VEHICLE

BACKGROUND OF THE INVENTION

1. Field of the Invention

This invention relates to a left/right drive torque adjusting apparatus for a vehicle and also to a left/right drive torque adjusting method for a vehicle. These apparatus and method are suitable for use in the distribution of drive torque to left and right drive wheels in a four wheel drive or two wheel drive automotive vehicle or in the distribution of drive torque by transfer of power between left and right non-drive wheel (i.e., wheels other than the drive wheels) in a two wheel drive automotive vehicle.

2. Description of the Related Art

Recent years have seen major developments in four wheel drive automotive vehicles (hereinafter called "4WD vehicles"), including a variety for full-time 4WD automotive vehicles where improvements include positive adjustment of the distribution of torque between front and rear wheels.

Taking in a broad sense a mechanism for distributing torque to left and right wheels in an automotive vehicle, on the other hand, it is considered to include conventional normal differentials as well as LSDs (limited slip differentials) including those of the electronic control type. They however do not positively adjust the distribution of torque, so that they cannot distribute torque between left and right wheels as desired.

With a view to permitting positive adjustment of the distribution of torque between left and right wheels, apparatuses have been proposed as shown in FIG. 28 and FIG. 29.

FIG. 28 is a cross-sectional view of a rear differential 122 with an electromagnetically-driven differential limiting mechanism, which is disclosed in SAE Paper No. 905078. As is illustrated there, an input shaft 401 is connected to a rear end of a drive shaft 120. A drive pinion gear 402 is supported for integral rotation with the input shaft 401. Further, the input shaft 401 is rotatably supported in a front part of a case 413 by way of a bearing 412.

A crown gear 403 is rotatable in mesh with the drive pinion gear 402, and a power-transmitting, ring-shaped member 404 and a first housing 405 are integrally connected to the crown gear 403 by bolts 431.

A rear differential 122 is a planetary gear differential making use of a planetary gear mechanism and is constructed on and in the power-transmitting, ring-shaped member 404. The rear differential comprises a ring gear 407 formed on an inner peripheral wall of the ring-shaped member 404, a sun gear 408 connected with a left-wheel axle through splines, a carrier 409 connected with a right-wheel axle through splines, and planetary gears 411a, 411b mounted on the carrier 409 via shafts 410a, 410b, respectively.

Rotational torque inputted through the input shaft 401 is transmitted through the drive pinion gear 402 and the crown gear 403 and then from the ring gear 407 of the ring-shaped member 404 to the right-wheel axle via the planetary gears 411a, 411b and the carrier 409. At the same time, it is also transmitted to the left-wheel axle via the planetary gears 411a, 411b and the sun gear 408.

A second housing 406 is disposed on a right side of the carrier 409. This second housing 406 is supported by a ring-shaped support member 418 via a bearing 428.

The rear differential 122 is provided with a differential limiting device 123, which is constructed of a multi-plate clutch 414 as a differential limiting mechanism, drive means 417 for driving the multi-plate clutch, and rear differential control unit 48A of a controller for controlling the drive means 417 via a power amplifier 48C.

The multi-plate clutch 414 is therefore disposed inside the ring-shaped member 404. A holder portion 415a which supports one group of clutch disks 414a thereon is connected to the carrier 409 via the shafts 410a, 410b so that the clutch disks 414a can rotate integrally with the carrier 409. The holder portion 415b which supports the other group of clutch disks 414b thereon is formed on a hollow axle 416 on which the sun gear 408 is mounted, whereby the clutch disk 414b is rotatable integrally with the sun gear 408.

The drive means 417 is constructed of a force direction change-over mechanism 429 interposed between the carrier 409 and the second housing 406 and an electromagnetic clutch system 430 for driving the force direction change-over mechanism 429.

The electromagnetic clutch system 430 in turn comprises a clutch 427 interposed between a ring-shaped member 423 and a member 426 located on a side of the second housing 406, a magnet 419, and a solenoid (EMCD coil) 420 as the control means for the differential limiting mechanism.

Based on detection information from individual sensors (wheel speed sensor, steering angle sensor, side acceleration sensor, longitudinal acceleration sensor, throttle position sensor, engine rpm sensor, shift position sensor, etc.), the rear differential control unit 48A sets target clutch torque for the multi-plate clutch 414 and then controls a current to be fed to the electromagnetic clutch system 430 of the drive means 417 so that the target clutch torque can be obtained.

FIG. 29, on the other hand, is a cross-sectional view illustrating a rear differential 522 disclosed in Japanese Patent Application Laid-Open No. HEI 4-232127, which is equipped with another differential limiting mechanism. In FIG. 29, reference numerals similar to those employed in FIG. 28 identify substantially like parts. A differential limiting mechanism 523 of the rear differential 522 is constructed of a multi-plate clutch 414, drive means 517 for driving the multi-plate clutch 414, and a rear differential control unit 48A of a controller for controlling the drive device 517. The rear differential 522 is of the bevel gear type and is constructed of an input pinion 522A and left and right, driven bevel gears 522B, 522C.

The drive means 517 uses pneumatic pressure. A pneumatic circuit 417A to which a pump 417B is connected is controlled by the rear differential control unit 48A, whereby an air piston 417D is driven via an air feed line 417C to regulate the engagement pressure for the multi-plate clutch 414.

Based on detection information from individual sensors 48B, the rear differential control unit 48A sets target clutch torque for the multi-plate clutch 414 and then controls the pneumatic pressure circuit 417A of the drive means 517 so that the target clutch torque can be obtained.

In parallel with torque distribution adjusting apparatuses between front and rear wheels, development of an apparatus capable of controlling the distribution of torque between left and right wheels is also desired. In this case, the adjustment is directed not only to the distribution of torque between left and right drive wheels in a 4WD vehicle but also to the distribution of torque between left and right drive wheels in a 2WD vehicle.

If the distribution of torque is taken in such broad sense that it covers not only the distribution of torque outputted from an engine but also the transmission of torque which takes place through transfer of drive torque between left and right axles, it can be contemplated to adjust the distribution of torque between left and right non-drive wheels (as opposed to drive wheels) in a 2WD vehicle.

Neither the left non-drive wheel nor the right non-drive wheel receives drive torque from the engine. If it is however possible to realize transfer of drive torque from one of these non-drive wheels to the other, brake force can be developed on the side of the former non-drive wheel and drive torque can be produced on the side of the latter non-drive wheel. Accordingly, it becomes possible to adjust the distribution of torque (including negative drive torque, namely, brake force) between the left and right non-drive wheels.

Further, desired as such a left/right drive torque distribution adjusting apparatus for a vehicle is one that can perform the distribution of torque without inducing any large torque loss or energy loss. Such a drive torque distribution adjusting apparatus is also desired to permit a dimensional reduction.

As a drive torque transmission control apparatus capable of adjusting drive torques for the left-wheel and right-wheel axles by transferring drive torque between the left-wheel and right-wheel axles, it seems to be feasible to employ such a construction that a rotational speed on a side of one of the left-wheel and right-wheel axles is increased or decreased and outputted at a predetermined shift ratio and an output means for the drive torque so increased or decreased and a side of the other axle are coupled together, for example, by a slippable coupling such as a slip clutch to transfer drive torque from the side rotating at a higher speed to the side rotating at a lower speed.

When a rotational speed on the side of one of the left-wheel and right-wheel axles is increased and outputted at a predetermined shift ratio, for example, the output means for the rotational speed so increased rotates at a higher speed than a rotational speed on the side of the other axle. Coupling of the output means with the other axle therefore makes it possible to transmit drive torque from the side of the output means, which is on the side rotating at the higher speed (i.e., the side of the one axle), to the side rotating the lower speed (i.e., the side of the other axle). Accordingly, arrangement of such torque transmission mechanisms on the left and right sides, respectively, permits transmission of drive torque from the side of the left wheel to the side of the right wheel and vice versa as desired.

When a rotational speed on the side of one of the left-wheel and right-wheel axles is decreased and outputted at a predetermined shift ratio, on the other hand, the output means for the rotational speed so decreased rotates at a lower speed than the side of the other axle during normal running where the difference in rotational speed between the left wheel and the right wheel is small. Coupling of the output means with the other axle therefore results in transmission of drive torque from the side rotating at the higher speed (i.e., the side of other axle) to the side rotating at the lower speed, that is, the side of the output means (i.e., the side of the one axle). Here again, arrangement of such torque transmission mechanisms on the left and right sides, respectively, permits transmission of drive torque from the side of the left wheel to the side of the right wheel and vice versa as desired.

Upon turning of a vehicle, however, a difference in rotational speed inevitably occurs between each inner wheel and its corresponding outer wheel so that the rotational speed becomes higher on the side of the outer wheel. If the ratio of a rotational speed of the inner wheel to that of the outer wheel is great during turning, output of the rotational speed on the side of the inner-wheel axle, for example, at an upshift ratio therefore does not necessarily make output means for the thus-increased rotational speed rotate at a higher speed than the outer-wheel axle. Accordingly, each of the left and right torque transmission mechanisms can perform transmission of drive torque from the side of the outer wheel to the side of the inner wheel but, occasionally, may not perform transmission of drive torque from the side of the inner wheel to the side of the outer wheel.

A discussion will now be made of a situation where a vehicle makes a turn (a right turn in this instance) about a center C as shown in FIG. 30. Representing the distance (tread) between a left wheel W1 and a right wheel Wr of the vehicle by Lt, the turning radius by R, the speed of the turning outer wheel by Vo, the speed of the turning inner wheel by Vi, the wheel base by L, the actual steering angle by δ, and the stability factor by A, the wheel speed difference ΔVhr due to the difference in radius between the track of the turning inner wheel and that of the turning outer wheel can be derived as will be described next, provided that a vehicle body slip angle β is sufficiently small. From cos β≈1, sin β≈βy, $$\Delta Vhr = Vo - Vi = (Lt/R) \cdot V$$

where $$R = (1 + A \cdot V^2) L/\delta$$

Accordingly, a difference in rotational speed occurs between the left wheel and the right wheel.

Describing further on the basis of a specific example, FIG. 31 is a velocity diagram of various parts during turning of a vehicle in which the above-described vehicular left/right drive torque adjusting apparatus is arranged at a portion where a driving input Ti inputted to a case (differential case) DC of a differential from an engine is distributed to a side of a left-wheel axle S1l and a side of a right-wheel axle S1r via the differential.

On the side of the left-wheel axle S1l, the driving input Ti is increased at a predetermined shift ratio and the so-increased input is outputted to the side of a member (output means) S2l, and a coupling Tc2 is interposed between the member S2l and the differential case DC to adjust the state of coupling therebetween. On the side of the right-wheel axle S1r, on the other hand, the driving input Ti is increased at a predetermined shift ratio and the so-increased input is outputted to the side of a member (output means) S2r, and a coupling Tc1 is interposed between the member S2r and the differential case DC to adjust the state of coupling therebetween.

Assuming now that the vehicle is making a left turn, the left and right wheels then become the inner and outer wheels, respectively. Where the turning radius is small, there arises a situation under which, as is illustrated in FIG. 31, the rotational speed on the side of the left-wheel axle S1l and that on the side of the right-wheel axle S1r differ substantially from each other. Although the rotational speed of the output means S2l on the side of the left wheel is supposed to be higher than that of the differential case DC basically, that is, unless the difference in rotational speed between the left and right wheels is large, the above situation leads to the situation that the rotational speed of the output means S21 on the side of the left wheel conversely becomes lower than that of the differential case DC.

To improve the turning performance upon initiation of turning, for example, a moment can be produced in the turning direction on the vehicle by distributing more drive torque to the side of the right wheel as the outer wheel during the turning and hence imbalancing the drive torque between the left and right wheels. This is however not feasible under the above situation. To the contrary, the transfer (transmission) of the drive torque is effected in the direction opposite to the intended direction so that moment is produced in a direction opposite to the required turning direction. The above control therefore has the potential problem that the running performance is deteriorated conversely.

It may of course be possible to always permit transfer of torque in a desired direction by setting a shift ratio (the inverse of an upshift ratio or downshift ratio) at a sufficiently large value. Such a large upshift ratio however leads to greater torque transmission loss and energy loss, thus resulting in the development of such inconvenience that the gas mileage is deteriorated and the durability of elements of devices such as the multi-plate clutch is reduced due to production of heat in an increased quantity. Accordingly, it is not practical to set the shift ratio (the inverse of the upshift ratio or downshift ratio) at a sufficiently large value.

It is therefore desired to avoid transfer (transmission) of such drive torque in a direction opposite to the intended direction without development of accompanying inconvenience, for example, by ingeniously designing the control of operation of the coupling.

Upon turning of the vehicle, however, the left and right torque transmission mechanisms can each perform transmission of drive torque from the side of the outer wheel to the side of the inner wheel. It is therefore desired to adjust or control such drive torque.

In the above case, it is also desired to conduct the control of the drive torque while minimizing torque loss as much as possible.

In the control described above, the slip clutches and the like make use of the principle that torque is transmitted from a side of a higher speed to a side of a lower speed. At the same time, each slip clutch or the like also acts to decrease the velocity of slipping between members which are rotating relative to each other. Accordingly, the slip ratio of the tire of the wheel on the side to which more torque is desired to be distributed increases and, at the same time, the slip ratio of the tire of the wheel on the side to which less torque is desired to be distributed decreases. On the side of the slip ratio so increased, drive torque is increased. On the side of the slip ratio so decreased, drive torque is decreased.

To theoretically perform such control of torque distribution, a tire characteristic must be linear as a pre-requisite. The tire characteristic can be indicated by means of a tire characteristic diagram which diagrammatically illustrates a relationship ($\mu$–S characteristic) between the slip ratio S (%) and the road surface drive-limiting friction coefficient $\mu$, for example, as shown in FIG. 32.

The friction coefficient $\mu$ corresponds to reaction force of the road surface to the tire. Different slip ratios S are used depending on whether the tire is in a driven state or in a braked state. When the tire is in a driven state, the slip ratio S is defined as follows: $S=(V-VB)/V$. When the tire is in a braked state, on other hand, the slip ratio S is defined as follows: $S=(VB-V)/VB$.

As is depicted in FIG. 32, the friction coefficient $\mu$ linearly increases with the slip ratio S in a region where the slip ratio S is small (for example, a region in which the slip ratio is about 20% or smaller), so that the friction coefficient $\mu$ is in a linear region. In a region in which the slip ratio S is large (for example, a region in which the slip ratio is greater than about 20%), on the other hand, the friction coefficient $\mu$ decreases as the slip ratio S increases, so that the friction coefficient $\mu$ is in a non-linear region.

In the non-linear region, restraining force by the slip clutch or the like supersedes road-surface gripping force of the tire so that the slip clutch or the like is eventually locked up, leading to the problem that the above-described theoretical control of characteristic becomes no longer applicable.

SUMMARY OF THE INVENTION

A first object of the present invention is to permit efficient distribution of torque between a left wheel and a right wheel without developing substantial torque loss or energy loss, durability reduction of devices, etc. while avoiding any state of control unsuited to running.

A second object of the present invention is to perform adequate control of torque distribution between the left wheel and the right wheel under various road surface conditions.

In one aspect of the present invention, there is thus provided a left/right drive torque adjusting apparatus for a vehicle, said apparatus being arranged between a left-wheel axle and a right-wheel axle in the vehicle to permit transfer of drive torque between the left-wheel and right-wheel axles so that drive torques for left and right wheels of the vehicle can be adjusted, comprising:

a speed change mechanism connected to a side of at least one of the left-wheel and right-wheel axles, whereby a rotational speed of said one axle is shifted at a predetermined constant shift ratio;

a torque transmission mechanism of the variable transmitted capacity control type interposed between a side of at least the other one of the left-wheel and right-wheel axles and a side of output means of the speed change mechanism so that, when coupled, drive torque is transferred between the left-wheel and right-wheel axles;

means for detecting the state of running of the vehicle;

control means for controlling the state of operation of the torque transmission mechanism on the basis of detected information outputted from said running state detection means so that torque of a desired capacity can be transferred between the left-wheel and right-wheel axles;

rotational speed ratio judging means for judging whether or not a rotational speed ratio $\alpha$ of the left wheel to the right wheel obtained based on the state of running of the vehicle is greater than a threshold value Smax across which a predetermined high/low relationship between a rotational speed of said output means of the speed change mechanism and a rotational speed of the other axle changes; and large-difference-rotation-time control means arranged in association with said control means so that, when the rotational speed ratio $\alpha$ of the left wheel to the right wheel is judged greater than the threshold value Smax by said rotational speed ration judging means, said large-difference-rotation-time control means cancel transfer of torque by the torque transmission mechanism to discontinue the drive torque transmission control.

In another aspect of the present invention, there is also provided a left/right drive torque adjusting apparatus for a vehicle, said apparatus being arranged between a left-wheel axle and a right-wheel axle in the vehicle to permit transfer of drive torque between the left-wheel and right-wheel axles so that drive torques for left and right wheels of the vehicle can be adjusted, comprising:

input means for receiving drive torque from an engine;

a differential mechanism for transmitting the drive torque, which has been inputted through said input means, to the left-wheel and right-wheel axles while permitting differential motion between the left-wheel and right-wheel axles in the vehicle;

a speed change mechanism connected to a side of at least one of the left-wheel and right-wheel axles, whereby a rotational speed of said one axle is shifted at a predetermined constant shift ratio;

a torque transmission mechanism of the variable transmitted capacity control type interposed between a side of output means of the speed change mechanism and a side of said input means so that, when coupled, drive torque is transferred between the left-wheel and right-wheel axles;

means for detecting the state of running of the vehicle;

control means for controlling the state of operation of the torque transmission mechanism on the basis of detected information outputted from said running state detection means so that torque of a desired capacity can be transferred between the left-wheel and right-wheel axles;

rotational speed ratio judging means for judging whether or not a rotational speed ratio α of the left wheel to the right wheel obtained based on the state of running of the vehicle is greater than a threshold value Smax across which a predetermined high/low relationship between a rotational speed of said output means of the speed change mechanism and a rotational speed of the other axle changes; and large-difference-rotation-time control means arranged in association with said control means so that, when the rotational speed ratio α of the left wheel to the right wheel is judged greater than the threshold value Smax by said rotational speed ration judging means, said large-difference-rotation-time control means cancel transfer of torque by the torque transmission mechanism to discontinue the drive torque transmission control.

In a further aspect of the present invention, there is also provided a left/right drive torque adjusting apparatus for a vehicle, said apparatus being arranged between a left-wheel axle and a right-wheel axle in the vehicle to permit transfer of drive torque between the left-wheel and right-wheel axles so that drive torques for left and right wheels of the vehicle can be adjusted, comprising:

input means for receiving drive torque from an engine;

a differential mechanism for transmitting the drive torque, which has been inputted through said input means, to the left-wheel and right-wheel axles while permitting differential motion between the left-wheel and right-wheel axles in the vehicle;

a speed change mechanism connected to a side of said input means, whereby a rotational speed on the side of said input means is shifted at a predetermined constant shift ratio;

a torque transmission mechanism of the variable transmitted capacity control type interposed between a side of at least the other one of the left-wheel and right-wheel axles and a side of output means of the speed change mechanism so that, when coupled, drive torque is transferred between the left-wheel and right-wheel axles;

means for detecting the state of running of the vehicle;

control means for controlling the state of operation of the torque transmission mechanism on the basis of detected information outputted from said running state detection means so that torque of a desired capacity can be transferred between the left-wheel and right-wheel axles;

rotational speed ratio judging means for judging whether or not a rotational speed ratio α of the left wheel to the right wheel obtained based on the state of running of the vehicle is greater than a threshold value Smax across which a predetermined high/low relationship between a rotational speed of said output means of the speed change mechanism and a rotational speed of the other axle changes; and large-difference-rotation-time control means arranged in association with said control means so that, when the rotational speed ratio α of the left wheel to the right wheel is judged greater than the threshold value Smax by said rotational speed ration judging means, said large-difference-rotation-time control means cancel transfer of torque by the torque transmission mechanism to discontinue the drive torque transmission control.

In a still further aspect of the present invention, there is also provided a left/right drive torque adjusting apparatus for a vehicle, said apparatus being arranged between a left-wheel axle and a right-wheel axle in the vehicle to permit transfer of drive torque between the left-wheel and right-wheel axles so that drive torques for left and right wheels of the vehicle can be adjusted, comprising:

a combination of speed change mechanisms connected to the left-wheel and right-wheel axles, respectively, whereby rotational speeds on sides of the left-wheel and right-wheel axles are shifted at a predetermined constant shift ratio;

a combination of torque transmission mechanisms of the variable transmitted capacity control type interposed between the sides of the left-wheel and right-wheel axles and sides of output means of the speed change mechanisms, respectively, so that, when coupled, drive torque is transferred between the left-wheel and right-wheel axles;

means for detecting the state of running of the vehicle;

control means for controlling the state of operation of the torque transmission mechanism on the basis of detected information outputted from said running state detection means so that torque of a desired capacity can be transferred between the left-wheel and right-wheel axles;

wheel slip judging means for judging the state of slipping of the left and right wheels; and means for setting the amounts of control of the combined the torque transmission mechanisms so that, when one of the left and right wheels is judged slipping by said wheel slip judging means, one of the torque transmission mechanisms, said one torque transmission mechanism being the one opposite to the one which should be coupled if the direction of transfer of the torque of the desired capacity were based, is coupled.

In a still further aspect of the present invention, there is also provided a left/right drive torque adjusting apparatus for a vehicle, said apparatus being arranged between a left-wheel axle and a right-wheel axle in the vehicle to permit transfer of drive torque between the left-wheel and right-wheel axles so that drive torques for left and right wheels of the vehicle can be adjusted, comprising:

input means for receiving drive torque from an engine;

a differential mechanism for transmitting the drive torque, which has been inputted through said input means, to the left-wheel and right-wheel axles while permitting differential motion between the left-wheel and right-wheel axles in the vehicle;

a combination of speed change mechanisms connected to the left-wheel and right-wheel axles, respectively, whereby rotational speeds on sides of the left-wheel and right-wheel axles are shifted at a predetermined constant shift ratio;

a combination of torque transmission mechanisms of the variable transmitted capacity control type interposed between sides of output means of the speed change mechanisms and a side of said input means, respectively, so that, when coupled, drive torque is transferred between the left-wheel and right-wheel axles;

means for detecting the state of running of the vehicle;

control means for controlling the state of operation of the torque transmission mechanism on the basis of detected information outputted from said running state detection means so that torque of a desired capacity can be transferred between the left-wheel and right-wheel axles;

wheel slip judging means for judging the state of slipping of the left and right wheels; and means for setting the amounts of control of the combined torque transmission mechanisms so that, when one of the left and right wheels is judged slipping by said wheel slip judging means, one of the torque transmission mechanisms, said one torque transmission mechanism being the one opposite to the one which should be coupled if the direction of transfer of the torque of the desired capacity were based upon, is coupled.

In a still further aspect of the present invention, there is also provided a left/right drive torque adjusting apparatus for a vehicle, said apparatus being arranged between a left-wheel axle and a right-wheel axle in the vehicle to permit transfer of drive torque between the left-wheel and right-wheel axles so that drive torques for left and right wheels of the vehicle can be adjusted, comprising:

input means for receiving drive torque from an engine;

a differential mechanism for transmitting the drive torque, which has been inputted through said input means, to the left-wheel and right-wheel axles while permitting differential motion between the left-wheel and right-wheel axles in the vehicle;

a speed change mechanism connected to a side of said input means, whereby a rotational speed on the side of said input means is shifted at a predetermined constant shift ratio;

a combination of torque transmission mechanisms of the variable transmitted capacity control type interposed between the sides of the left-wheel and right-wheel axles and sides of output means of the speed change mechanisms, respectively, so that, when coupled, drive torque is transferred between the left-wheel and right-wheel axles;

means for detecting the state of running of the vehicle;

control means for controlling the state of operation of the torque transmission mechanism on the basis of detected information outputted from said running state detection means so that torque of a desired capacity can be transferred between the left-wheel and right-wheel axles;

wheel slip judging means for judging the state of slipping of the left and right wheels; and means for setting the amounts of control of the combined torque transmission mechanisms so that, when one of the left and right wheels is judged slipping by said wheel slip judging means, one of the combined torque transmission mechanisms, said one torque transmission mechanism being the one opposite to the one which should be coupled if the direction of transfer of the torque of the desired capacity were based upon, is coupled.

In a still further aspect of the present invention, there is also provided a left/right drive torque adjusting method for a vehicle, said vehicle having a speed change mechanism and a torque transmission mechanism of the variable transmitted capacity control type between a left-wheel axle and a right-wheel axle, said speed change mechanism being connected to a side of at least one of the left-wheel and right-wheel axles to shift a rotational speed of said one axle at a predetermined constant shift ratio, and said torque transmission mechanism being interposed between a side of at least the other one of the left-wheel and right-wheel axles and a side of output means of the speed change mechanism so that, when coupled, drive torque is transferred between the left-wheel and right-wheel axles, said method including controlling the state of coupling of the torque transmission mechanism of the variable transmitted capacity control type, thereby transferring drive torque between the left-wheel and right-wheel axles to adjust drive torques for the left and right wheels, which method comprises the following consecutive steps:

i) detecting the state of running of the vehicle;

ii) judging whether or not a rotational speed ratio $\alpha$ of the left wheel to the right wheel obtained based on the state of running of the vehicle is greater than a threshold value Smax across which a predetermined high/low relationship between a rotational speed on a side of said output means of the speed change mechanism and a rotational speed of the other axle changes; and iii) controlling the state of operation of the torque transmission mechanism of the variable transmitted capacity control type so that, when the rotational speed ratio $\alpha$ of the left wheel to the right wheel is judged not greater than the threshold value Smax, the torque transmission mechanism is coupled based on information about the state of running of the vehicle to transfer torque of a desired capacity between the left-wheel and right-wheel axles; but when the rotational speed ratio $\alpha$ of the left wheel to the right wheel is judged greater than the threshold value Smax, canceling transfer of torque by the torque transmission mechanism to discontinue the drive torque transmission control.

In a still further aspect of the present invention, there is also provided a left/right drive torque adjusting method for a vehicle, said vehicle having input means, a differential mechanism, a speed change mechanism and a torque transmission mechanism of the variable transmitted capacity control type, all between a left-wheel axle and a right-wheel axle, said input means being adapted to receive drive torque from an engine, said differential mechanism being adapted to transmit the drive torque, which has been inputted through said input means, to the left-wheel and right-wheel axles while permitting differential motion between the left-wheel and right-wheel axles in the vehicle, said speed change mechanism being connected to a side of at least one of the left-wheel and right-wheel axles to shift a rotational speed on a side of said one axle at a predetermined constant shift ratio, and said torque transmission mechanism being interposed between a side of output means of the speed change mechanism and a side of said input means so that, when coupled, drive torque is transferred between the left-wheel and right-wheel axles, said method including controlling the state of coupling of the torque transmission mechanism of the variable transmitted capacity control type, thereby transferring drive torque between the left-wheel and right-wheel axles to adjust drive torques for the left and right wheels, which method comprises the following consecutive steps:

i) detecting the state of running of the vehicle;

ii) judging whether or not a rotational speed ratio $\alpha$ of the left wheel to the right wheel obtained based on the state of running of the vehicle is greater than a threshold value Smax across which a predetermined high/low relationship between a rotational speed on a side of said output means of the speed change mechanism and a rotational speed of the other axle changes; and iii) controlling the state of operation of the torque transmission mechanism of the variable transmitted capacity control type so that, when the rotational speed ratio α of the left wheel to the right wheel is judged not greater than the threshold value Smax, the torque transmission mechanism is coupled based on information about the state of running of the vehicle to transfer torque of a desired capacity between the left-wheel and right-wheel axles; but when the rotational speed ratio α of the left wheel to the right wheel is judged greater than the threshold value Smax, canceling transfer of torque by the torque transmission mechanism to discontinue the drive torque transmission control.

In a still further aspect of the present invention, there is also provided a left/right drive torque adjusting method for a vehicle, said vehicle having input means, a differential mechanism, a speed change mechanism and a torque transmission mechanism of the variable transmitted capacity control type, all between a left-wheel axle and a right-wheel axle, said input means being adapted to receive drive torque from an engine, said differential mechanism being adapted to transmit the drive torque, which has been inputted through said input means, to the left-wheel and right-wheel axles while permitting differential motion between the left-wheel and right-wheel axles in the vehicle, said speed change mechanism being connected to a side of said input means to shift a rotational speed on the side of said input means at a predetermined constant shift ratio, and said torque transmission mechanism being interposed between a side of at least one of the left-wheel and right-wheel axles and a side of output means of the speed change mechanism so that, when coupled, drive torque is transferred between the left-wheel and right-wheel axles, said method including controlling the state of coupling of the torque transmission mechanism of the variable transmitted capacity control type, thereby transferring drive torque between the left-wheel and right-wheel axles to adjust drive torques for the left and right wheels, which method comprises the following consecutive steps:

i) detecting the state of running of the vehicle;

ii) judging whether or not a rotational speed ratio α of the left wheel to the right wheel obtained based on the state of running of the vehicle is greater than a threshold value Smax across which a predetermined high/low relationship between a rotational speed on a side of said output means of the speed change mechanism and a rotational speed of the other axle changes; and iii) controlling the state of operation of the torque transmission mechanism of the variable transmitted capacity control type so that, when the rotational speed ratio α of the left wheel to the right wheel is judged not greater than the threshold value Smax, the torque transmission mechanism is coupled based on information about the state of running of the vehicle to transfer torque of a desired capacity between the left-wheel and right-wheel axles; but when the rotational speed ratio α of the left wheel to the right wheel is judged greater than the threshold value Smax, canceling transfer of torque by the torque transmission mechanism to discontinue the drive torque transmission control.

In a still further aspect of the present invention, there is also provided a left/right drive torque adjusting method for a vehicle, said vehicle having a combination of speed change mechanisms and a combination of torque transmission mechanism of the variable transmitted capacity control type between a left-wheel axle and a right-wheel axle in the vehicle, said speed change mechanisms being connected to the left-wheel and right-wheel axles to shift rotational speeds on the sides of the axles at a predetermined constant shift ratio, and said torque transmission mechanisms being interposed between the sides of the left-wheel and right-wheel axles and a side of output means of the speed change mechanisms so that, when coupled, drive torque is transferred between the left-wheel and right-wheel axles, said method including controlling the states of coupling of the torque transmission mechanisms of the variable transmitted capacity control type, thereby transferring drive torque between the left-wheel and right-wheel axles to adjust drive torques for the left and right wheels, which method comprises the following consecutive steps:

i) judging the states of slipping of the left and right wheels;

ii) setting the amounts of control of the torque transmission mechanisms so that, when one of the left and right wheels is judged slipping in the first step i), one of the combined torque transmission mechanisms, said one torque transmission mechanism being the one opposite to the one which should be coupled if the direction of transfer of the torque of the desired capacity were based upon, is coupled; and iii) controlling operation of the torque transmission mechanisms of the variable transmitted capacity control type on the basis of the amounts of control set in step ii).

In a still further aspect of the present invention, there is also provided a left/right drive torque adjusting method for a vehicle, said vehicle having input means, a differential mechanism, a combination of speed change mechanisms and a combination of torque transmission mechanisms of the variable transmitted capacity control type, all between a left-wheel axle and a right-wheel axle in the vehicle, said input means being adapted to receive drive torque from an engine, said differential mechanism being adapted to transmit the drive torque, which has been inputted through said input means, to the left-wheel and right-wheel axles while permitting differential motion between the left-wheel and right-wheel axles in the vehicle, said speed change mechanisms being connected to the left-wheel and right-wheel axles, respectively, to shift rotational speeds on sides of the axles at a predetermined constant shift ratio, and said torque transmission mechanisms being interposed between sides of output means of the respective speed change mechanisms and a side of said input means so that, when coupled, drive torque is transferred between the left-wheel and right-wheel axles, said method including controlling the states of coupling of the torque transmission mechanisms of the variable transmitted capacity control type, thereby transferring drive torque between the left-wheel and right-wheel axles to adjust drive torques for the left and right wheels, which method comprises the following consecutive steps:

i) judging the states of slipping of the left and right wheels;

ii) setting the amounts of control of the torque transmission mechanisms so that, when one of the left and right wheels is judged slipping in the first step i), one of the combined torque transmission mechanisms, said one torque transmission mechanism being the one opposite to the one which should be coupled if the direction of transfer of the torque of the desired capacity were based upon, is coupled; and iii) controlling operation of the torque transmission mechanisms of the variable transmitted capacity control type on the basis of the amounts of control set in step ii).

In a still further aspect of the present invention, there is also provided a left/right drive torque adjusting method for a vehicle, said vehicle having input means, a differential mechanism, a combination of speed change mechanisms and a combination of torque transmission mechanisms of the variable transmitted capacity control type, all between a left-wheel axle and a right-wheel axle in the vehicle, said input means being adapted to receive drive torque from an engine, said differential mechanism being adapted to transmit the drive torque, which has been inputted through said input means, to the left-wheel and right-wheel axles while permitting differential motion between the left-wheel and right-wheel axles in the vehicle, said speed change mechanisms being connected to a side of said input means to shift a rotational speed on the side of said input means at a predetermined constant shift ratio, and said torque transmission mechanisms being interposed between sides of the axles and the speed change mechanisms, respectively, so that, when coupled, drive torque is transferred between the left-wheel and right-wheel axles, said method including controlling the states of coupling of the torque transmission mechanisms of the variable transmitted capacity control type, thereby transferring drive torque between the left-wheel and right-wheel axles to adjust drive torques for the left and right wheels, which method comprises the following consecutive steps:

i) judging the states of slipping of the left and right wheels;

ii) setting the amounts of control of the torque transmission mechanisms so that, when one of the left and right wheels is judged slipping in the first step i), one of the combined torque transmission mechanisms, said one torque transmission mechanism being the one opposite to the one which should be coupled if the direction of transfer of the torque of the desired capacity were based upon, is coupled; and iii) controlling operation of the torque transmission mechanisms of the variable transmitted capacity control type on the basis of the amounts of control set in step ii).

The apparatuses and methods according to the various aspect of the present invention can achieve at least one of the above-described objects.

BRIEF DESCRIPTION OF THE DRAWINGS

The above and other objects, features and advantages of the present invention will become apparent from the following description and the appended claims, taken in conjunction with the accompanying drawings, in which:

DESCRIPTION OF THE PREFERRED EMBODIMENTS

The first embodiment of the present invention will be described first.

Figure 1:
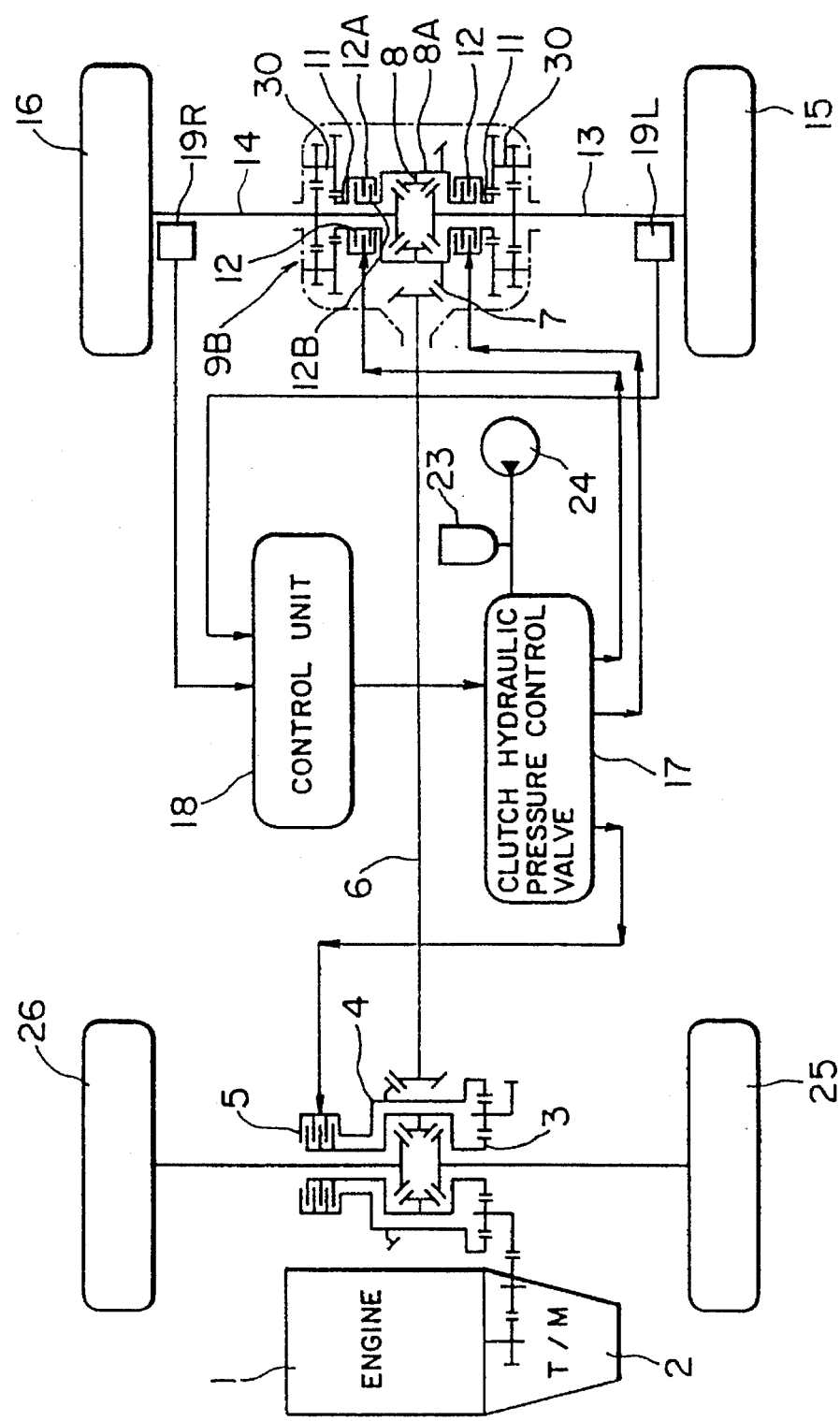
FIG 1 is a schematic block diagram showing a drive system of an automotive vehicle equipped with a vehicular left/right drive torque adjusting apparatus which relates to a first embodiment of the present invention and is useful in the practice of a vehicular left/right drive torque adjusting method according to the first embodiment of the present invention.

The vehicular left/right drive torque adjusting apparatus according to the first embodiment, said apparatus being useful in the practice of the vehicular left/right drive torque adjusting method according to the first embodiment, is arranged in the drive system of the automotive vehicle. The drive system of this automotive vehicle is constructed in such a manner that, as shown in FIG. 1, drive torque from an engine 1 is received at a center differential 3, which is constructed of planetary gears, via a transmission 2 and is then transmitted to a side of front wheels and a side of rear wheels from the center differential 3.

In particular, the center differential 3 is provided with a differential limiting mechanism 5 which can suitably limit differential motion between the front and rear wheels. The differential limiting mechanism 5 is constructed of a hydraulic multi-plate clutch in this embodiment and can control the distribution of drive torque to the front and rear wheels while limiting the differential motion between the front and rear wheels in accordance with hydraulic pressure supplied. It is a device which controls the distribution of drive torque between the front and rear wheels.

One of drive torque fractions distributed from the center differential 3 as described above is transmitted to left and right front wheels 25, 26 through a front differential 4. On the other hand, the other fraction of the drive torque, also distributed from the center differential 3, is transmitted to a rear differential 8 via a drive shaft 6 and further to left and right rear wheels 15, 16 via the rear differential 8. Numeral 7 indicates a bevel-gear mechanism which is formed of a drive pinion and a ring gear.

Arranged at the rear differential 8 is a drive torque transmission control mechanism 9B (numeral 9 will hereinafter be used whenever the drive torque transmission control mechanism is referred to in broad sense) which is constructed of a speed change mechanism 30 and a multi-plate clutch mechanism 12 as a torque transmission mechanism of the variable transmission capacity control type (or a torque transmission mechanism). The rear differential (differential mechanism) 8 and the drive torque transmission control mechanism 9B, in combination, make up a drive torque distribution control system for the vehicle. Although a bevel-gear differential is used as the differential mechanism 8 in the illustrated embodiment, no particular limitation is imposed on the differential mechanism 8 insofar as drive torque inputted from an engine can be transmitted to two drive shafts while permitting a differential motion therebetween. It is of course possible to apply another differential mechanism known in the art, for example, a differential mechanism constructed of a gear mechanism, for example, a compound planetary gear or a roller mechanism. The multi-plate clutch mechanism 12 is of the hydraulic type so that the distribution of drive torque to the left and right rear wheels can be controlled by adjusting its hydraulic pressure.

A hydraulic system for the multi-plate clutch mechanism 12 in the drive torque transmission control system 9B is controlled by a control unit 18 like a hydraulic system for the multi-plate clutch mechanism 5 in the above-described front/rear drive torque distribution control system.

Described specifically, the hydraulic system for the multi-plate clutch mechanism 12 and that for the multi-plate clutch mechanism 5 is constructed of unillustrated hydraulic oil compartments provided in association with the respective clutch mechanisms, a motor-driven pump 24 and an accumulator 23, both forming a hydraulic pressure source, and a clutch hydraulic pressure control valve 17 for feeding the hydraulic pressure to the hydraulic oil compartments as much as needed. The opening of the clutch hydraulic pressure control valve 17 is controlled by the control unit 18.

Namely, the state of coupling of the multi-plate clutch mechanism 12 is controlled by adjusting the opening of the clutch hydraulic pressure control valve 17 through the control unit 18.

The control unit 18 controls the opening of the clutch hydraulic pressure control valve 17 on the basis of information from wheel speed sensors 19, a steering wheel angle sensor 20, an acceleration sensor (or acceleration computing means) 22, and the like.

Further, the control unit 18 also performs characteristic control in accordance with the state of slipping of each wheel and is designed to perform the characteristic control even when the magnitude of the ratio ρ of a rotational speed of the left wheel to that of the right wheel becomes greater a predetermined value $\alpha_0$ during turning of the vehicle. This control unit 18 will be described in detail subsequently herein.

Figure 2:
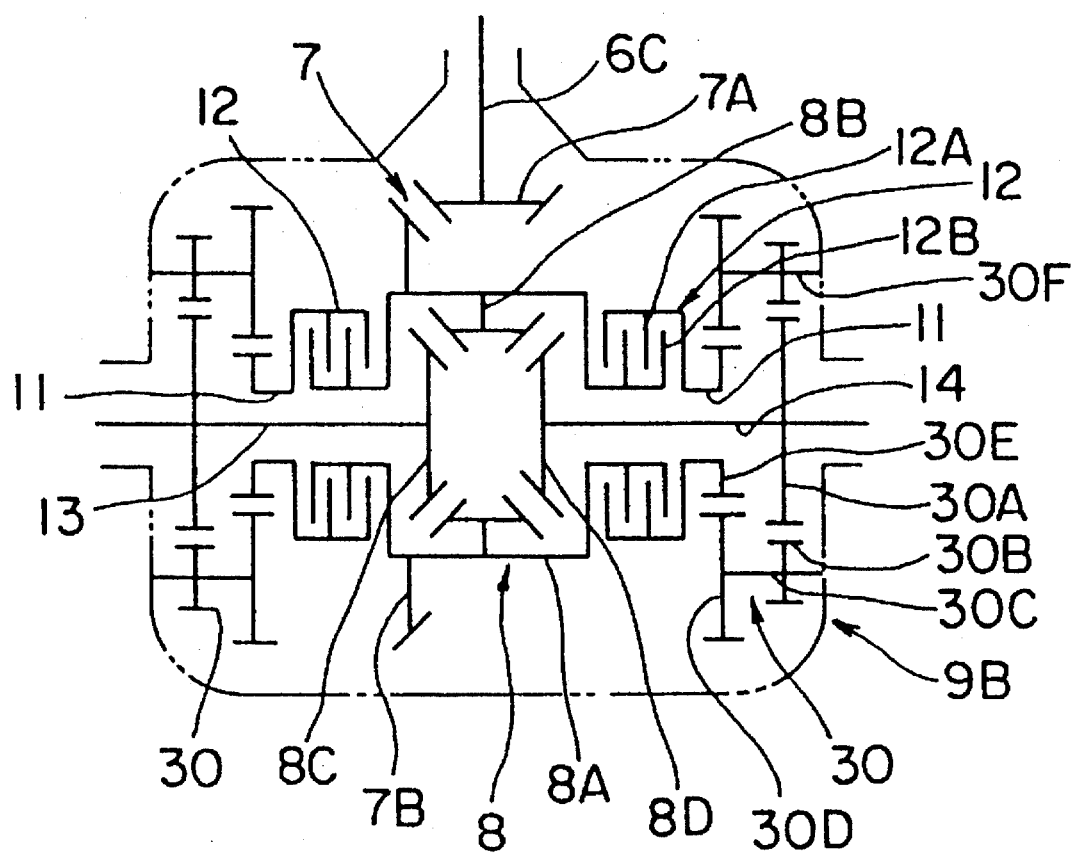
FIG. 2 is a schematic skeleton diagram depicting the vehicular left/right drive torque adjusting apparatus which relates to the first embodiment of the present invention and is useful in the practice of the vehicular left/right drive torque adjusting method according to the first embodiment of the present invention.

Describing now an essential part of the drive torque distribution control system for the vehicle, there are provided, as depicted in FIG. 2, an input shaft 6C provided at a rear end of the drive shaft 6 and inputted with rotational drive torque (hereinafter called "drive torque" or "torque"), a left-wheel axle 13 (a drive axle for a left rear wheel 15), and a right-wheel axle 14 (a drive axle for a right rear axle 16), said left-wheel and right-wheel axles 13, 14 serving to output drive torque inputted from the input shaft 6C. The vehicular left/right drive torque distribution adjusting apparatus is interposed among the left-wheel axle 13, the right-wheel axle 14 and the input shaft 6C.

Owing to the construction to be described next, the drive torque transmission control mechanism 9B of the vehicular left/right drive torque adjusting apparatus can distribute drive torque, which is to be transmitted to the left-wheel axle 13 and the right-wheel axle 14, at a desired ratio while permitting differential motion between the left-wheel axle 13 and the right-wheel axle 14.

Between the input shaft 6C and each of the left-wheel and right-wheel axles 13, 14, the speed change mechanism 30 and the multi-plate clutch mechanism 12 are interposed so that a rotational speed of the left-wheel axle 13 or the right-wheel axle 14 is changed (accelerated in the illustrated embodiment) by the speed change mechanism 30 and is transmitted to a hollow axle 11 as an output means of the speed change mechanism 30.

The multi-plate clutch mechanism 12 is interposed between the hollow axle 11 and a differential case 8A on the side of the input shaft 6C. By coupling the multi-plate clutch mechanism 12, drive torque is fed from one of the differential casing 8A and the hollow axle 11, said one member rotating at a higher speed, to the other member rotating at a lower speed, because as general characteristics of clutch plates arranged in opposition to each other, the transmission of torque takes place from the clutch plates rotating at a higher speed to the clutch plates rotating at a lower speed. In the illustrated embodiment, the differential case 8A is on a lower-speed side and the hollow axle 11 is on a higher-speed side and drive torque is hence fed from the hollow axle 11 to the differential case 8A, unless the differential motion between the left and right axles 13 and 14 is so much that the axle 13 or 14 be, comes faster relative to the differential case 8A beyond a predetermined ratio (i.e., the ratio corresponding to a reduction ratio of the speed change mechanism 30).

When the multi-plate clutch mechanism 12, for example, between the right-wheel axle 14 and the input shaft 6C is coupled, the drive torque distributed to the right-wheel axle 14 is either increased or decreased (decreased primarily in the illustrated embodiment) in the course of its transmission from the side of the input shaft 6C so that the drive torque to be distributed to the left-wheel axle 13 is decreased or increased (increased primarily in the illustrated embodiment) correspondingly.

The speed change mechanism 30 in this embodiment is constructed of a so-called double planetary gear mechanism in which two planetary gear mechanisms are connected in series. No particular limitation is imposed on the speed change mechanism 30 itself as long as it outputs an inputted rotational speed after accelerating or decelerating same at a constant speed change ratio. Mechanisms making use of a belt, a chain or the like can also be adopted by way of example. The speed change mechanism 30 is therefore not limited to a gear mechanism.

Taking by way of example the speed change mechanism 30 of the gear mechanism type disposed on the right-wheel axle 14, a description will be made next.

A first sun gear 30A is fixed on the right-wheel axle 14. This first sun gear 30A is, at an outer periphery thereof, in meshing engagement with a first planetary gear (planetary pinion) 30B. A pinion shaft 30C is supported for rotation on a carrier 30F which is fixedly secured on a casing (fixed portion) and is not rotatable. A first planetary gear 30B and a second planetary gear 30D are each integrally mounted on the pinion shaft 30C. As a consequence, the first planetary gear 30B and the second planetary gear 30D undergo the same rotation about the pinion shaft 30C as a central axis.

Further, the second planetary gear 30D is in meshing engagement with a second sun gear 30E pivotally supported on the right-wheel axle 14. The second sun gear 30E is connected to clutch plates 12A of the multi-plate clutch mechanism 12 via the hollow axle 11. The other clutch plates, namely, the clutch plates 12B of the multi-plate clutch mechanism 12 is connected to the differential case 8A which is driven by the input shaft 6C.

In the structure of the illustrated embodiment, the first sun gear 30A is formed with a greater diameter than the second sun gear 30E and, correspondingly, the first planetary gear 30B is formed with a smaller diameter than the second planetary gear 30D. As a result, the rotational speed of the second sun gear 30E becomes higher than that of the first sun gear 30A so that the speed change mechanism 30 serves as an accelerating mechanism. When the rotational speed of the clutch plates 12A is higher than that of the clutch plates 12B and the multi-plate clutch mechanism 12, for example, on the side of the right wheel is coupled, torque in an amount corresponding to the state of the coupling is fed from the side of the right-wheel axle 14 to the side of the input shaft 6C.

On the other hand, the speed change mechanism 30 and the multi-plate clutch mechanism 12, both provided on the side of the left-wheel axle 13, are constructed likewise. When it is desired to distribute more drive torque from the input shaft 6C to the right-wheel axle 14, the multi-plate clutch mechanism 12 on the side of the left-wheel axle 13 is suitably coupled in accordance with the amount of distribution (distribution ratio). When it is desired to distribute more drive torque to the left-wheel axle 13, on the other hand, the multi-plate clutch mechanism 12 on the side of the right-wheel axle 14 is suitably coupled in accordance with the distribution ratio.

Since the multi-plate clutch mechanism 12 is of the hydraulically driven type, the state of coupling of the multi-plate clutch mechanism 12 can be controlled by adjusting the level of the hydraulic pressure so that the amount of drive torque to be fed to the left-wheel axle 13 or the right-wheel axle 14 from the input shaft 6C (namely, the left/right distribution ratio of the drive torque) can be controlled at an appropriate accuracy.

The left and right multi-plate clutch mechanisms 12 are arranged such that they are prevented from being fully coupled at the same time. They are designed in such a manner that, when one of the left and right multi-plate clutch mechanisms 12 is fully coupled, the other multi-plate clutch mechanism 12 undergoes slipping.

Figure 3:
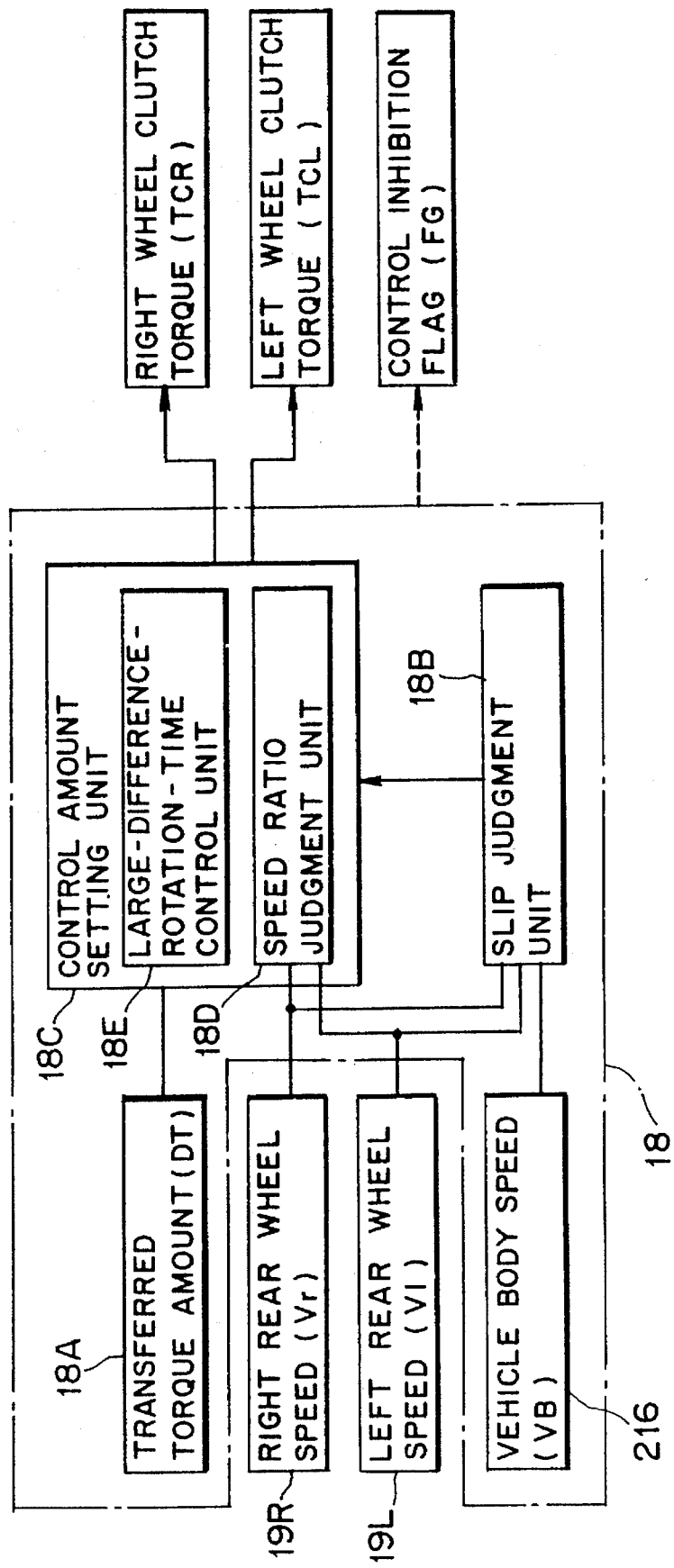
FIG. 3 is a schematic fragmentary block diagram showing a control system of the vehicular left/right drive torque adjusting apparatus which relates to the first embodiment of the present invention and is useful in the practice of the vehicular left/right drive torque adjusting method according to the first embodiment of the present invention.

As is depicted in FIG. 3, the control unit 18 described above is also provided with a transferred torque mount setting unit 18A for setting a torque amount DT (=Tr−Tl where Tr is torque desired for the right wheel and Tl is torque desired for the left wheel), which is desired to be transferred, in accordance with target torques for the left and right wheels, a simulated vehicle body speed computing unit 216 for simulating and calculating a vehicle body speed VB of the vehicle, a slip judgment unit 18B for judging based on the vehicle body speed VB of the vehicle and wheel speeds Vl, Vr of the left and right wheels whether or not at least one of the wheels is in a state of slipping, and a control amount setting unit (control amount setting means) 18C for setting a control amount for the clutch hydraulic pressure control valve 17 on the basis of the judgment of the slip judgment unit 18B.

Arranged inside the control amount setting unit 18C are a speed ratio judgment unit (rotational speed ratio judgment means) 18D for judging whether or not the ratio $\alpha$ of a rotational speed of the left wheel to that of the right wheel is greater than a threshold value $\alpha_0$ across which a high/low relationship between a rotational speed on the side of the output means of the speed change mechanism 30 and that on the side of each axle 13 or 14 as well as a large-difference-rotation-time control unit (large-difference-rotation-time control means) 18E which, when the ratio $\alpha$ of the rotational speed of the left wheel to that of the right wheel is judged greater than the threshold value $\alpha_0$ at the judgment unit 18D and the control of the drive torque transmission is not possible, set such a control amount that the transmission of torque by the torque transmission mechanism 12 of the variable transmitted capacity control type is canceled and the control of the drive torque transmission is stopped.

Figure 4:
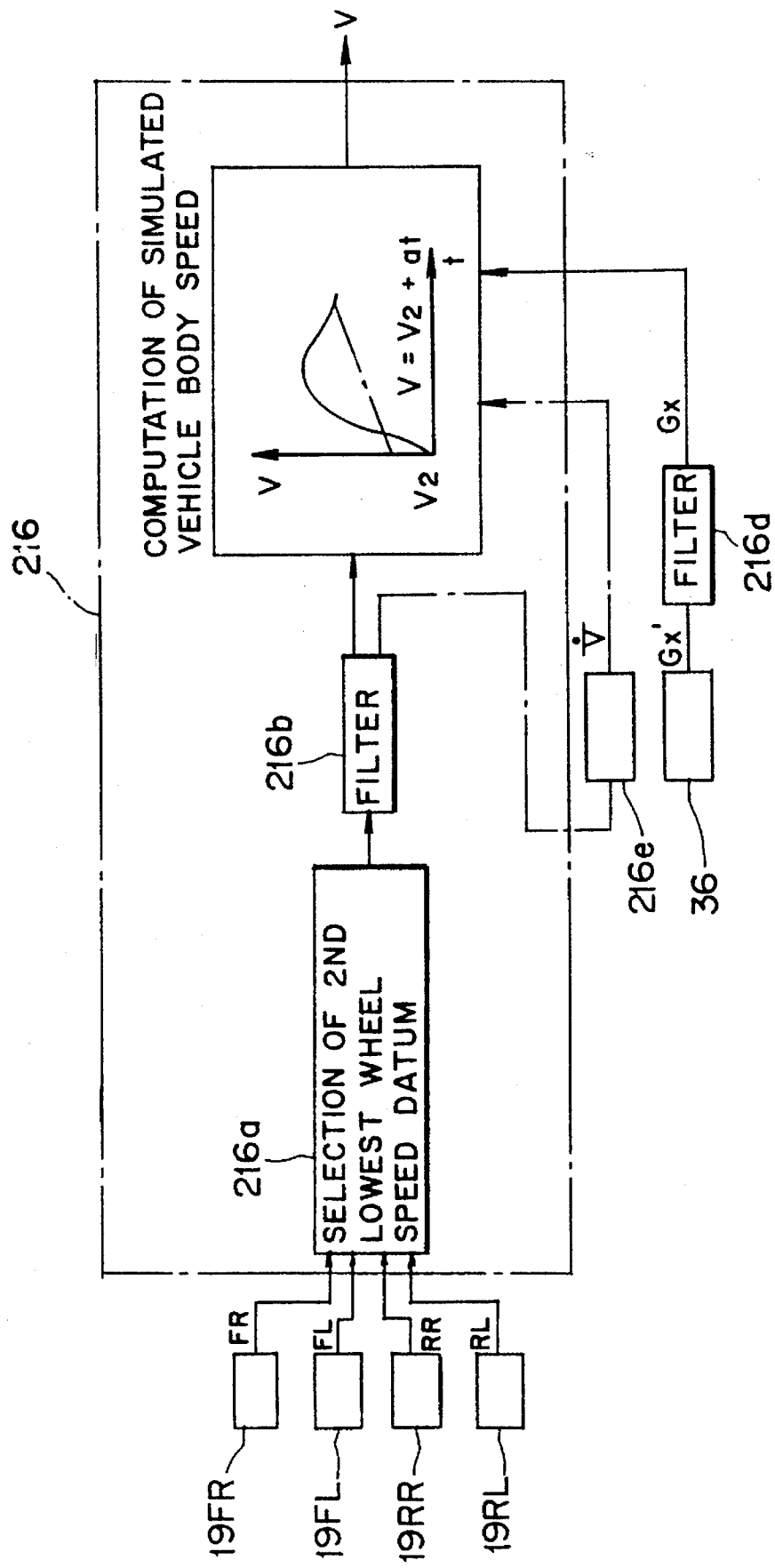
FIG. 4 is a schematic block diagram showing a simulated vehicle body speed computing unit in the control system of the vehicular left/right drive torque adjusting apparatus which relates to the first embodiment of the present invention and is useful in the practice of the vehicular left/right drive torque adjusting method according to the first embodiment of the present invention.

The simulated vehicle body speed computing unit 216 is constructed, as is shown in FIG. 4, of a wheel speed selection unit 261a and a simulated vehicle body speed computing unit 216c. The wheel speed selection unit 216a selects the second lowest wheel speed datum out of rotational speed datum signals FL, FR, RL, RR of the left front wheel 25, the right front wheel 26, the left rear wheel 15 and the right rear wheel 16, which have been detected by wheel speed sensors 19FL, 19FR, 19RL, 19RR, respectively. The simulated vehicle body speed computing unit 216c sets a simulated vehicle body speed from the wheel speed datum so selected.

The wheel speed datum selected at the wheel speed selection unit 216a is applied to a filter 216b to remove noise components, whereby a wheel speed datum SVW is obtained. A longitudinal acceleration detected by a longitudinal acceleration sensor 36 is applied to a filter 261d to remove noise components, so that a longitudinal acceleration datum Gx is obtained. Based especially on the basis of the wheel speed datum SVW and the longitudinal acceleration datum Gx, the simulated vehicle body speed computing unit 216c estimates, from both data SVW, Gx at a given time point, the subsequent vehicle speed. Representing the wheel speed datum SVW and the longitudinal acceleration datum Gx at a given time point by $V_2$ and a, respectively, the theoretical vehicle body speed VB at time t after the given time point can be calculated by the following formula: VB=$V_2$+at. As an alternative, it is also possible to detect the longitudinal acceleration datum Gx (as $a_i$) from time to time and then to calculate the speed VB by the following formula: VB=$V_2$+$\Sigma a_i \cdot t$.

The second smallest wheel speed datum is employed out of the rotational speed datum signals FL, FR, RL, RR as described above. Each wheel is usually slipping to the side of over rotation. Theoretically, it is therefore desired to employ the speed of the wheel which is rotating at the lowest speed. The second lowest wheel speed is however employed in view of the reliability of the data.

Based on the vehicle body speed VB of the vehicle and the rotational speeds Vl, Vr of the left and right wheels, the slip judgment unit 18B calculates a tire slip ratio SL (%)

which will be defined hereinafter. By comparing the slip ratio SL with a preset threshold value $SL_0$, it is judged whether or not at least one of the wheels is in a state of slipping.

Different slip ratios SL (%) are employed depending on whether a tire is in a driven state or in a braked state. From the wheel speed V (Vr or Vl) and the vehicle body speed VB, the following definitions have been derived:

In a driven state, $$SL=(V-VB)/V \quad (1A)$$

In a braked state, $$SL=(VB-V)/VB \quad (1B)$$

To improve the reliability of the control, the average of the rotational speed of the left wheel and that of the right wheel [Vav=(Vr+Vl)/2] is used as the wheel speed V here.

Figure 32:
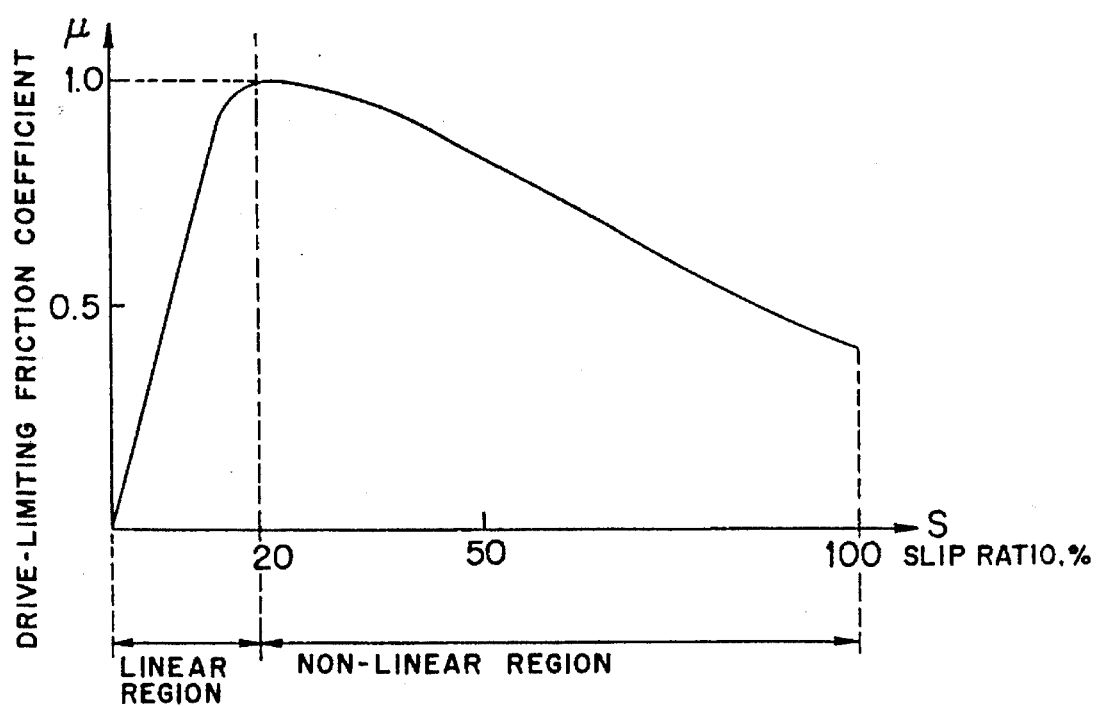
FIG. 32 is a diagram illustrating one example of drive limiting friction characteristic as a function of the slip ratio of a tire.

With respect to the road surface drive-limiting friction coefficient μ, the slip ratio SL of the tire has a relationship as indicated in the above-described tire characteristic diagram of FIG. 32. Where the slip ratio SL is in the small SL region, the friction coefficient μ is in the linear region in which the friction coefficient increases almost linearly with the slip ratio SL. Where the slip ratio SL is in the large SL region, on the other hand, the friction coefficient μ is in the non-linear region in which the friction coefficient decreases as the slip ratio SL increases.

In other words, when the friction coefficient is in the linear region where slipping of a tire is small, coupling of a clutch to increase drive torque for the corresponding one of the wheels causes the rotational speed of the wheel to increase so that the slip ratio SL of the tire of the wheel becomes greater and the drive torque for the wheel is increased. The rotational speed of the other wheel is therefore decreased, whereby the slip ratio SL of the tire of the wheel drops and the drive torque is decreased accordingly.

If slipping of the tire becomes greater and falls in the non-linear region, coupling of one of the clutches to increase drive torque for the corresponding wheel increases the rotational speed of the wheel and also the slip ratio SL of the tire of the wheel. However, the drive torque for the wheel is decreased conversely. As a result, the drive torque is conversely increased at the other wheel whose rotational speed has been decreased to have a decreased tire slip ratio SL.

In the non-linear region in which slipping of the tire has increased and the slip ratio SL is greater than the predetermined value (the threshold value), torque cannot therefore be controlled as desired unless the control is performed in a manner different from the control in the linear region.

The reference value (threshold value) $SL_0$ for the judgment of slipping of the tire is the slip ratio SL of the above-described threshold value between the linear region and the non-linear region. This threshold value $SL_0$ can be set, for example, at about 20 (%).

As will be described below, various other conditions could also be adopted for judging whether a tire is slipping or not.

(1) $(Vr+Vl)/2 > a_1 \cdot VB$
where $a_1$ is a constant (for example, 1.2) somewhat greater than 1.

(2) $Vr > a_2 \cdot VB$ and $Vl > a_2 \cdot VB$ where $a_2$ is a constant (for example, 1.2) somewhat greater than 1.

(3) $Vr > a_3 \cdot VB$ or $Vl > a_3 \cdot VB$ where $a_3$ is a constant somewhat greater than 1 and is set greater than $a_2$.

(4) Using $f=(Vr+Vl)/2$, the time differential of f, df/dt (=f') satisfies the following equation:
$f' \geq b_1$
where $b_1$ is a constant somewhat greater than 1.

(5) The time differentials of Vr and Vl, dVr/dt (=Vr') and dVl/dt (=Vl') satisfy the following equations:
$Vr' \geq b_2$, $Vl' \geq b_2$
where $b_2$ is a constant somewhat greater than 1.

(6) Vr' and Vl' satisfy the following equations: $Vr' \geq b_3$, $Vl' \geq b_3$
where $b_3$ is a constant somewhat greater than 1 and is set greater than $b_2$.

In addition, two or more of the above conditions (1) to (16) can also be combined suitably.

When it is judged at the slip judgment unit 18B that the slip ratio SL is smaller than the threshold value $SL_0$ and none of the wheels is in a state of slipping, the control amount setting unit 18C sets a control amount for the linear region. It however sets a control amount for the non-linear region when the slip ratio SL is judged greater than the threshold value $SL_0$ and at least one of the wheels is in a state of slipping.

The control amount for the linear region is set as will be described hereinafter.

Based on a torque amount DT which is desired to be transferred according to target torques set for the left and right wheels by the transferred torque amount setting unit 18A, the control amount setting unit 18C of the control unit 18 controls the state of coupling of one of the left and right multi-plate clutch mechanisms 12 when the ratio α of a rotational speed of the left wheel to that of the right wheel is the predetermined value $α_0$ or smaller during turning of the vehicle. Namely, it is controlled to transfer torque from the side of the left wheel to the side of the right wheel when the torque quantity DT is positive. In this case, the state of coupling of the left multiplate clutch mechanism 12 is controlled. When the torque amount DT is negative, on the other hand, it is controlled to transfer torque from the side of the right wheel to the side of the left wheel. In this case, the state of coupling of the right multi-plate clutch mechanism 12 is controlled.

As transfer of torque such as that mentioned above is effected from the clutch plates rotating at a higher speed to the clutch plates rotating at a lower speed in the multi-plate clutch mechanism 12, it is the pre-requisite that the rotational speed of the wheel on the side where it is desired to increase torque is lower than the rotational speed of the wheel on the side where it is desired to decrease torque.

When it is controlled to transfer torque from the side of the inner wheel to the side of the outer wheel during turning, the rotational speed on the side of the outer wheel where it is desired to increase torque may however become higher than the rotational speed on the side of the inner wheel where it is desired to decrease torque.

If the multi-plate clutch mechanism 12 is coupled in the case, torque is transferred from the side of the outer wheel where it is desired to increase torque to the side of the inner wheel where it is desired to decrease torque, so that control is performed in a manner opposite to what is supposed to be.

When the ratio α of a rotational speed of the left wheel to that of the right wheel during turning of the vehicle becomes greater than the predetermined value $α_0$, it therefore becomes no longer possible to transfer or transmit torque from the side of the inner wheel to the side of the outer wheel. In this case, torque is transmitted from the side of the outer wheel to the side of the inner wheel no matter whether the left multi-plate clutch mechanism 12 is coupled or the right multi-plate clutch mechanism 12 is coupled.

Even if the rotational speed on the side of the inner-wheel axle is increased and outputted, for example, the rotational speed of output means on the side of the inner-wheel axle does not always become higher than the rotational speed on the side of the outer-wheel axle when the ratio $\alpha$ of a rotational speed of the inner wheel to the outer wheel during turning is large. In such a case, it is impossible to achieve transfer of torque from the side of the inner wheel to the side of the outer wheel.

When the ratio $\alpha$ of a rotational speed of the left wheel to that of the right wheel becomes greater than the predetermined value $\alpha_0$ and transfer of torque in a desired direction is no longer feasible, it is desired to make both the multi-plate clutch mechanisms 12, 12 free. When it is still possible to achieve transfer of torque in a desired direction by each of the multi-plate clutch mechanisms 12, 12 even after the ratio $\alpha$ of a rotational speed of the left wheel to that of the right wheel has exceeded the predetermined value $\alpha_0$, it is desired to control the coupling of one of the multi-plate clutch mechanisms 12, said one multi-plate clutch mechanism 12 having a smaller difference in rotational speed between its clutch disks 12A and 12B, so that the transfer of torque can be achieved.

The control unit 18 controls coupling of each multi-plate clutch 12 as described above. Upon conducting the control, it is desired to numerically perform the judgment of whether the ratio $\alpha$ of a rotational speed of the left wheel to that of the right wheel has become greater than the predetermined value $\alpha_0$.

For this purpose, it is necessary to specifically set the predetermined value $\alpha_0$ which serves as a reference for judgment. As the predetermined value $\alpha_0$, it is possible to use a value (controllable maximum rotational speed ratio) Smax, which specifies a left/right rotational speed difference range permitting control of transfer of drive torque.

This controllable maximum rotational speed ratio Smax can be defined as the ratio of a change $\Delta N$ in rotational speed on the output side (namely, on the side of each of the axles 13, 14) to a rotational speed Ni on the input side (namely, on the side of the differential case 8A) when the rotational speed on the side of the clutch plates 12A and that on the side of the clutch plates 12B have become equal to each other (namely, Smax=$\Delta N$/Ni).

Here, the maximum rotational speed ratio Smax will be discussed. First, the preset speed ratio of the planetary gear mechanism to achieve the maximum rotational speed ratio Smax will be derived with reference to the velocity diagrams of FIGS. 5 and 6.

Figure 5:
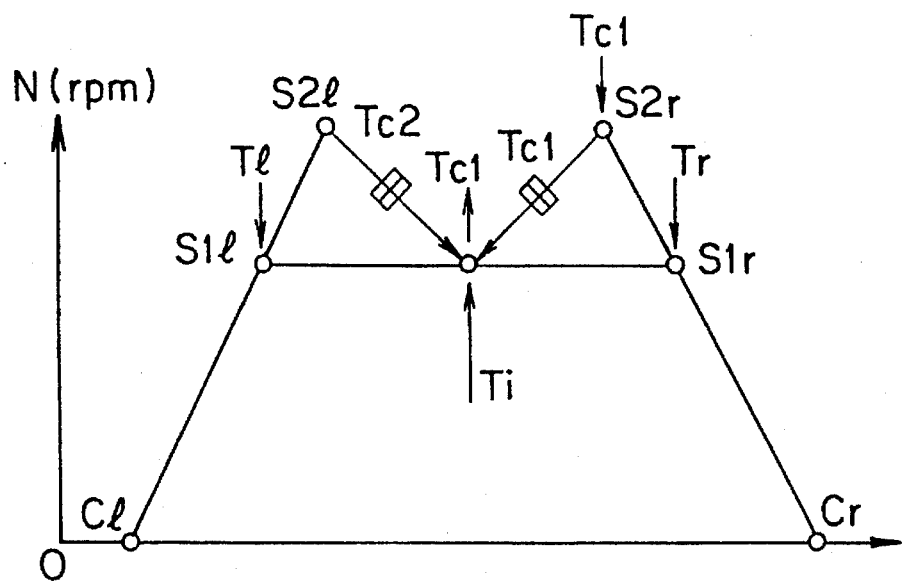
FIG. 5 is a speed diagram illustrating transmission of torque in the vehicular left/right drive torque adjusting apparatus which relates to the first embodiment of the present invention and is useful in the practice of the vehicular left/right drive torque adjusting method according to the first embodiment of the present invention.
Figure 6:
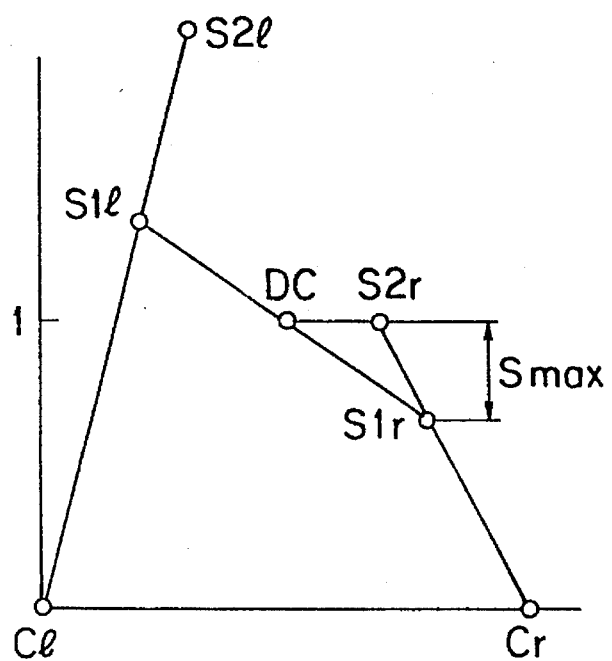
FIG. 6 is a speed diagram illustrating a specific example of torque transmission in the vehicular left/right drive torque adjusting apparatus which relates to the first embodiment of the present invention and is useful in the practice of the vehicular left/right drive torque adjusting method according to the first embodiment of the present invention.

In FIGS. 5 and 6, each symbol followed by "l" relates to the left wheel whereas each symbol followed by "r" pertains to the right wheel. Cl, Cr each represents the rotational speed of the carrier 30F and is 0 as the carrier 30F does not rotate here. S1l, S1r each stands for the rotational speed of the first sun gear 30A. S2l, S2r each indicates the rotational speed of the second sun gear 30E. Because the first sun gear 30A has a greater diameter than the second sun gear 30E, the rotational speeds S1l,S1r are lower than the rotational speeds S2l, S2r. Further, DC represents the rotational speed of the differential case 8A.

Further, $Z_1$ is the number of teeth of the first sun gear 30A, $Z_2$ the number of teeth of the second sun gear 30E, $Z_3$ the number of teeth of the planetary gear 30B, $Z_4$ the number of teeth of the planetary gear 30D, Ti the input torque to the differential case 8A, Tl, Tr the torques distributed to the left wheel and the right wheel, respectively, Tc1 the torque transmitted in the left direction when the multi-plate clutch mechanism 12 in the right-wheel-side drive torque transmission control mechanism 9B has been coupled, and Tc2 the torque transmitted in the right direction when the multi-plate clutch mechanism 12 in the left-wheel-side drive torque transmission control mechanism 9B has been coupled.

FIG. 5 illustrates a state in which the left and right wheels are rotating at the same speed, while FIG. 6 shows a state in which the multi-plate clutch mechanism 12 in the right-wheel-side drive torque transmission control mechanism 9B is fully coupled, the right wheel is restrained from rotation by the multiplate clutch mechanism 12 and the rotational speed on the side of the right wheel is decelerated, and the rotational speed on the side of the left wheel is accordingly accelerated.

The preset speed ratio of the planetary gear mechanism for achieving the above-described Smax (the speed ratio indicating the controllable left/right rotational speed difference range) will be derived.

This state of Smax is shown in FIG. 6. When the multi-plate clutch mechanism 12 is fully coupled, the rotational speed DC of the differential case 8A and the rotational speed S2r of the second sun gear 30E become equal to each other.

Accordingly, from FIG. 6, $$Z_3/Z_1 : Z_4/Z_2 = 1 - Smax : 1$$
$$\therefore Z_2Z_3/Z_1Z_4 = 1 - Smax$$

As is understood from the foregoing, the speed ratio Smax indicating the controllable left/right rotational speed difference range is determined in accordance with the speed change ratio of the speed change mechanism 30 (namely, the preset gear ratio of the gears 30A, 30E, 30B and 30D).

If the left/right wheel speed ratio $\alpha$ is defined as the ratio of the wheel speed difference Vd [=(Vr−Vl)/2] to the average vehicle speed Vav [=(Vr+Vl)/2] of the right wheel speed Vr and the left wheel speed Vl, the left/right wheel speed ratio $\alpha$ can be expressed as follows:

$$\alpha = Vd/Vav = [(Vr-Vl)/2]/[(Vr+Vl)/2] \quad (1)$$
$$= (Vr-Vl)/(Vr+Vl)$$

When the magnitude $|\alpha|$ of the left/right wheel speed ratio $\alpha$ exceeds the speed ratio Smax, the high/low relationship between the rotational speed on the side of the clutch plates 12A to that on the side of the clutch plates 12B in the multi-plate clutch mechanism 12 is reversed.

It is therefore possible to define as expressed by the following formula (2) that the magnitude of the left/right wheel speed ratio $\alpha$ is greater than the predetermined value $\alpha_0$:

$$Smax < |\alpha| \quad (2)$$

In the formula (1), the value of the speed ratio Smax is a constant value and can be calculated beforehand. The left/right wheel speed ratio $\alpha$ can be calculated from the rotational speeds Vl, Vr of the left and right wheels from time to time.

In the apparatus of the present embodiment, the control amount setting unit 18C performs setting of a control amount for each situations while making a judgment at the judgment unit 18D by calculating the left/right wheel speed ratio $|\alpha|$ at a suitable frequency of control and comparing it with the speed ratio Smax, as will described hereinafter.

When transmission of torque in a desired direction is not feasible (in other words, when it is attempted to perform-transmission of torque from the side of the inner wheel to the side of the outer wheel), the multi-plate clutch mechanisms 12,12 are both made free. When each of the multi-plate clutch mechanisms 12, 12 permits transmission of torque in a desired direction (in other words, when it is attempted to perform transmission of torque from the side of the outer wheel to the side of the inner wheel), the opening of the clutch hydraulic pressure control valve 17 is controlled so that the coupling of one of the multi-plate clutch mechanisms 12, said one multi-plate clutch mechanism 12 having a smaller difference in rotational speed between its clutch disks 12A and 12B, is controlled to achieve the transmission of the torque.

Upon turning of the vehicle, in particular, the turning performance of the vehicle is improved at the time of initiation of the turning in the range of $Smax \geq |\alpha|$. For this purpose, the drive torque on the side of the outer wheel is increased to imbalance the distribution of drive torque so that turning moment is applied to the vehicle. Upon completion of the turning, it is desired to promptly finish the turning motion of the vehicle. For this purpose, the drive torque on the side of the inner wheel is increased to imbalance the distribution of torque so that a moment which can finish the turning is applied to the vehicle.

When $Smax < |\alpha|$, on the other hand, it is impossible to increase the drive torque on the side of the outer wheel at the time of initiation of the turning through the large-difference-rotation-time control unit 18E. The coupling of the corresponding multi-plate clutch mechanism 12 is therefore released to stop the control of the drive torque transmission. At the time of completion of the turning, it is however possible to increase the drive torque on the side of the inner wheel. To promptly finish the turning motion of the vehicle, the drive torque on the side of the inner wheel is therefore increased to imbalance the distribution of drive torque so that a moment which can finish the turning is applied to the vehicle.

Namely, the left/right wheel speed ratio $\alpha$ is calculated at a suitable control frequency and is compared with the speed ratio Smax. Depending on their high/low relationship and DT, respective control amounts (a right control amount TCR and a left control amount TCL) are set, for example, as follows:

(i) When $Smax > |\alpha|$,
(2) if $DT \geq 0$, that is, if it is desired to transfer torque to the side of the right wheel,
TCR=0
TCL=(1−Smax)DT
(2) if DT<0, that is, if it is desired to transfer torque to the side of the left wheel,
TCR=−(1−Smax)DT
TCL=0

(ii) When $Smax \leq \alpha$, that is, when the rotational speed on the side of the right wheel is substantially higher than the rotational speed on the side of the left wheel,
(1) if $DT \geq 0$, that is, if it is desired to transfer torque to the side of the right wheel,
TCR=0
TCL=(1−Smax)DT
(2) if DT<0, that is, if it is desired to transfer torque to the side of the left wheel,
TCR=0
TCL=0

(iii) When $-Smax \geq \alpha$, that is, when the rotational speed on the side of the left wheel is substantially higher than the rotational speed on the side of the right wheel,
(1) if DT>0, that is, if it is desired to transfer torque to the side of the right wheel,
TCR=0
TCL=0
(2) if DT<0, that is, if it is desired to transfer torque to the side of the left wheel,
TCR=−(1−Smax)DT
TCL=0

Control amounts for the non-linear region are set as follows:
(1) When DT>0,
TCR=C
TCL=0
(2) When DT=0,
TCR=0
TCL=0
(3) When DT<0,
TCR=0
TCL=C C is a constant value. For example, it can be set preferably equal to the maximum value Tmax of possible clutch control torque T. The control amount is set very roughly for the non-linear region as described above, because a response to a control amount is not linear in the non-linear region and precise control is therefore difficult in practice.

Figure 7:
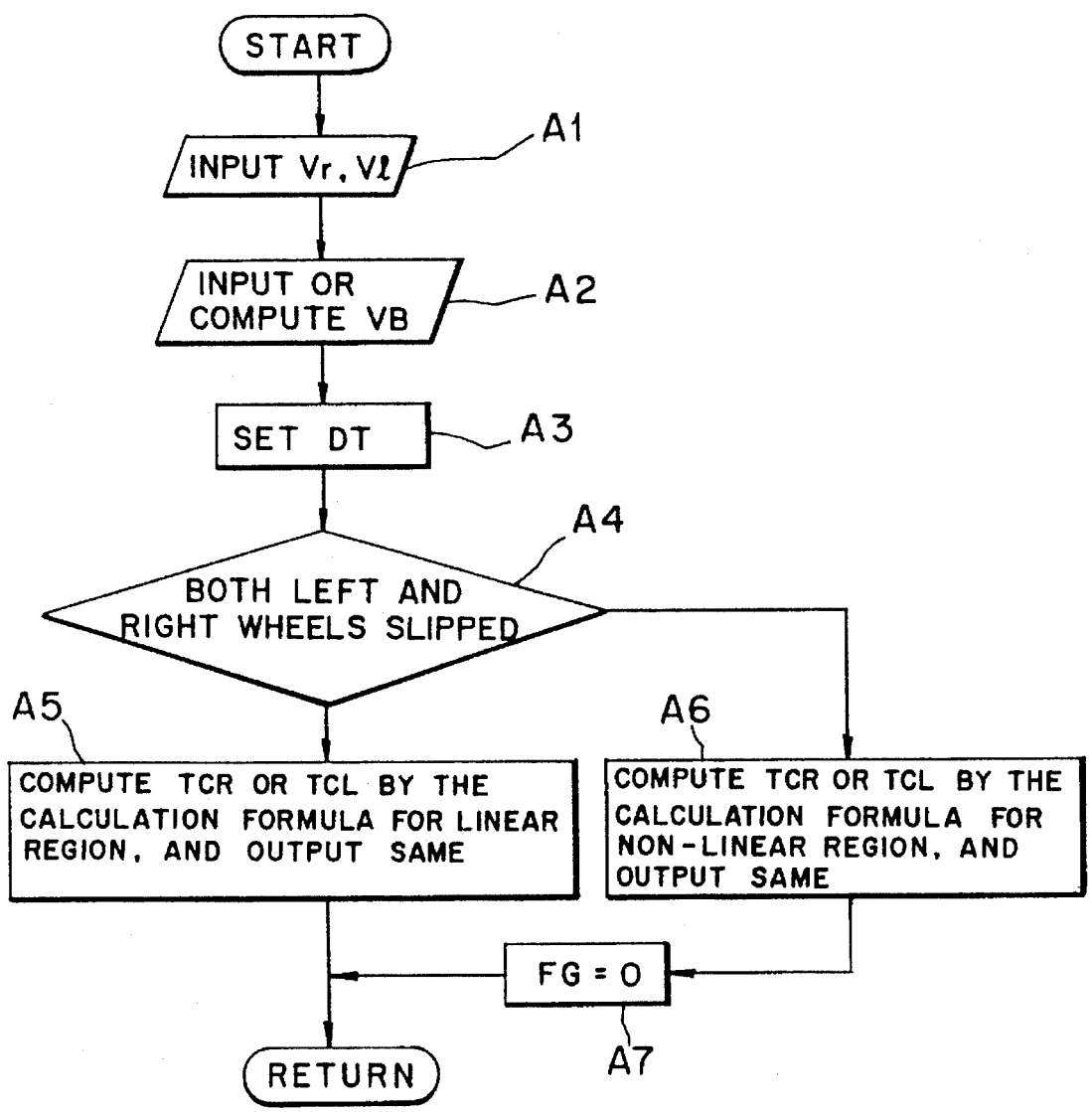
FIG. 7 is a flow chart showing the details of control of the vehicular left/right drive torque adjusting apparatus according to the first embodiment of the present invention and the vehicular left/right drive torque adjusting method according to the first embodiment of the present invention.

Because the vehicular left/right drive torque adjusting apparatus according to the first embodiment of the present invention is constructed as described above, wheel speeds Vl, Vr of the left and right wheels, said wheel speeds having been detected by the corresponding wheel speed sensors 19, are inputted to the control unit 18 as shown by way of example in FIG. 7 (Step A1). A vehicle body speed VB is then determined at the simulated vehicle body speed computing unit 216 of the control unit 18 (Step A2). Further, a torque amount DT (=Tr−Tl) desired to be transferred is set (Step A3).

At the slip judgment unit 18B, a slip ratio SL is determined from the wheel speeds Vl, Vr and the vehicle body speed VB in accordance with the formula (1A) or (1B), and the slip ratio SL is compare with the threshold value $SL_0$ to judge whether any wheel (tire) is in a state of slipping or not (Step A4). If $SL < SL_0$, the tire is judged not to be in a state of slipping. If $SL \geq SL_0$, the tire is judged to be in a state of slipping.

If not in a state of slipping, the routine then advances to Step A5, where a control amount for the linear region is set by the control amount setting unit 18C. If in a state of slipping, the routine then advances to Step 6, where a control amount for the non-linear region is set by the control amount setting unit 18C.

Figure 8:
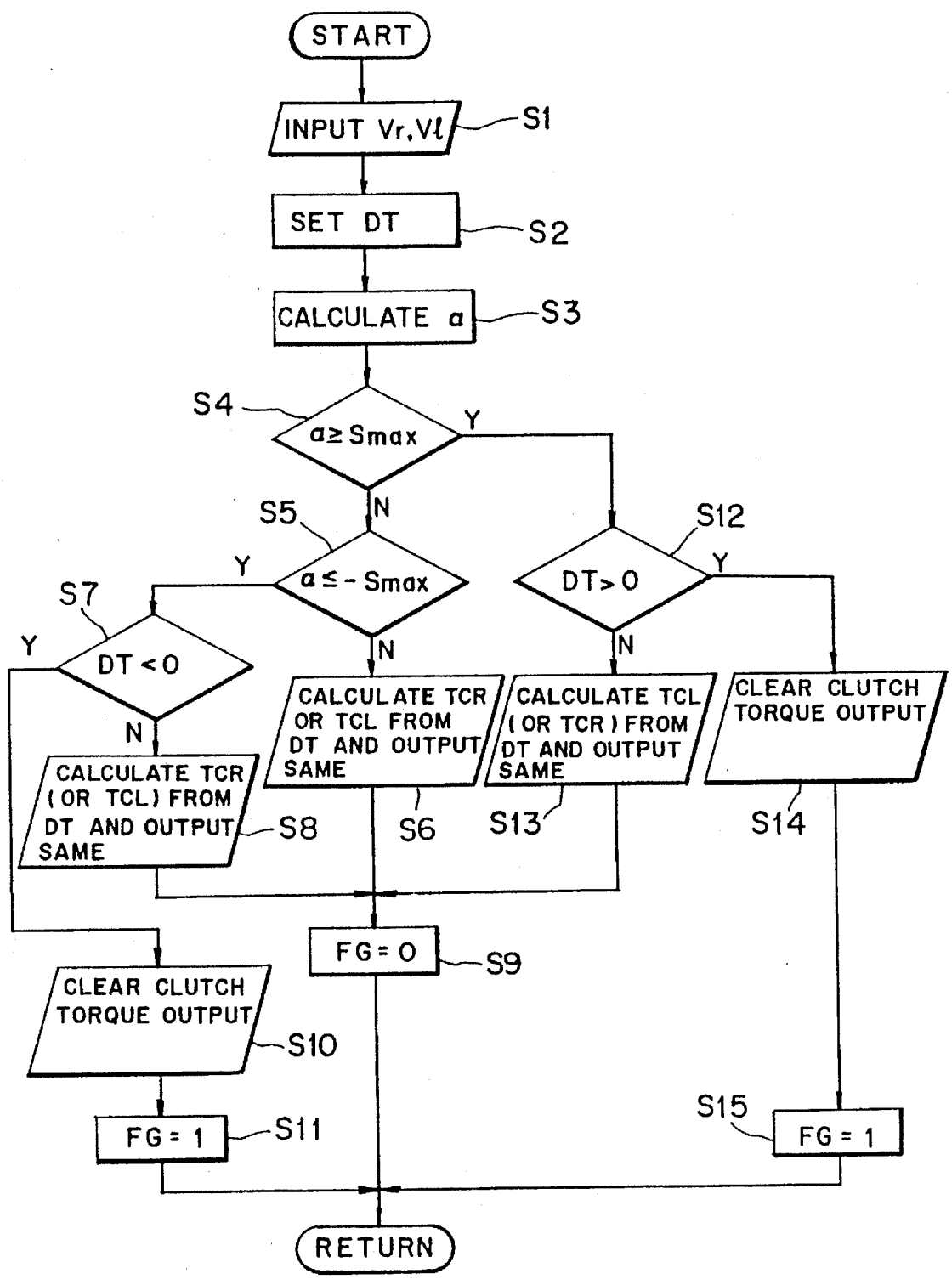
FIG. 8 is a flow chart depicting the details of control of the vehicular left/right drive torque adjusting apparatus according to the first embodiment of the present invention and the vehicular left/right drive torque adjusting method according to the first embodiment of the present invention.

The details of Step A5 will now be described specifically. As is illustrated in FIG. 8, for example, wheel speeds Vl, Vr of the left and right wheels, said wheel speeds having been detected by the corresponding wheel speed sensors 19, are inputted to the control unit 18 (Step S1). Then, a torque amount DT (=Tr−Tl) desired to be transferred is set at the control unit 18 (Step S2).

At the control unit 18, a left/right wheel speed ratio $\alpha$ is calculated from the wheel speeds Vl, Vr in accordance with the formula (1) (Step S3). This left/right wheel speed ratio $\alpha$ and the speed ratio Smax are compared to determine if the left/right wheel speed ratio $\alpha$ is greater than the speed ratio Smax (Step S4). If the left/right wheel speed ratio $\alpha$ is not equal to or greater than the speed ratio Smax, the routine advances to Step S5 to determine whether the left/right wheel speed ratio $\alpha$ is equal to or smaller than the speed ratio−Smax.

Where the left/right wheel speed ratio $\alpha$ is not equal to or greater than the speed ratio Smax and is not equal to or smaller than the speed ratio−Smax, the routine advances to Step S6 in which, from DT described above, right-wheel clutch torque TCR or left-wheel clutch torque TCL is calculated and outputted. Namely, the left-wheel clutch torque TCL=(1−Smax)DT alone is outputted when DT>0, neither clutch torques are outputted when DT=0, and the right-wheel clutch torque TCR=−(1−Smax) alone is outputted when DT<0.

The routine next advances to Step S9, where a torque transfer control inhibition flag FG is set at 0. This torque transfer control inhibition flag FG is set at 1 where torque transfer control is inhibited but at 0 where torque transfer control is not inhibited. This flag FG is also used in other running controls available for the vehicle.

When the left/right wheel speed ratio α is judged equal to or smaller than −Smax in Step S5, the rotational speed of the left wheel is higher than that of the right wheel so that torque cannot be transferred from the side of the right wheel to the left wheel. The routine therefore advances to Step S7, where it is determined if the torque amount DT desired to be transferred is negative, in other words, if it is desired to transfer torque from the side of the right wheel to the side of the left wheel.

Unless DT is negative, the control is either not to perform any torque transfer (this corresponds to DT=0) or to perform transfer of torque from the side of the left wheel to the side of the right wheel. Since this control is feasible, the routine advances from Step S7 to Step S8 so that the right-wheel clutch torque TCR=(1−Smax)DT alone is outputted and the left-wheel clutch torque TCL is set at 0. The routine then advances to Step S9, where the torque transfer control inhibition flag FG is set at 0.

If DT is negative, it is impossible to transfer torque from the side of the right wheel to the side of the left wheel. The routine therefore advances from Step S7 to Step S10, in which the outputs of the left-wheel and right-wheel clutch torques are cleared. In other words, control signals are outputted to reduce both left-wheel and right-wheel clutch torques TCL, TCR to 0. The routine then advances to Step S11, where the torque transfer control inhibition flag FG is set at 1.

When the left/right wheel speed ratio α is equal to or greater than the speed ratio Smax, on the other hand, the routine advances from Step S4 to Step S12, where a judgment is made to determine if the torque amount DT desired to be transferred is positive, in other words, if it is desired to transfer torque from the side of the left wheel to the side of the right wheel.

When DT is not positive, the control is either not to perform any torque transfer (this corresponds to DT=0) or to perform transfer of torque from the side of the right wheel to the side of the left wheel. Since this control is feasible, the routine advances from Step S12 to Step S13 so that the left-wheel clutch torque TCL=−(1−Smax)DT alone is outputted and the right-wheel clutch torque TCR is set at 0. The routine then advances to Step S9, where the torque transfer control inhibition flag FG is set at 0.

When DT is positive, it is impossible to transfer torque from the side of the left wheel to the side of the right wheel. The routine therefore advances from Step S12 to Step S14 and the outputs of the left-wheel and right-wheel clutch torques are cleared. Namely, a control signal is outputted to reduce both the left-wheel and right-wheel clutch torques TCL, TCR to 0. The routine then advances to Step S15, where the torque transfer control inhibition flag FG is set at 1.

As has been described above, during normal running in which the left/right wheel speed ratio α is equal not equal to or greater than the speed ratio Smax, the distribution of torque is adjusted by transferring a desired portion of the torque for one of the wheels to the other wheel instead of adjusting the distribution of torque by using energy loss such as a brake. It is therefore possible to distribute torque as desired without inducing significant torque loss or energy loss.

Upon transfer of drive torque, for example, from the side of the inner wheel to the side of the outer wheel during turning, the coupling of the multi-plate clutch mechanism 12 is released to stop the transfer of the drive torque when the rotational speed on the side of the outer wheel, at which it is desired to increase the torque, becomes higher than that on the side of the inner wheel at which it is desired to decrease the torque, in other words, when the left/right wheel speed ratio |α| becomes greater than the speed ratio Smax. It is hence possible to avoid such inconvenience that torque is transferred from the side of the outer wheel, at which it is desired to increase the torque, to the side of the inner wheel at which it is desired to decrease the torque.

Since the above inconvenience can be avoided without setting the speed ratio Smax at a large value, it is possible to minimize inconvenience such as deterioration of gas mileage, which would otherwise occur due to an increase in torque transmission loss or energy loss, and reduction of durability which would otherwise occur due to production of heat in an increased quantity by elements of devices such as multi-plate clutches.

On the other hand, torque can be transferred, for example, from the side of the outer wheel to the side of the inner wheel to promptly finish turning motion upon completion of turning. This transfer can be always performed even when the left/right wheel speed ratio |α| exceeds the speed ratio Smax. The first embodiment therefore has the advantage that transfer of torque can be controlled effectively for the improvement of the running performance of a vehicle.

In particular, the coupling of one of the multi-plate clutch mechanisms 12, said one multi-plate clutch mechanism 12 having a smaller difference in rotational speed between its clutch disks 12A and 12B (in other words, being on the side that the high/low relationship has bee reversed), is controlled at this time, thereby bringing about the advantage that the loss of torque transmission can be significantly reduced compared with the control of the coupling of the multi-plate clutch mechanism 12 on the side of a greater speed difference (in other words, on the side that the high/low relationship of their rotational speeds is not reversed).

On the other hand, the setting of a control amount for the non-linear region in Step A6 is conducted as will be described hereinafter. When DT>0, the right-wheel clutch torque TCR is set at C (C=Tmax, for example) and the left-wheel clutch torque TCL is set at 0, whereby only the clutch on the side of the right wheel is coupled. When DT=0, the left-wheel and right-wheel clutch torques TCL are both reduced to 0 so that neither left-wheel and right-wheel clutches are coupled. When DT<0, the left-wheel clutch torque TCR is set at 0 and the left-wheel clutch torque TCL is set at C, whereby only the left-wheel clutch is coupled.

After the setting of the control amount for the non-linear region, the routine advances to Step A7 and the torque transfer control inhibition flag FG is set at 0.

According to the principle that, in such a nonlinear region, the drive torque of a wheel is conversely reduced as the slip ratio S of the corresponding tire is increased and the drive torque of the wheel is increased as the slip ratio S of the corresponding tire is reduced, drive torques for the left and right wheels are controlled as will be described hereinafter.

When DT>0, in other words, when it is desired to transfer drive torque to the side of the right wheel, the right-wheel clutch torque TCR alone is applied to reduce the speed on the side of the right wheel. Since the reaction force from the road surface to the tire is relatively small, the speed on the side of the right wheel is decreased insofar as the clutch torque is equal to or greater than appropriate coupling force. As a result, the reaction force to the tire from the road surface is increased so that the amount of drive torque transmitted to the road surface on the side of the right wheel is increased.

When DT=0, no control is needed so that no control is performed.

When DT<0, in other words, when it is desired to transfer drive torque to the side of the left wheel, the left-wheel clutch torque TCL alone is applied to reduce the speed on the side of the left wheel. Since the reaction force to the tire from the road surface is relatively small at this time as in the above-described case, the speed on the side of the left wheel is decreased insofar as the clutch torque is equal to or greater than appropriate coupling force. As a result, the reaction force to the tire from the road surface is increased so that the amount of drive torque transmitted to the road surface on the side of the left wheel is increased.

As has been described above, the apparatus of this embodiment makes it possible to control the left/right distribution of torque as desired without being affected by the friction coefficient μ of the running road surface or the state of acceleration, thereby contributing to an improvement in the moving performance of a vehicle such as the turning performance and also to an improvement in the running stability of the vehicle.

In the first embodiment described above, the drive torque is adjusted upon setting a control amount for the linear region when the left/right wheel speed ratio is equal to or greater than a predetermined value, that is, the formula (2) is met and further when each of the multi-plate clutch mechanisms 12, 12 can achieve transmission of torque in a desired direction, that is, when it is attempted to perform transmission of torque from the side of the outer wheel to the side of the inner wheel. Where the left/right wheel speed ratio is greater than the predetermined value (Smax<|α|), it is also possible to set TCR=0 and TCL=0 to stop the entire control.

Figure 9:
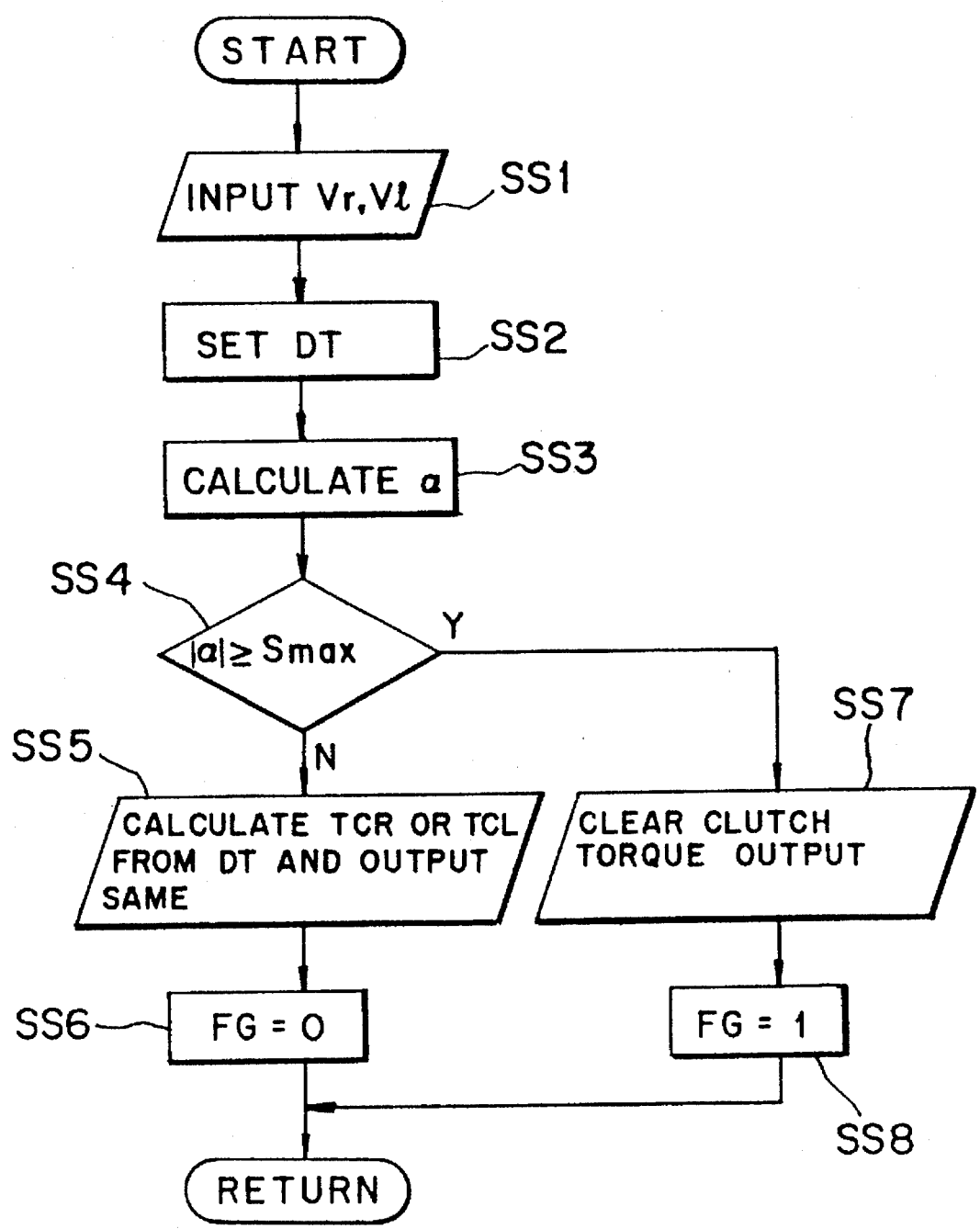
FIG. 9 is a flow chart depicting the details of control of the vehicular left/right drive torque adjusting apparatus according to the first embodiment of the present invention and a modification of the vehicular left/right drive torque adjusting method according to the first embodiment of the present invention.

In this case, setting of a control amount is conducted, for example, as illustrated in FIG. 9. Namely, wheel speed Vl, Vr of the left and right wheels, which have been detected by the corresponding wheel speed sensors 19, are inputted to the control unit 18 (Step SS1). At the control unit 18, a torque amount DT (=Tr−Tl) desired to be transferred is set (Step SS2). Further, the left/right wheel speed ratio α is then calculated from the wheel speeds Vl, Vr in accordance with the above formula (1) (Step SS3). The magnitude |α| of the left/right wheel speed ratio |α| is then compared with the speed ratio Smax (Step SS4). If the magnitude |α| of the left/right wheel speed ratio α is not equal to or greater than the speed ratio Smax, the routine advances to Step SS5. If the magnitude |α| of the left/right wheel speed ratio α is equal to or greater than the speed ratio Smax, the routine advances to Step SS7.

At Step SS5, the right-wheel clutch torque TCR or above-described DT and is outputted. Namely, when D>0, only the left-wheel clutch torque TCL=(1−Smax)DT is outputted. When DT=0, neither clutch torques are outputted. When DT<0, only the right-wheel clutch torque TCR=−(1−Smax)DT is outputted.

The routine then advances to Step SS6, where the torque transfer control inhibition flag FG is set at 0. This torque transfer control inhibition flag FG is set at 1 in a state where torque transfer control is inhibited but is set at 0 in a state where torque transfer control is not inhibited. This flag can also be employed for other running controls available for the vehicle.

When the routine advances to Step SS7, on the other hand, the outputs of the left-wheel and right-wheel clutch torques are cleared. In other words, a control signal is outputted to reduce both the left-wheel and right-wheel clutch torques TCL, TCR to 0.

The routine then advances to Step SS8, in which the torque transfer control inhibition flag FG is set at 0.

In the manner described above, it is possible, as in the first embodiment, to avoid the inconvenience that torque is transferred from the side of the outer wheel to the inner wheel although it is desired to increase the torque on the side of the outer wheel and to decrease the torque on the side of the inner wheel. Compared with the first embodiment, this modification of course involves more operations which are not subjected to the control. This modification however has the advantage that the control is simpler.

Figure 10:
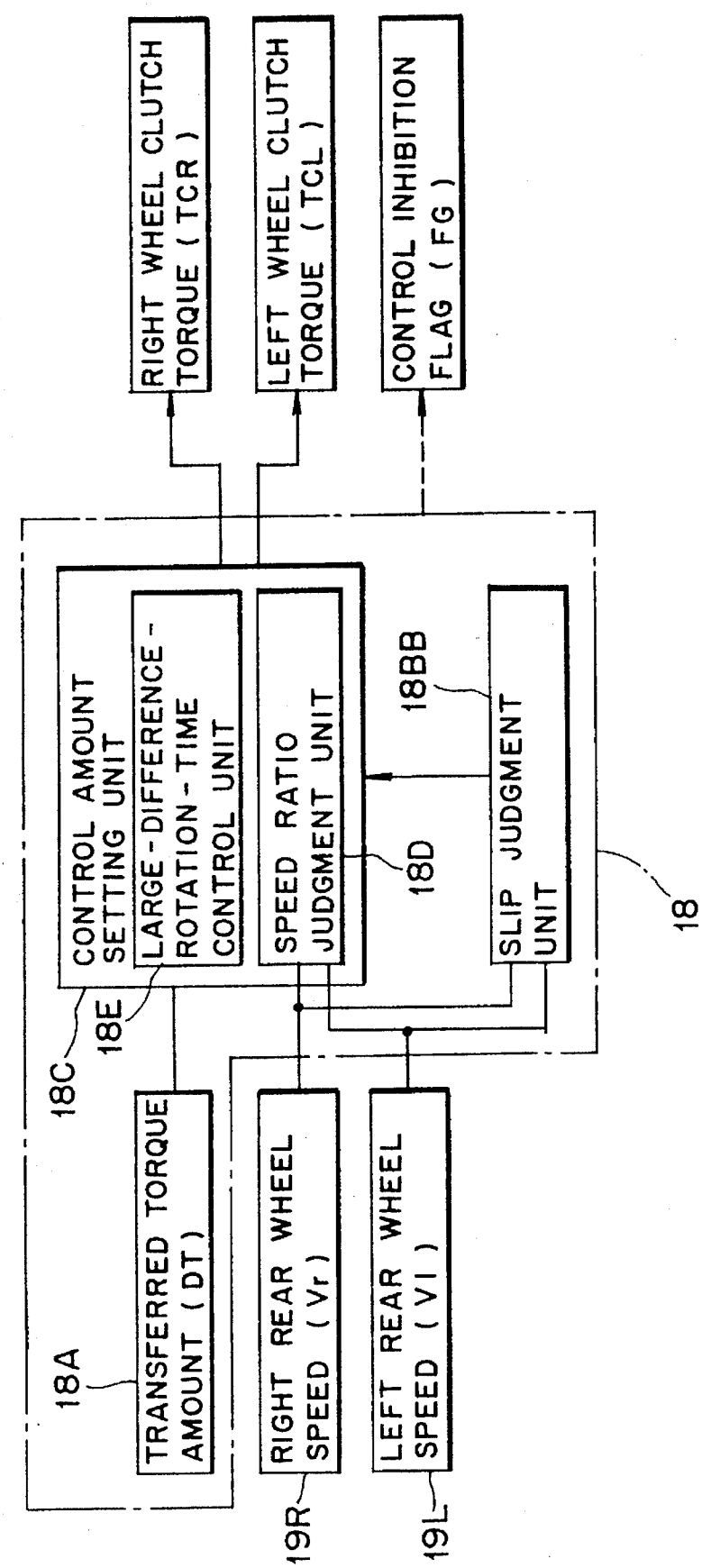
FIG. 10 is a schematic fragmentary block diagram showing a modification of the control system of the vehicular left/right drive torque adjusting apparatus according to the first embodiment of the present invention, said modification being useful in the practice of the vehicular left/right drive torque adjusting method according to the first embodiment of the present invention.

The slip judgment unit 18B can be constructed like a slip judgment unit 18BB shown in FIG. 10, thereby making it possible to determine based solely upon the wheel speeds Vl, Vr of the left and right whether any wheel is in a state of slipping.

In FIG. 10, a state of slipping of any wheel is determined on the basis of the state of differential motion in one of the left and right, hydraulic multi-plate clutch mechanisms 12, said one clutch mechanism being on the side where transmission of drive torque is being performed, instead of the wheel speeds Vl, Vr of the left and right wheels.

The hydraulic multi-plate clutch mechanism 12 which is performing the control of drive torque transmission is generally coupled by torque relatively small compared with resistance to the associated tire from the road surface, so that the control can be effected while sliding the clutch plates 12A and 12B against each other. Except for the case that the difference in rotational speed between the clutch plates 12A and 12B becomes smaller due to the development of differential motion between the left and right wheels upon turning or the like, the clutch plates 12A and 12B produce at least a certain level of differential motion therebetween on the ordinary road surface.

If the road is a low μ road and the tires tend to slip, the resistance to the tire from the road surface is substantially decreased so that, even when the clutch is coupled by relatively small torque, the clutch plates 12A and 12B may be locked (or brought into a state close to a locked state) and the wheel may slip against the road surface.

Except for the time of turning of the vehicle, the wheel is determined to be slipping when the differential motion between the clutch plates 12A and 12B in the hydraulic multi-plate clutch mechanism 12 on the side where transmission of torque force is being controlled becomes substantially 0. Since the rotational speeds of the clutch plates 12A, 12B are either equal or proportional to the rotational speeds of the left and right wheels, respectively, detection values of the corresponding wheel speed sensors 19 are used as the rotational speeds of the clutch plates 12A, 12B.

Whether the vehicle is turning or not can however be determined depending upon whether a steering angle δ is greater than a reference value b or not.

Further, whether the control of torque transmission is under way or not is determined depending upon whether clutch torque is applied or not, namely, whether the right-wheel clutch torque TCR is applied or not or whether the left-wheel clutch torque TCL is applied. In this embodiment, it is determined depending upon whether TCR is not substantially 0 or TCL is not substantially 0. The determination as to whether TCR or TCL is not substantially 0 can be expressed by the following inequality: $TCR > T_0$ or $TCL > T_0$, where $T_0$ is a value close to 0.

The determination as to whether the differential motion between the clutch plates 12A and 12B is substantially 0 or not can be expressed by the following inequality: $DVR > a$ or $DVL > a$, where DVR means differential motion in the hydraulic multi-plate clutch mechanism 12 on the side of the right wheel, DVL denotes differential motion in the hydraulic multi-plate clutch mechanism 12 on the side of the left wheel, and a is a threshold value close to 0. DVR and DVL are calculated from detection values of the corresponding wheel speed sensors 19.

In the manner described above, whether a wheel is slipping or not can also be determined depending upon whether the differential motion between the corresponding clutch plates 12A and 12B has become substantially to 0.

Figure 11:
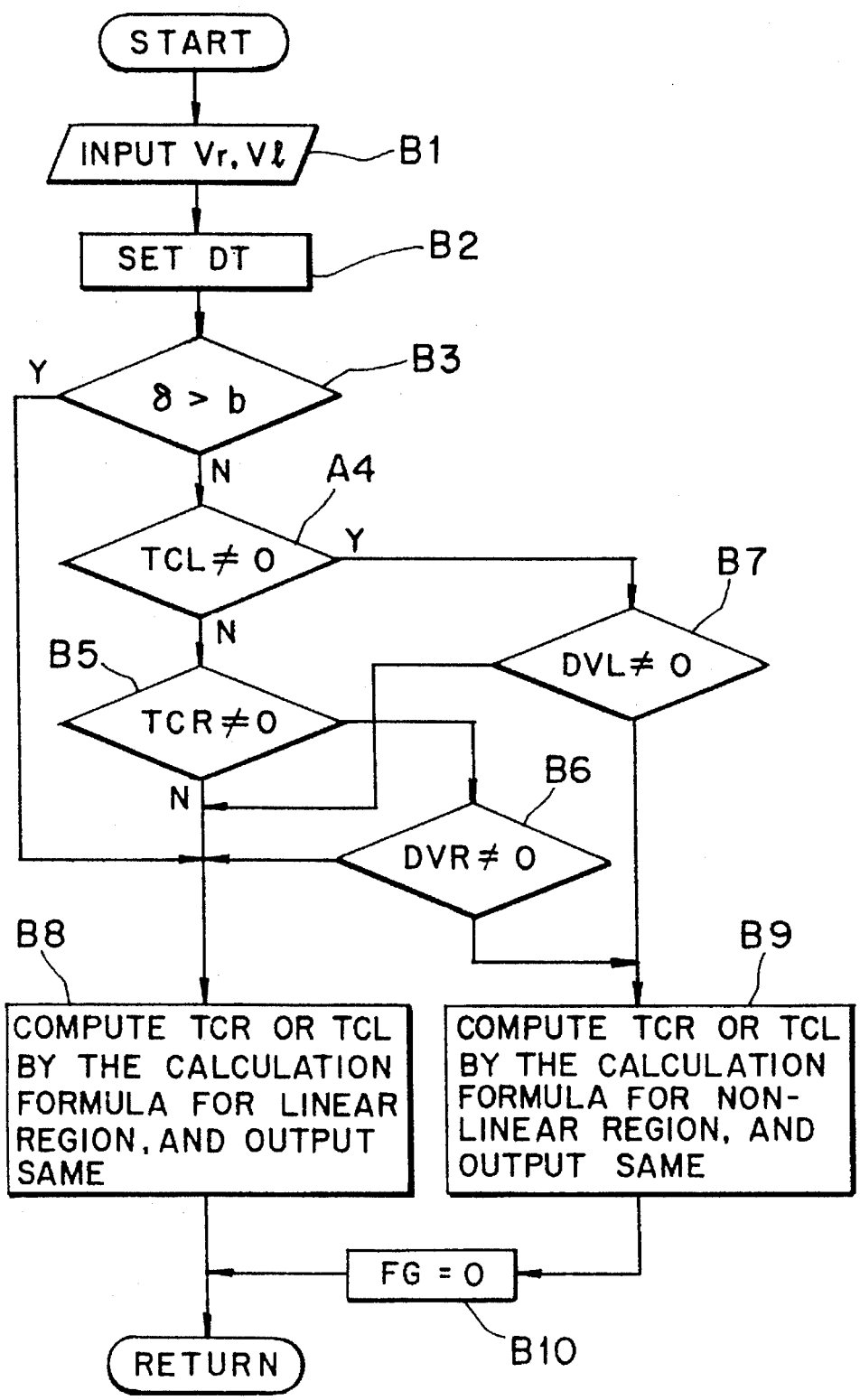
FIG. 11 is a flow chart showing the details of control of the vehicular left/right drive torque adjusting apparatus according to the first embodiment of the present invention and another modification of the vehicular left/right drive torque adjusting method according to the first embodiment of the present invention.

When the slip judgment unit 18BB is constructed as described above, wheel speeds Vl, Vr detected by the corresponding wheel speed sensors 19 are inputted to the control unit 18 as shown, for example, in FIG. 11 (Step B1). A torque amount DT (=Tr−Tl) desired to be transferred is then set (Step B2).

In Steps B3 to B7, it is then determined by the slip judgment unit 18BB whether any wheel is slipping or not.

Namely, it is determined in Step B3 whether the steering angle δ is greater than the threshold value b or not. When the steering angle δ is determined greater than the threshold value b, the vehicle is making a turn. The routine then advances to Step B8 to perform the ordinary control (the control in the linear region).

When the steering angle δ does not exceed the threshold value b, the routine advances to Step B4, in which it is determined whether the left-wheel clutch torque TCL has been applied or not, that is, if TCL has not been reduced to about 0 (or $TCL > T_0$).

If TCL is not about 0 and the clutch torque TCL has been applied, the routine advances to Step B7, where it is determined whether the differential motion DVL in the left-wheel hydraulic multi-plate clutch mechanism 12 is not approximately 0 (or $DVL > a$). If the differential motion is not approximately 0, the associated wheel is determined not slipping so that the routine advances to Step B8 to perform control in the linear region. If the differential motion is conversely about 0, the associated wheel is determined slipping so that the routine advances to Step B9 to perform control in the non-linear region.. Incidentally, the differential amount DVL is calculated from a detection value of the corresponding wheel speed sensor 19.

When TCL is determined to be substantially 0 in Step B4, the routine advanced to Step 5 to determine whether the right-wheel clutch torque TCR has been applied or not, that is, if TCR has not been reduced to about 0 (or $TCL > T_0$).

When TCR is not substantially 0 and the clutch torque TCR has been applied, the routine advances to Step B6 to determine whether the differential motion in the right-wheel hydraulic multi-plate clutch mechanism 12 is not substantially 0 (or $DVR > a$). If the differential motion is not substantially 0, the wheel is determined not slipping so that the routine advances to Step B8 to perform control in the linear region. If the differential motion is about 0 conversely, the wheel is determined slipping so that the routine advances to Step B9 to perform control in the non-linear region. This differential amount DVL is calculated from a detection value of the corresponding wheel speed sensor 19.

The details of Steps B8 and B9 are similar to those of Steps A5 and A6 in the first embodiment. After the setting of the control amount for the nonlinear region, the routine advances to Step A10 to set the torque transfer control inhibition flag FG is set at 0.

Even when controlled as described above, the left/right torque distribution can be controlled as desired without being affected by the friction coefficient μ of the running road surface or the state of acceleration, thereby contributing to an improvement in the moving performance of a vehicle such as the turning performance and also to an improvement in the running stability of the vehicle.

Moreover, the slip judgment unit 18BB performs the control by using the speeds of the left and right wheels instead of the speed of the vehicle body as described above. No device is therefore needed for the detection or calculation of the speed of the vehicle body, thereby advantageously contributing to a reduction in cost.

Applications of the control according to the state of slipping of each wheel and the control when the magnitude of the left/right wheel speed ratio α has become greater than the predetermine value $α_0$ during turning of the vehicle, said controls being characteristic features of the apparatus and method according to the present invention, are not limited to the mechanism of the construction described above as the first embodiment. These controls can be applied widely to drive torque transmission apparatuses which can adjust drive torques for the left and right wheels by transferring drive torque between the left and right axles.

Therefore, based on the second to fourteenth embodiments, a description will hereinafter be made of drive torque transmission apparatuses to which the apparatus and method of the present invention can be applied.

Figure 12:
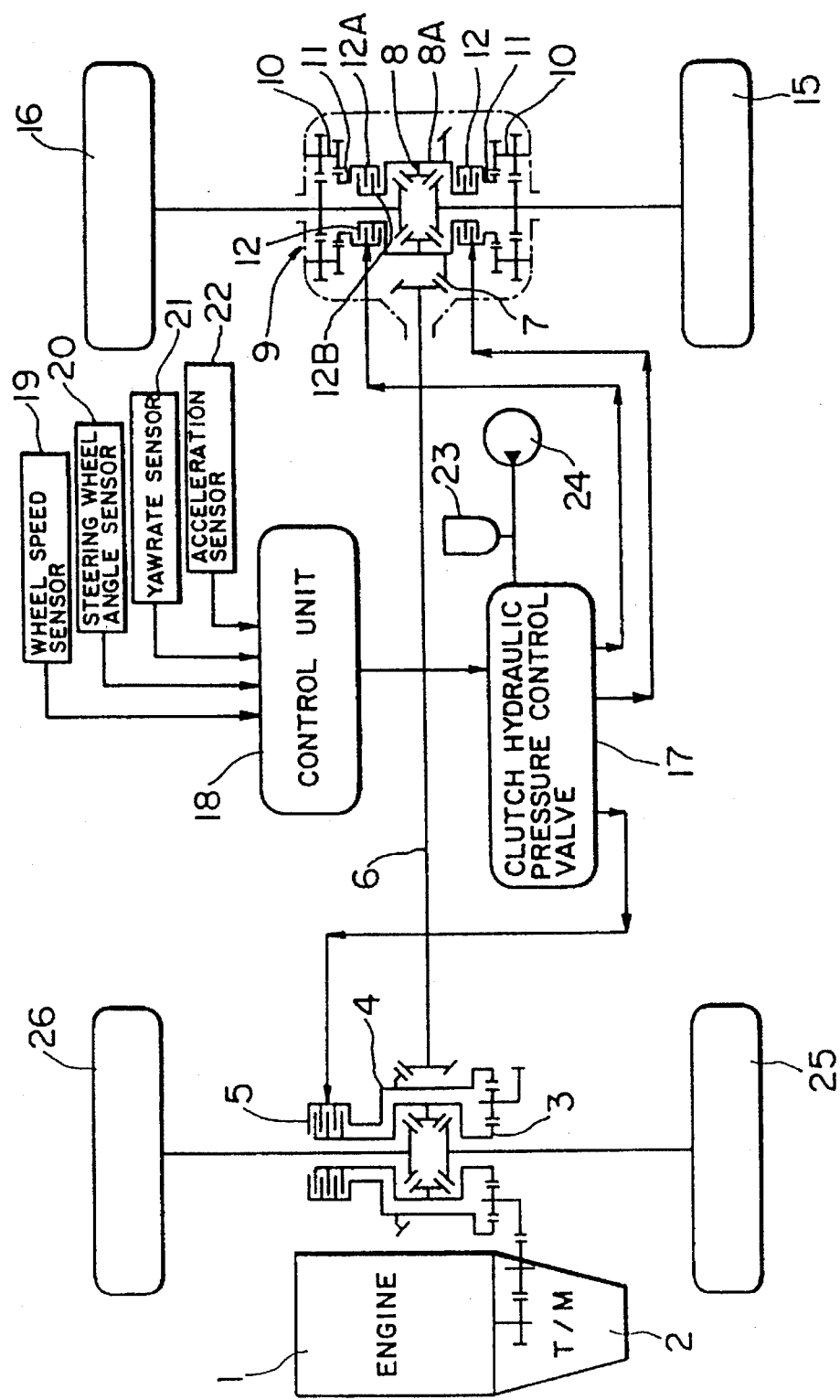
FIG. 12 is a schematic block diagram showing a drive system of an automotive vehicle equipped with a vehicular left/right drive torque adjusting apparatus which relates to a second embodiment of the present invention and is useful in the practice of a vehicular left/right drive torque adjusting method according to the second embodiment of the present invention.

The vehicle drive torque distribution control system according to the second embodiment will next be described. The overall construction of a drive system of an automobile equipped with the system is as shown in FIG. 12 and is hence similar to that described above in connection with the first embodiment shown in FIG. 1. Description of the overall construction is therefore omitted herein.

Figure 13:
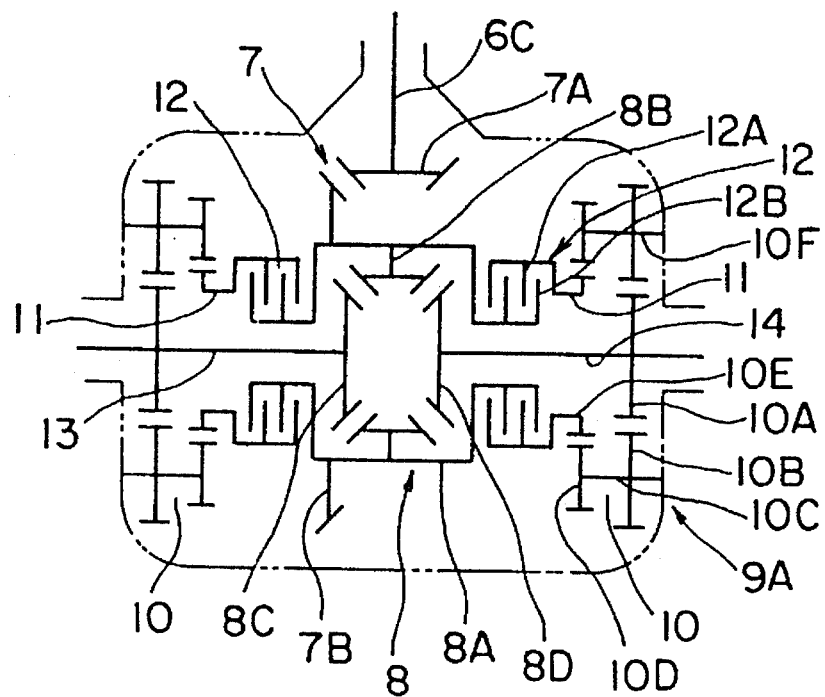
FIG. 13 is a schematic skeleton diagram depicting the vehicular left/right drive torque adjusting apparatus which relates to the second embodiment of the present invention and is useful in the practice of the vehicular left/right drive torque adjusting method according to the second embodiment of the present invention.

In a drive torque transmission control mechanism 9A, a speed change mechanism 10 is different from the corresponding element in the first embodiment as depicted in FIGS. 12 and 13. A first sun gear 10A is formed smaller in diameter than the second sun gear 10E so that the rotational speed of the second sun gear 10E is lower than that of the first sun gear 10A. The speed change mechanism 10 therefore functions as a speed reduction mechanism. During normal running in which the difference in rotational speed between the left and right wheels is small, the rotational speed of the clutch plates 12A is lower than that of the clutch plates 12B and, when the multi-plate clutch mechanism 12 is coupled, torque in an amount corresponding to the state of the coupling is fed additionally from the side of the input shaft 6C to the side of the right-wheel axle 14.

On the other hand, the speed change mechanism 10 and the multi-plate clutch mechanism 12, which are associated with the left-wheel axle 13, are constructed likewise. When it is desired to distribute more drive torque from the input shaft 6C to the left-wheel axle 13, the multi-plate clutch mechanism 12 on the side of the right-wheel axle 14 is suitably coupled in accordance with the desired amount of drive torque to be distributed (distribution ratio). When it is desired to distribute more to the right-wheel axle 14, the multi-plate clutch mechanism 12 on the side of the left-wheel axle 13 is suitably coupled in accordance with the desired distribution ratio.

Like the first embodiment, the multi-plate clutch mechanism 12 is of the hydraulically driven type. By adjusting the level of hydraulic pressure, the state of coupling of the multi-plate clutch mechanism 12 can be controlled so that the amount of drive torque to be fed from the input shaft 6C to the left-wheel axle 13 or the right-wheel axle 14 (namely, the left/right distribution ratio of drive torque) can be controlled at an appropriate level of accuracy.

Further, the control unit 18 is constructed as in the first embodiment (see FIG. 3) so that, when one of the wheels is in a state of slipping, the multi-plate clutch mechanism 12 which is not the multi-plate clutch mechanism 12 to be coupled fundamentally but is the multi-plate clutch mechanism 12 not to be coupled basically is coupled. When it is desired to distribute more torque to the left-wheel axle 14, the multi-plate clutch mechanism 12 on the side of the right-wheel axle 14 is basically supposed to be coupled. However, the multi-plate clutch mechanism 12 on the side of the left-wheel axle 13 is coupled. When it is desired to distribute more torque to the right-wheel axle 14, on the other hand, the multi-plate clutch mechanism 12 on the side of the left-wheel axle 13 is basically supposed to be coupled. However, the multi-plate clutch mechanism 12 on the side of the right-wheel axle 14 is coupled.

When the wheel is not in a state of slipping, the control unit 18 sets, as in the first embodiment, a torque amount DT (=Tr–Tl where Tr is right-wheel torque and Tl is left-wheel torque) desired to be transferred according to target torques for the left and right wheels, respectively. When the left/right wheel speed ratio is not greater than the predetermined value, the above-described states of coupling of the left and right multi-plate clutch mechanisms 12 are controlled in accordance with the torque amount DT desired to be transferred.

When the left/right wheel speed ratio increases beyond the predetermined value during turning of the vehicle, in other words, when the high/low relationship in rotational speed between the opposing clutch plates of the multi-plate clutch mechanism 12 changes, the control unit 18, as in the first embodiment, makes both the multi-plate clutch mechanisms 12,12 free. When it is possible to achieve transmission of torque in a desired direction by each of the multi-plate clutch mechanisms 12, 12, the control unit 18 controls the coupling of one of the multi-plate clutch mechanisms 12, said one multi-plate clutch mechanism having a smaller difference in speed between its clutch disks 12A and 12B, whereby the one multi-plate clutch mechanism is controlled to achieve the transmission of the torque.

Based on this embodiment, the conditional expression that the left/right wheel speed ratio is equal to or greater than a predetermined value will be derived.

First, the preset speed ratio of the planetary gear mechanism to achieve Smax will be derived with reference to the velocity diagrams of FIGS. 8 and 9. Incidentally, the speed ratio Smax can be defined as the ratio of a change $\Delta N$ in rotational speed on the output side (namely, on the side of each of the axles 13, 14) to a rotational speed Ni on the input side (namely, on the side of the differential case 8A) when the side of the clutch plates 12A and the clutch plates 12B have become equal to each other in speed (namely, Smax= $\Delta N/Ni$).

Figure 14:
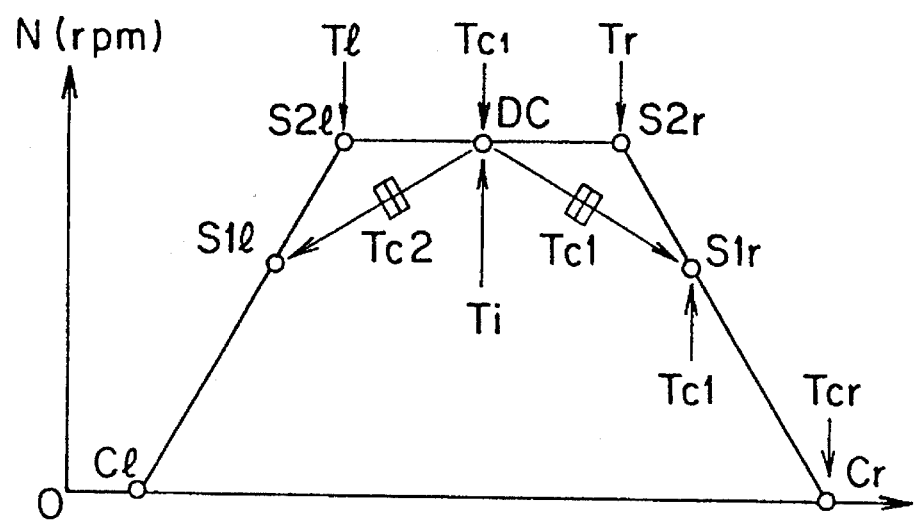
FIG. 14 is a speed diagram illustrating transmission of torque in the vehicular left/right drive torque adjusting apparatus which relates to the second embodiment of the present invention and is useful in the practice of the vehicular left/right drive torque adjusting method according to the second embodiment of the present invention.
Figure 15:
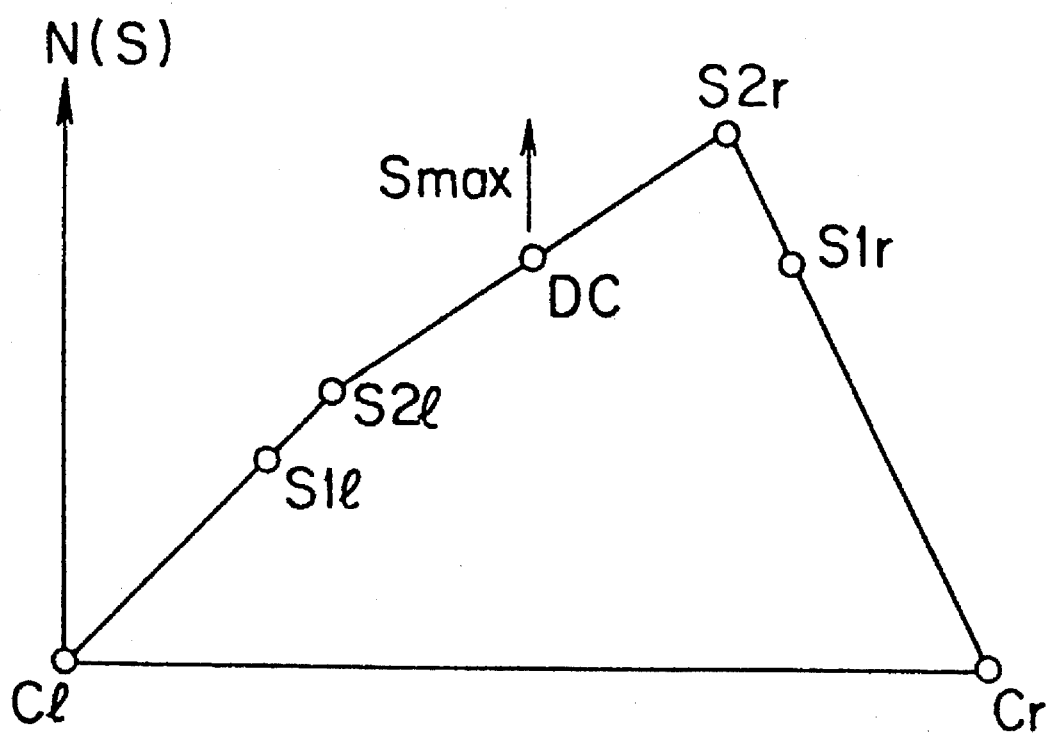
FIG. 15 is a speed diagram illustrating a specific example of torque transmission in the vehicular left/right drive torque adjusting apparatus which relates to the second embodiment of the present invention and is useful in the practice of the vehicular left/right drive torque adjusting method according to the second embodiment of the present invention.

In FIGS. 14 and 15, each symbol followed by "l" relates to the left wheel whereas each symbol followed by "r" pertains to the right wheel. Cl, Cr each represents the rotational speed of a carrier 10F and is 0 as the carrier 10F does not rotate here. S1l, S1r each stands for the rotational speed of the first sun gear 10A. S2l, S2r each indicates the rotational speed of the second sun gear 10E. Because the first sun gear 10A has a greater diameter than the second sun gear 10E, the rotational speeds S1l, S1r are lower than the rotational speeds S2l, S2r. Further, DC represents the rotational speed of the differential case 8A.

Further, $Z_1$ is the number of teeth of the second sun gear 10E, $Z_2$ the number of teeth of the first sun gear 10A, $Z_3$ the number of teeth of the planetary gear 10D, $Z_4$ the number of teeth of the planetary gear 10B, Ti the input torque to the differential case 8A, Tl, Tr the torques distributed to the left wheel and the right wheel, respectively, Tc1 the torque transmitted in the left direction when the multi-plate clutch mechanism 12 in the right-wheel-side drive torque transmission control mechanism 9B has been coupled, and Tc2 the torque transmitted in the right direction when the multi-plate clutch mechanism 12 in the left-wheel-side drive torque transmission control mechanism 9B has been coupled.

FIG. 14 illustrates a state in which the left and right wheels are rotating at the same speed, while FIG. 15 shows a state in which the multi-plate clutch mechanism 12 in the right-wheel-side drive torque transmission control mechanism 9A is fully coupled, the right wheel is restrained from rotation by the multi-plate clutch mechanism 12 and the rotational speed on the side of the right wheel is increased, and the rotational speed on the side of the left wheel is accordingly decreased.

The preset speed ratio of the planetary gear mechanism for achieving the above-described Smax (the speed ratio indicating the controllable left/right rotational speed difference range) will be derived.

This state of Smax is shown in FIG. 15. When the multi-plate clutch mechanism 12 is fully coupled, the rotational speed DC of the differential case 8A and the rotational speed S2r of the second sun gear 10E become equal to each other.

Accordingly, from FIG. 15, $$Z_3/Z_1 : Z_4/Z_2 = 1 : Smax + 1$$
$$\therefore Z_2 Z_3 / Z_1 Z_4 = 1/(Smax + 1)$$

As is understood from the foregoing, the speed ratio Smax indicating the controllable left/right rotational speed difference range is determined in accordance with the speed change ratio of the speed change mechanism 10 (namely, the preset gear ratio of the gears 10A, 10E, 10B and 10D).

If the left/right wheel speed ratio $\alpha$ is defined as the ratio of the wheel speed difference Vd [=(Vr–Vl)/2] to the average vehicle wheel speed Vav [=(Vr+Vl)/2] of the right wheel speed Vr and the left wheel speed Vl, the left/right wheel speed ratio $\alpha$ can be expressed as follows:

$$\alpha = Vd/Vav = [(Vr - Vl)/2]/[(Vr + Vl)/2] \quad (1)$$
$$= (Vr - Vl)/(Vr + Vl)$$

When the magnitude $|\alpha|$ of the left/right wheel speed ratio $\alpha$ exceeds the speed ratio Smax, the high/low relationship between the rotational speed on the side of the clutch plates 12A to that on the side of the clutch plates 12B in the multi-plate clutch mechanism 12 is reversed.

It is therefore possible to define as expressed by the following formula (2) that the magnitude of the left/right wheel speed ratio $\alpha$ is greater than the predetermined value $\alpha_0$:

$$Smax < |\alpha| \quad (2)$$

In the formula (1), the value of the speed ratio Smax is a constant value and can be calculated beforehand. The left/right wheel speed ratio |α| can be calculated from the rotational speeds Vl, Vr of the left and right wheels from time to time.

As the vehicular left/right drive torque adjusting apparatus according to the second embodiment of the present invention is constructed as described above, the distribution of torque during normal running where the magnitude |α| of the left/right wheel speed ratio is not greater than the speed ratio Smax is adjusted, as in the first embodiment, by transferring a desired portion of the torque for one of the wheels to the other wheel instead of adjusting the distribution torque by using energy loss such as a brake. It is therefore possible to distribute torque as desired without inducing significant torque loss or energy loss.

Upon transfer of drive torque, for example, from the side of the inner wheel to the side of the outer wheel during turning, the coupling of the multi-plate clutch mechanism 12 is released to stop the transfer of the drive torque when the rotational speed on the side of the outer wheel, at which it is desired to increase the torque, becomes higher than that on the side of the inner wheel at which it is desired to decrease the torque, in other words, when the left/right wheel speed ratio |α| becomes greater than the speed ratio Smax. It is hence possible to avoid such inconvenience that torque is transferred from the side of the outer wheel, at which it is desired to increase the torque, to the side of the inner wheel at which it is desired to decrease the torque.

Since the above inconvenience can be avoided without setting the speed ratio Smax at a large value, it is possible to minimize inconvenience such as deterioration of gas mileage, which would otherwise occur due to an increase in torque transmission loss or energy loss, and reduction of durability which would otherwise occur due to production of heat in an increased quantity by elements of devices such as multi-plate clutches.

On the other hand, torque can be transferred, for example, from the side of the outer wheel to the side of the inner wheel to promptly finish turning motion upon completion of turning. This transfer can be always performed even when the left/right wheel speed ratio |α| exceeds the speed ratio Smax. The second embodiment therefore has the advantage that transfer of torque can be controlled effectively for the improvement of the running performance of a vehicle.

In particular, the coupling of one of the multi-plate clutch mechanisms 12, said one multi-plate clutch mechanism 12 having a smaller difference in rotational speed between its clutch disks 12A and 12B (in other words, being on the side that the high/low relationship has been reversed), is controlled at this time, thereby bringing about the advantage that the loss of torque transmission can be significantly reduced compared with the control of the coupling of the multi-plate clutch mechanism 12 on the side of a greater speed difference (in other words, on the side that the high/low relationship of their rotational speeds is not reversed).

As in the first embodiment, the left/right torque distribution can be controlled as desired whether the tire characteristic is in the linear region or in the non-linear region, namely, without being affected by the friction coefficient μ of the running road surface or the state of acceleration, thereby contributing to an improvement in the moving performance of a vehicle such as the turning performance and also to an improvement in the running stability of the vehicle.

The vehicle drive torque distribution adjusting system according to the third embodiment will next be described.

The overall construction of a drive system of an automobile equipped with the system is substantially the same as that described above in connection with the first embodiment shown in FIG. 1. Description of the overall construction is therefore omitted herein.

Figure 16:
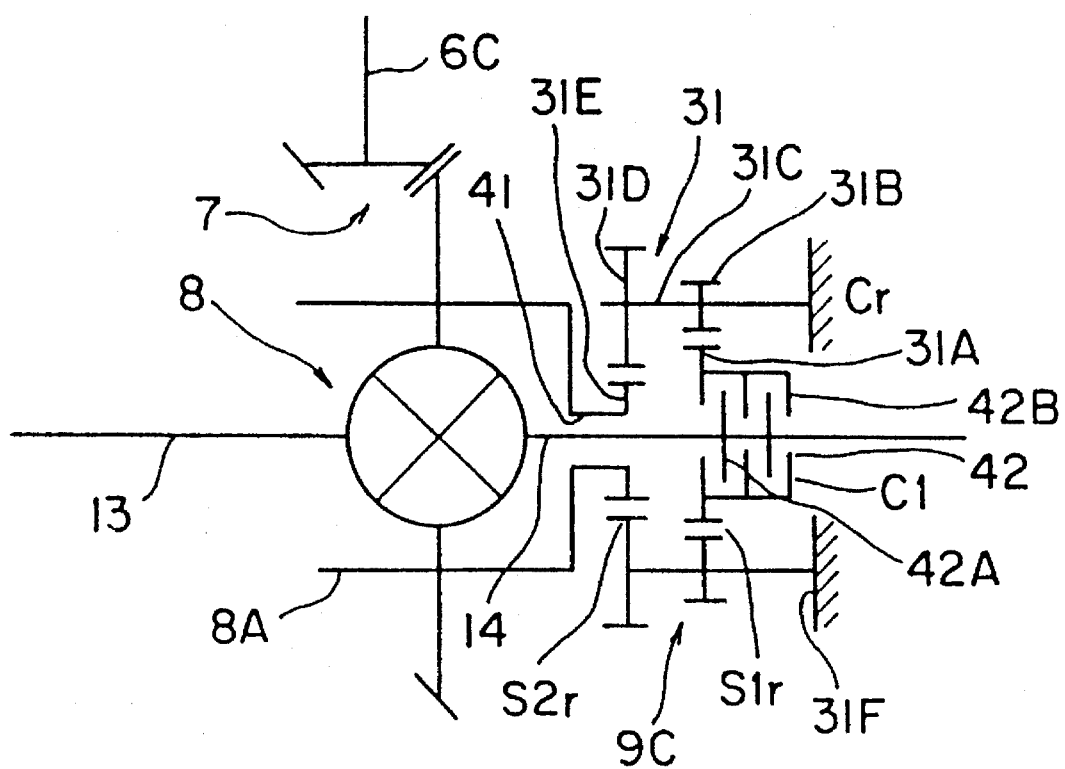
FIG. 16 is a schematic skeleton diagram depicting the vehicular left/right drive torque adjusting apparatus which relates to a third embodiment of the present invention and is useful in the practice of the vehicular left/right drive torque adjusting method according to the third embodiment of the present invention.

In the drive torque transmission control system 9C, a speed change mechanism 31 and a multi-plate clutch mechanism 42 are different from the corresponding elements in the first and third embodiments as depicted in FIG. 16. The right-hand drive torque transmission adjusting mechanism will also be described in this embodiment.

The speed change mechanism 31 is composed of two sets of linear planetary gear mechanisms disposed on left and right sides of the differential case 8A on the side of the input shaft 6C. Each linear planetary gear mechanism comprises a first sun gear 31A, a second sun gear 31E, a first planetary gear 31B, a second planetary gear 31D, a pinion shaft 31C, and a planetary carrier 31F. A plate portion of the first sun gear 31A serves as the auxiliary transmission member 41 for drive torque.

The multi-plate clutch mechanism 42 is interposed between the auxiliary drive torque transmission member 41 and the right-wheel axle 14. This multi-plate clutch mechanism 42 comprises clutch plates 42A on the side of the right-wheel axle 14 and clutch plates 42B on the side of the auxiliary drive torque transmission member 41, said clutch plates 42A and said clutch plates 42B being disposed alternately. In accordance with hydraulic pressure fed from an unillustrated hydraulic pressure system, the state of coupling of the multi-plate clutch mechanism is controlled.

When the multi-plate clutch mechanism 42 is coupled, a drive torque transmission train is established extending from the side of the right-wheel axle 14 to the differential case 8A on the side of the input shaft 6C via the multi-plate clutch mechanism 42, the first sun gear 31A, the first planetary gear 31B, the second planetary gear 31D and the second sun gear 31E.

Since the first sun gear 31A is formed greater in diameter than the second sun gear 31E, the rotational speed of the second sun gear 31E becomes higher than that of the first sun gear 31A. The speed change mechanism 31 therefore functions as a speed reduction mechanism that makes the auxiliary drive torque transmission member 41 slower than the side of the input shaft 6C.

Accordingly, the rotational speed of the clutch plates 42A is higher than that of the clutch plates 42B and, when the multi-plate clutch mechanism 42 is coupled, torque in an amount corresponding to the state of the coupling is fed (returned) from the side of the right-wheel axle 14 to the side of the input shaft 6C.

On the other hand, the speed change mechanism 31 and the multi-plate clutch mechanism 42, which are associated with the left-wheel axle 13, are constructed likewise. When it is desired to distribute more drive torque from the input shaft 6C to the left-wheel axle 13, the multi-plate clutch mechanism 42 on the side of the right-wheel axle 14 is suitably coupled in accordance with the desired amount of drive torque to be distributed (distribution ratio). When it is desired to distribute more to the right-wheel axle 14, the multi-plate clutch mechanism 42 on the side of the left-wheel axle 13 is suitably coupled in accordance with the desired distribution ratio.

The multi-plate clutch mechanism 42 is of the hydraulically driven type. By adjusting the level of hydraulic pressure, the state of coupling of the multi-plate clutch mechanism 42 can be controlled so that the amount of drive torque to be fed from the input shaft 6C to the left-wheel axle 13 or the right-wheel axle .14 (namely, the left/right distribution ratio of drive torque) can be controlled at an appropriate level of accuracy.

Further, the left and right multi-plate clutch mechanisms 42 are designed in such a manner that they are not fully coupled at the same time. When one of the left and right multi-plate clutch mechanisms 42 is fully coupled, the other multi-plate clutch mechanism 42 thus undergoes slipping.

Further, the control unit 18 is constructed as in the first embodiment (see FIG. 3) so that, when one of the wheels is in a state of slipping, the multi-plate clutch mechanism 42 which is not the multi-plate clutch mechanism 42 to be coupled fundamentally but is the multi-plate clutch mechanism 42 not to be coupled basically is coupled.

When the wheel is not in a state of slipping, the control unit 18 sets, as in the first embodiment, a torque amount DT desired to be transferred according to target torques for the left and right wheels, respectively. When the left/right wheel speed ratio is not greater than the predetermined value, the above-described states of coupling of the left and right multi-plate clutch mechanisms 42 are controlled in accordance with the torque amount DT desired to be transferred.

When the left/right wheel speed ratio increases beyond the predetermined value during turning of the vehicle, the control unit 18, as in the first embodiment, makes both the multi-plate clutch mechanisms 42, 42 free. When it is possible to achieve transmission of torque in a desired direction by each of the multi-plate clutch mechanisms 42, 42, the control unit 18 controls the coupling of one of the multi-plate clutch mechanisms 42, said one multi-plate clutch mechanism having a smaller difference in speed between its clutch disks 42A and 42B, whereby the one multi-plate clutch mechanism is controlled to achieve the transmission of the torque.

As the vehicular left/right drive torque adjusting apparatus according to the third embodiment of the present invention is constructed as described above, the distribution of torque during normal running where the magnitude |α| of the left/right wheel speed ratio α is not greater than the speed ratio Smax is adjusted, as in the above-described embodiments, by transferring a desired portion of the torque for one of the wheels to the other wheel instead of adjusting the distribution of torque by using energy loss such as a brake. It is therefore possible to distribute torque as desired without inducing significant torque loss or energy loss.

Upon transfer of drive torque, for example, from the side of the inner wheel to the side of the outer wheel during turning, the coupling of the multi-plate clutch mechanism 42 is released to stop the transfer of the drive torque when the rotational speed on the side of the outer wheel, at which it is desired to increase the torque, becomes higher than that on the side of the inner wheel at which it is desired to decrease the torque, in other words, when the left/right wheel speed ratio |α| becomes greater than the speed ratio Smax. It is hence possible to avoid such inconvenience that torque is transferred from the side of the outer wheel, at which it is desired to increase the torque, to the side of the inner wheel at which it is desired to decrease the torque.

Since the above inconvenience can be avoided without setting the speed ratio Smax at a large value, it is possible to minimize inconvenience such as deterioration of gas mileage, which would otherwise occur due to an increase in torque transmission loss or energy loss, and reduction of durability which would otherwise occur due to production of heat in an increased quantity by elements of devices such as multi-plate clutches.

On the other hand, torque can be transferred, for example, from the side of the outer wheel to the side of the inner wheel to promptly finish turning motion upon completion of turning. This transfer can be always performed even when the left/right wheel speed ratio |α| exceeds the speed ratio Smax. The first embodiment therefore has the advantage that transfer of torque can be controlled effectively for the improvement of the running performance of a vehicle.

In particular, the coupling of one of the multi-plate clutch mechanisms 42, said one multi-plate clutch mechanism 42 having a smaller difference in rotational speed between its clutch disks 42A and 42B (in other words, being on the side that the high/low relationship has been reversed), is controlled at this time, thereby bringing about the advantage that the loss of torque transmission can be significantly reduced compared with the control of the coupling of the multi-plate clutch mechanism 42 on the side of a greater speed difference (in other words, on the side that the high/low relationship of their rotational speeds is not reversed).

Similarly to the first embodiment, the apparatus of this embodiment makes it possible to control the left/right distribution of torque as desired whether the tire characteristic is in the linear region or in the non-linear region, that is, without being affected by the friction coefficient μ of the running road surface or the state of acceleration, thereby contributing to an improvement in the moving performance of a vehicle such as the turning performance and also to an improvement in the running stability of the vehicle.

The fourth embodiment will next be described. The overall construction of a drive system of an automobile equipped with the system is substantially the same as that described above in connection with the first embodiment shown in FIG. 1. Description of the overall construction is therefore omitted herein.

Figure 17:
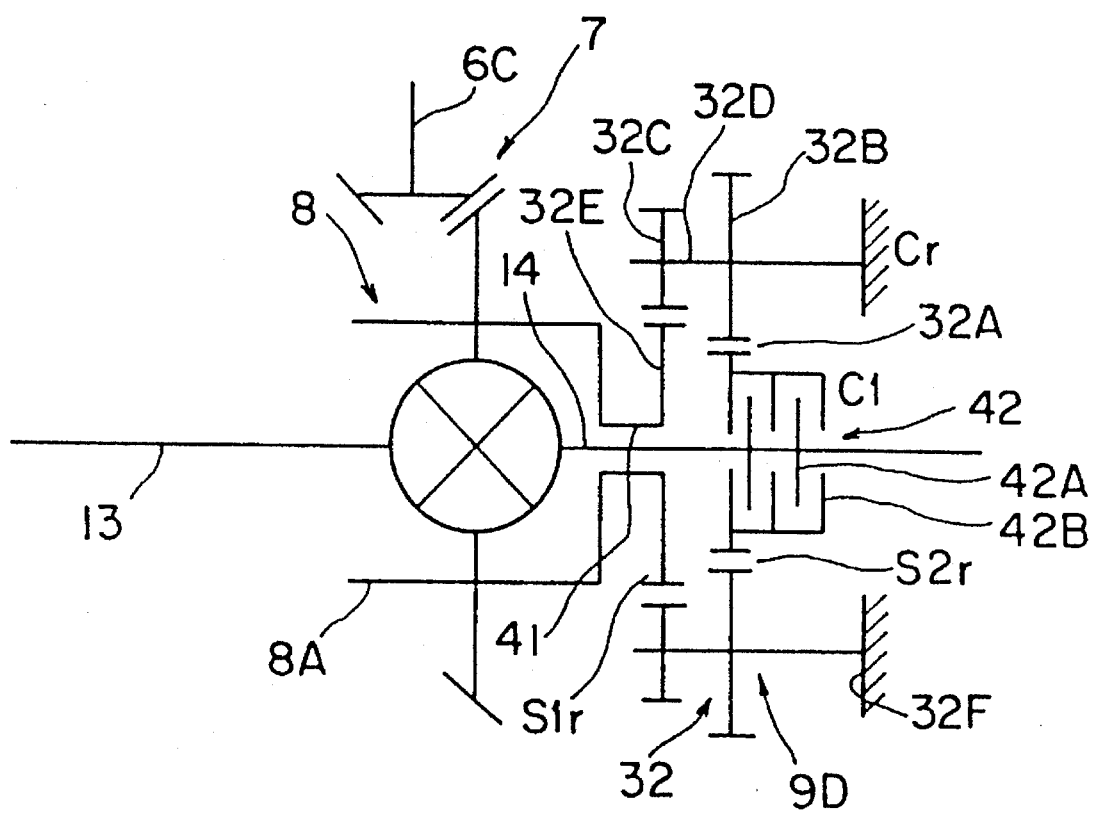
FIG. 17 is a schematic skeleton diagram depicting the vehicular left/right drive torque adjusting apparatus which relates to a fourth embodiment of the present invention and is useful in the practice of the vehicular left/right drive torque adjusting method according to the fourth embodiment of the present invention.

In its drive torque transmission control system 9D, a speed change mechanism 32 and the multi-plate clutch mechanism 42 are arranged substantially as in the third embodiment as illustrated in FIG. 17. A first sun gear 32A is however formed smaller in diameter than the second sun gear 32E in this embodiment, whereby the rotational speed of the second sun gear 32E becomes lower than that of the first sun gear 32A. The speed change mechanism 32 therefore functions as a speed acceleration mechanism that makes the auxiliary drive torque transmission member 41 faster than the side of the input shaft 6C.

Accordingly, the rotational speed of the clutch plates 42A is lower than that of the clutch plates 42B and, when the multi-plate clutch mechanism 42 is coupled, torque in an amount corresponding to the state of the coupling is fed from the side of the input shaft 6C to the side of the right-wheel axle shaft 14.

On the other hand, the speed change mechanism 32 and the multi-plate clutch mechanism 42, which are associated with the left-wheel axle 13, are constructed likewise. When it is desired to distribute more drive torque from the input shaft 6C to the left-wheel axle 13, the multi-plate clutch mechanism 42 on the side of the left-wheel axle 13 is suitably coupled in accordance with the desired amount of drive torque to be distributed (distribution ratio). When it is desired to distribute more to the right-wheel axle 14, the multi-plate clutch mechanism 42 on the side of the right-wheel axle 14 is suitably coupled in accordance with the desired distribution ratio.

Since the multi-plate clutch mechanism 42 is of the hydraulically driven type, the state of coupling of the multi-plate clutch mechanism 42 can be controlled by adjusting the level of hydraulic pressure. The amount of drive torque to be fed from the input shaft 6C to the left-wheel axle 13 or the right-wheel axle 14 (namely, the left/right distribution ratio of drive torque) can be controlled at an appropriate level of accuracy.

Further, the left and right multi-plate clutch mechanisms 42 are designed in such a manner that they are not fully coupled at the same time. When one of the left and right multi-plate clutch mechanisms 42 is fully coupled, the other multi-plate clutch mechanism 42 thus undergoes slipping.

Further, the control unit 18 is constructed as in the first embodiment (see FIG. 3) so that, when one of the wheels is in a state of slipping, the multi-plate clutch mechanism 42 which is not the multi-plate clutch mechanism 42 to be coupled fundamentally but is the multi-plate clutch mechanism 42 not to be coupled basically is coupled.

When the wheel is not in a state of slipping, the control unit 18 sets, as in the first embodiment, a torque amount DT desired to be transferred according to target torques for the left and right wheels, respectively. When the left/right wheel speed ratio is not greater than the predetermined value, the above-described states of coupling of the left and right multi-plate clutch mechanisms 42 are controlled in accordance with the torque amount DT desired to be transferred.

When the left/right wheel speed ratio increases beyond the predetermined value during turning of the vehicle, the control unit 18, as in the first embodiment, makes both the multi-plate clutch mechanisms 42, 42 free. When it is possible to achieve transmission of torque in a desired direction by each of the multi-plate clutch mechanisms 42, 42, the control unit 18 controls the coupling of one of the multi-plate clutch mechanisms 42, said one multi-plate clutch mechanism having a smaller difference in speed between its clutch disks 42A and 42B, whereby the one multi-plate clutch mechanism is controlled to achieve the transmission of the torque.

Since the vehicular left/right drive torque adjusting apparatus according to the fourth embodiment of the present invention is constructed as described above, it can bring about similar advantages to the respective embodiments described above.

The fifth embodiment will next be described. The overall construction of a drive system of an automobile equipped with the system is substantially the same as that described above in connection with the first embodiment shown in FIG. 1. Description of the overall construction is therefore omitted herein.

Figure 18:
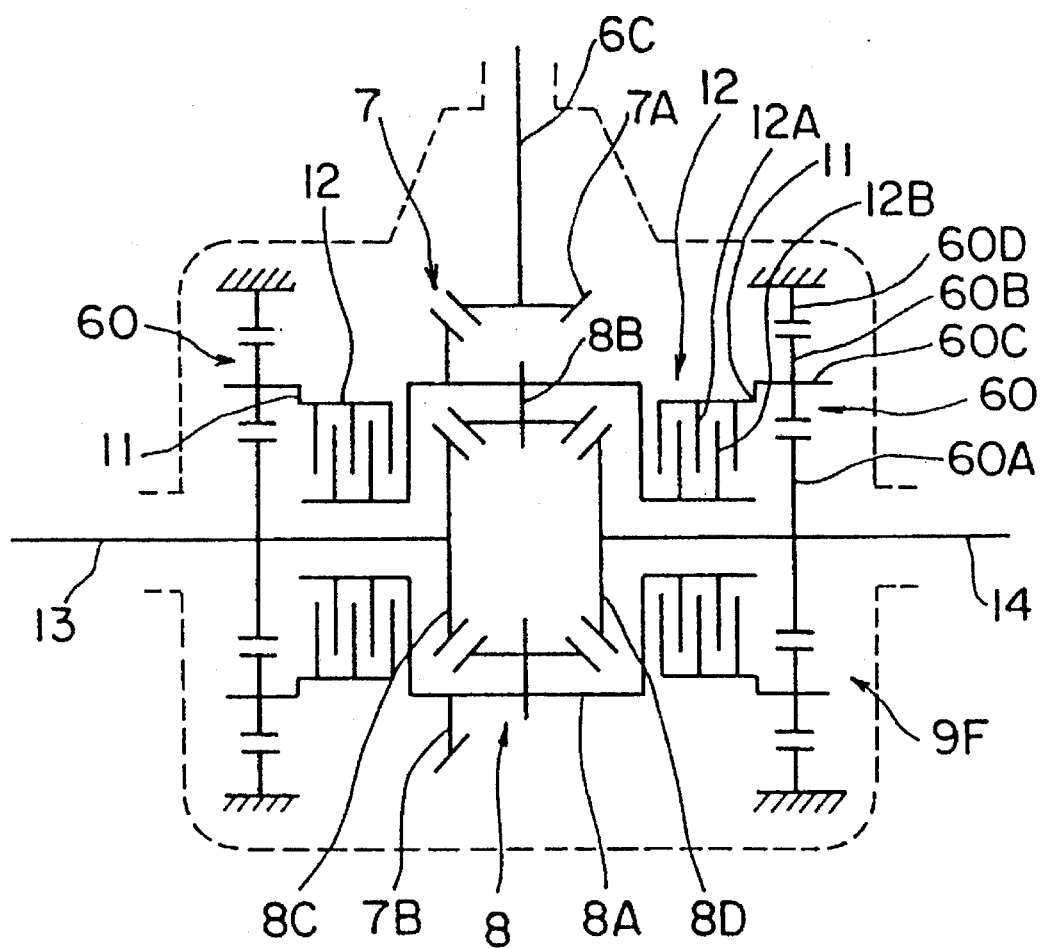
FIG. 18 is a schematic skeleton diagram depicting the vehicular left/right drive torque adjusting apparatus which relates to a fifth embodiment of the present invention and is useful in the practice of the vehicular left/right drive torque adjusting method according to the fifth embodiment of the present invention.

In the fifth embodiment, as in the first embodiment (see FIGS. 1 and 2), there are provided, as shown in FIG. 18, the input shaft 6C, to which rotational drive torque is inputted, and the left-wheel and right-wheel axles 13, 14 for outputting drive torque inputted from the input shaft 6C. The system of the ninth embodiment is interposed among the left-wheel axle 13, the right-wheel axle 14 and the input shaft 6C.

Owing to the construction to be described next, the drive torque transmission control system 9F of the vehicle drive torque distribution adjusting system can distribute drive torque, which is to be transmitted to the left-wheel axle 13 and the right-wheel axle 14, at a desired ratio while permitting a differential motion between the left-wheel axle 13 and the right-wheel axle 14.

Between the input shaft 6C and each of the left-wheel and right-wheel axles 13, 14, a speed change mechanism 60 and the multi-plate clutch mechanism 12 are interposed so that a rotational speed of the left-wheel axle 13 or the right-wheel axle 14 is decelerated by the speed change mechanism 60 and is transmitted to the hollow axle 11 as an output means (an auxiliary transmission member for drive torque) of the speed change mechanism 60.

The multi-plate clutch mechanism 12 is interposed between the hollow axle 11 and the differential case 8A on the side of the input shaft 6C. By coupling the multi-plate clutch mechanism 12, drive torque is fed from the differential case 8A on the higher speed side to the hollow axle 11 on the lower speed side, because as general characteristics of clutch plates arranged in opposition to each other, the transmission of torque takes place from the clutch plates rotating at a higher speed to the clutch plates rotating at a lower speed.

When the multi-plate clutch mechanism 12, for example, between the right-wheel axle 14 and the input shaft 6C is coupled, the drive torque distributed to the right-wheel axle 14 is increased in the course of its direct transmission from the side of the input shaft 6C through the multi-plate clutch mechanism 12 so that the drive torque to be distributed to the left-wheel axle 13 is increased correspondingly.

The above-described speed change mechanism 60 is constructed of a single planetary gear mechanism. Taking by way of example the speed change mechanism 60 provided on the right-wheel axle 14, a description will be made next.

A sun gear 60A is fixed on the right-wheel axle 14. The sun gear 60A is, at an outer periphery thereof, in meshing engagement with a planetary gear (planetary pinion) 60B. A pinion shaft 60C on which the planetary gear 60B is pivotally supported is rotatably supported on the hollow axle 11, so that the hollow axle 11 can function as a carrier for the planetary gear mechanism. Further, the planetary gear 60B is in meshing engagement with a ring gear 60D which is fixed on a case or the like of the drive torque transmission control system 9F to avoid rotation.

Since the revolution speed of the planetary gear 60B is lower than the rotation speed of the sun gear 60A in such a planetary gear mechanism, the hollow axle 11 (namely, the output means of the speed-change mechanism 60) rotates at a lower speed than the right-wheel axle 14. The speed change mechanism 60 therefore functions as a speed reduction mechanism.

The rotational speed of the clutch plates 12A is therefore lower than that of the clutch plates 12B.

When the multi-plate clutch mechanism 12 is coupled, torque in an amount corresponding to the state of the coupling is fed from the side of the input shaft 6C to the side of right-wheel axle 14.

The speed change mechanism 60 and the multi-plate clutch mechanism 12, both provided on the side of the left-wheel axle 13, are constructed likewise. When it is desired to distribute more drive torque from the input shaft 6C to the left-wheel axle 13, the multi-plate clutch mechanism 12 on the side of the left-wheel axle 13 is suitably coupled in accordance with the desired amount of drive torque to be distributed (distribution ratio). When it is desired to distribute more to the right-wheel axle 14, on the other hand, the multi-plate clutch mechanism 12 on the side of the right-wheel axle 14 is suitably coupled in accordance with the distribution ratio.

Since the multi-plate clutch mechanism 12 is of the hydraulically driven type, the state of coupling of the multi-plate clutch mechanism 12 can be adjusted by adjusting the level of the hydraulic pressure so that the amount of drive torque to be fed to the left-wheel axle 13 or the right-wheel axle 14 from the input shaft 6C (namely, the left/right distribution ratio of the drive torque) can be controlled at an appropriate accuracy.

The left and right multi-plate clutch mechanisms 12 are arranged such that they are prevented from being fully coupled at the same time. They are designed in such a manner that, when one of the left and right multi-plate clutch mechanisms 12 is fully coupled, the other multi-plate clutch mechanism 12 undergoes slipping.

As it is always possible to distribute more torque to the side of the left wheel by coupling the multi-plate clutch mechanism 12 on the side of the left-wheel axle 13 or to the side of the right wheel by coupling the multi-plate clutch mechanism 12 on the side of the right-wheel axle 14, it is always feasible to increase the torque to be distributed to the side of the left wheel or to the side of the right wheel.

Transfer of torque to the side of the outer wheel can therefore be freely effected upon turning. It is hence possible to improve the turning performance of the vehicle, for example, by increasing drive torque to be distributed to the side of the outer wheel upon turning whereby a moment can be produced in the turning direction on the vehicle owing to the imbalance in drive torque between the left and right wheels and the turning performance upon turning can thus be improved.

Further, the control unit 18 is constructed as in the first embodiment (see FIG. 3) so that, when one of the wheels is in a state of slipping, the multi-plate clutch mechanism 12 which is not the multi-plate clutch mechanism 12 to be coupled fundamentally but is the multi-plate clutch mechanism 12 not to be coupled basically is coupled.

When the wheel is not in a state of slipping, the control unit 18 sets, as in the first embodiment, a torque amount DT desired to be transferred according to target torques for the left and right wheels, respectively. When the left/right wheel speed ratio is not greater than the predetermined value, the above-described states of coupling of the left and right multi-plate clutch mechanisms 12 are controlled in accordance with the torque amount DT desired to be transferred.

When the left/right wheel speed ratio increases beyond the predetermined value during turning of the vehicle, the control unit 18, as in the first embodiment, makes both the multi-plate clutch mechanisms 12, 12 free. When it is possible to achieve transmission of torque in a desired direction by each of the multi-plate clutch mechanisms 12, 12, the control unit 18 controls the coupling of one of the multi-plate clutch mechanisms 12, said one multi-plate clutch mechanism having a smaller difference in speed between its clutch disks 12A and 12B, whereby the one multi-plate clutch mechanism is controlled to achieve the transmission of the torque.

Since the vehicular left/right drive torque adjusting apparatus according to the fifth embodiment of the present invention is constructed as described above, it can bring about similar advantages to the respective embodiments described above.

The sixth embodiment will next be described. The overall construction of a drive system of an automobile equipped with the system is substantially the same as that described above in connection with the first embodiment shown in FIG. 1. Description of the overall construction is therefore omitted herein.

Figure 19:
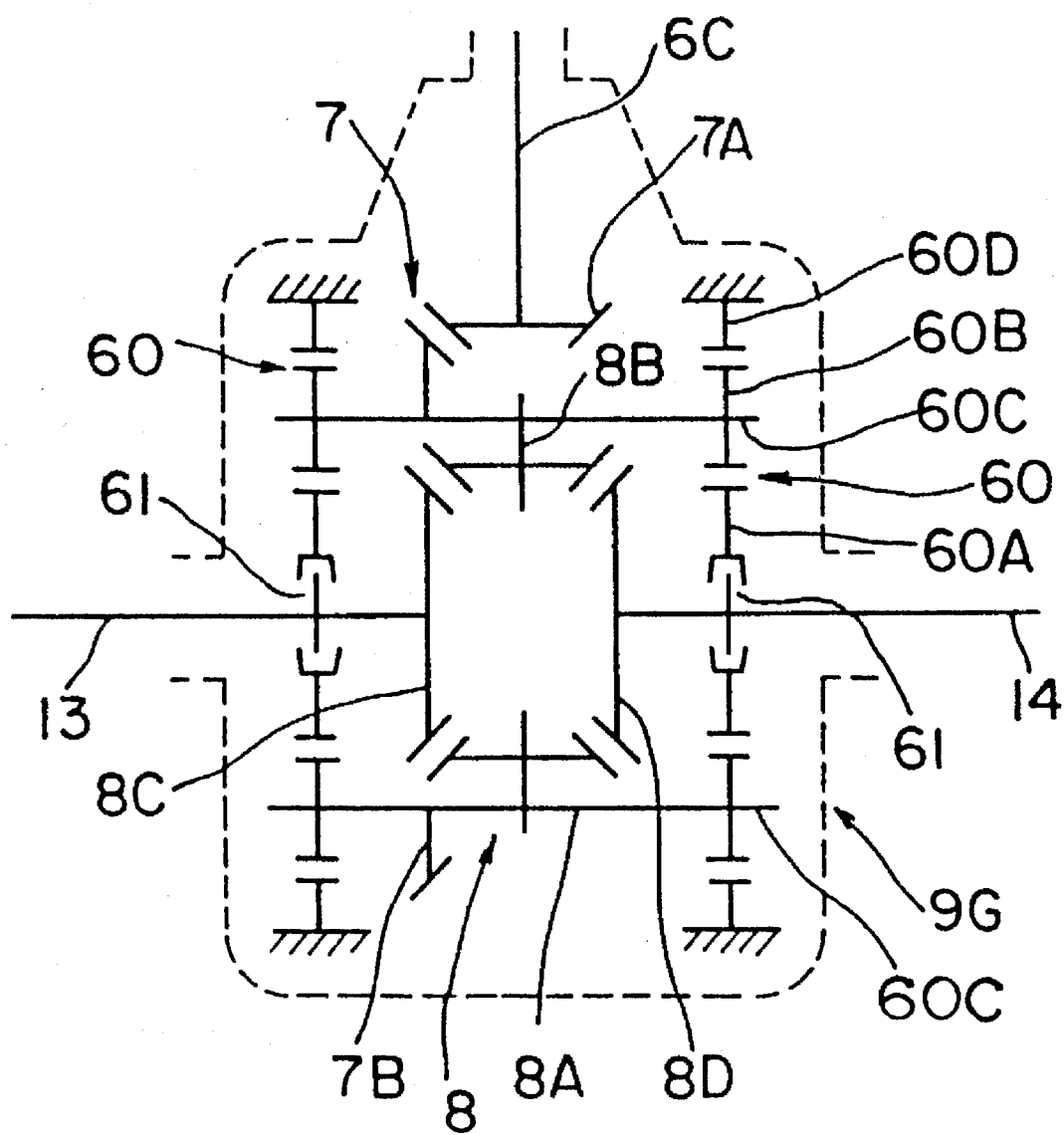
FIG. 19 is a schematic skeleton diagram depicting the vehicular left/right drive torque adjusting apparatus which relates to a sixth embodiment of the present invention and is useful in the practice of the vehicular left/right drive torque adjusting method according to the sixth embodiment of the present invention.

In the sixth embodiment, as in the first embodiment (see FIGS. 1 and 2), there are provided, as shown in FIG. 19, the input shaft 6C and the left-wheel and right-wheel axles 13, 14. The system of the eleventh embodiment is interposed among the left-wheel axle 13, the right-wheel axle 14 and the input shaft 6C.

A drive torque transmission control system 9G in the vehicle drive torque distribution adjusting apparatus is equipped with the speed change mechanism 60 as in the fifth embodiment (see FIG. 18). This speed change mechanism 60 is connected to the side of the input shaft 6C so that rotation on the side of the input shaft 6C is accelerated and outputted to the side of the axles 13, 14.

In place of the multi-plate clutch mechanisms 12 in the fifth embodiment, couplings 61 such as friction clutches are interposed between the sun gear 60A as an output means of the speed change mechanism and the axles 13, 14, respectively. Where friction clutches are employed, those capable of transmitting torque in one direction are arranged in predetermined directions (i.e., with their torque transmitting directions aligned with the torque transmitting directions of the axles 13, 14), respectively.

The speed change mechanism 60 is constructed of a single planetary gear mechanism. Taking by way of example the speed change mechanism 60 provided on the right-wheel axle 14, the speed change mechanism 60 will be described next. The sun gear 60A is fixed on one end (the input side) of coupling 61. The sun gear 60A is, at an outer periphery thereof, in meshing engagement with the planetary gear (planetary pinion) 60B. The pinion shaft 60C on which the planetary gear 60B is pivotally supported is rotatably supported on the carrier 60E provided extending from the differential case 8A. The planetary gear 60B is in meshing engagement with the ring gear 60D which-is fixed on a case of the drive torque transmission control system 9G or the like to avoid rotation.

In the planetary gear mechanism constructed as described above, the revolution speed of the planetary gear 60B is lower than the rotation speed of the sun gear 60A so that the side of the sun gear 60A (namely, the output means of the speed change mechanism 60) rotates at a higher speed than the hollow axle 11. The speed change mechanism 60 therefore functions as an accelerating mechanism.

The difference in rotational speed between the left and right wheels is therefore small. When the coupling 61 is engaged while the axle 14 is rotating at a speed close to the differential case 8A, torque in an amount corresponding to the state of the engagement is fed from the side of the differential case 8A (i.e., the side of the input shaft 6C) to the side of the right-wheel axle 14.

The speed change mechanism 60 and the coupling 61, both provided on the side of the left-wheel axle 13, are constructed likewise. When it is desired to distribute more drive torque from the input shaft 6C to the left-wheel axle 13, the coupling 61 on the side of the left-wheel axle 13 is suitably engaged in accordance with the desired amount of drive torque to be distributed (distribution ratio). When it is desired to distribute more to the right-wheel axle 14, on the other hand, the coupling 61 on the side of the right-wheel axle 14 is suitably engaged in accordance with the distribution ratio.

By controlling the state of engagement of the coupling 61 at this time, the amount of drive torque to be fed to the left-wheel axle 13 or the right-wheel axle 14 from the input shaft 6C (namely, the left/right distribution ratio of the drive torque) can be controlled at an appropriate accuracy.

The left and right couplings 61 are also arranged such that they are prevented from being fully engaged at the same time. They are designed in such a manner that, when one of the left and right couplings 61 is fully coupled, the other coupling 61 undergoes slipping.

Further, the control unit 18 is constructed as in the first embodiment (see FIG. 3) so that, when one of the wheels is in a state of slipping, the coupling 61 which is not the coupling 12 to be coupled fundamentally but is the coupling 12 not to be coupled basically is coupled.

When the wheel is not in a state of slipping, the control unit 18 sets, as in the first embodiment, a torque amount DT desired to be transferred according to target torques for the left and right wheels, respectively. When the left/right wheel speed ratio is not greater than the predetermined value, the above-described states of coupling of the left and right couplings 61 are controlled in accordance with the torque amount DT desired to be transferred.

When the left/right wheel speed ratio increases beyond the predetermined value during turning of the vehicle, the control unit 18, as in the first embodiment, makes both the couplings 61, 61 free. When it is possible to achieve transmission of torque in a desired direction by each of the couplings 61, 61, the control unit 18 controls the coupling of one of the couplings 61, said one coupling 61 having a smaller loss and smaller relative speed difference, whereby the one coupling is controlled to achieve the transmission of the torque.

Since the vehicular left/right drive torque adjusting apparatus according to the sixth embodiment of the present invention is constructed as described above, it can bring about similar advantages to the respective embodiments described above.

The vehicle drive torque distribution adjusting apparatus according to the seventh embodiment will next be described. The overall construction of a drive system of an automobile equipped with the system is substantially the same as that described above in connection with the first embodiment shown in FIG. 1. Description of the overall construction is therefore omitted herein.

Figure 20:
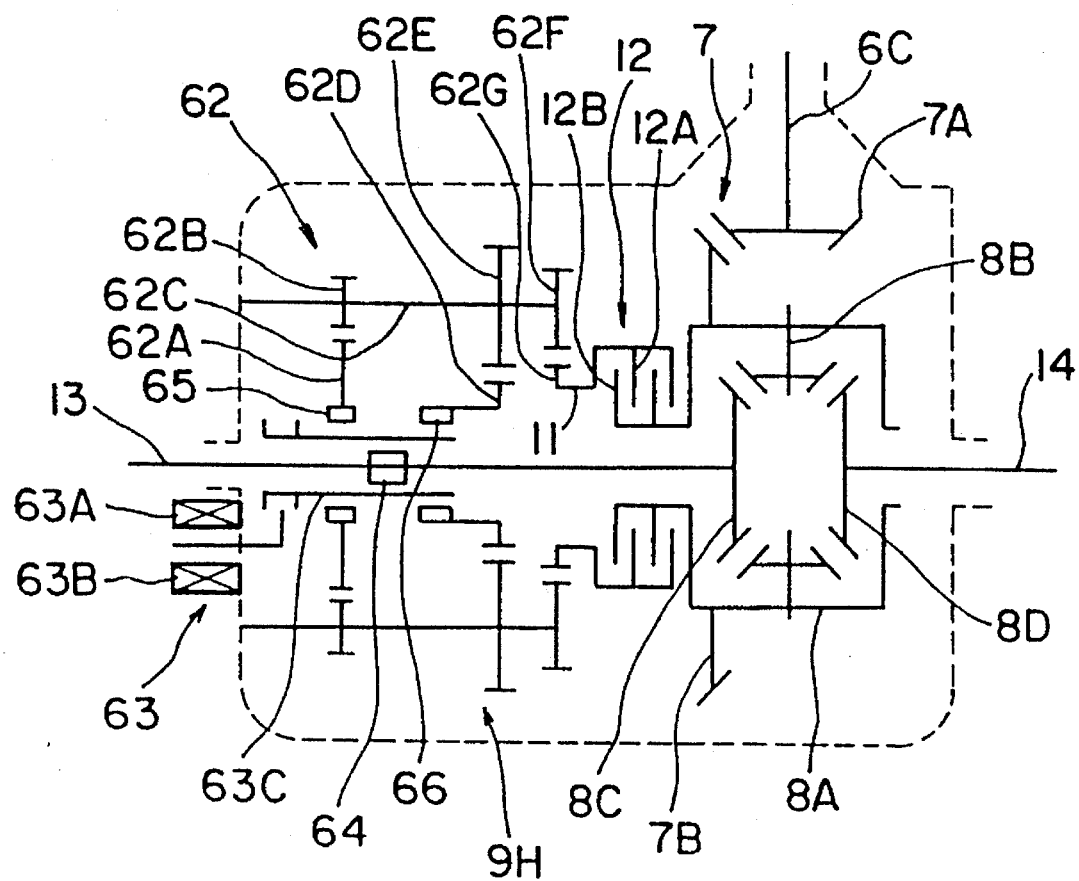
FIG. 20 is a schematic skeleton diagram depicting the vehicular left/right drive torque adjusting apparatus which relates to a seventh embodiment of the present invention and is useful in the practice of the vehicular left/right drive torque adjusting method according to the seventh embodiment of the present invention.

In the thirteenth embodiment, as in the first embodiment (see FIGS. 1 and 2), there are provided, as shown in FIG. 20, the input shaft 6C, to which rotational drive torque is inputted, and the left-wheel and right-wheel axles 13, 14 for outputting drive torque inputted from the input shaft 6C. The system of the thirteenth embodiment is interposed among the left-wheel axle 13, the right-wheel axle 14 and the input shaft 6C.

Owing to the construction to be described below, the drive torque transmission control system 9H of the vehicle drive torque distribution control system can distribute drive torque, which is to be transmitted to the left-wheel axle 13 and the right-wheel axle 14, at a desired ratio while permitting a differential motion between the left-wheel axle 13 and the right-wheel axle 14.

Between the input shaft 6C and each of the left-wheel and right-wheel axles 13, 14, a speed change mechanism 62 and the multi-plate clutch mechanism 12 are interposed. This speed change mechanism 62 can output a rotational speed after either accelerating or decelerating it by an output means, and is provided with a change-over mechanism 63 for changing over a state in which the rotational speed is outputted after acceleration (an accelerated output state) and a state in which the rotational speed is outputted after deceleration (a decelerated output state). Because of this, only one speed change mechanism 62 and only one multi-plate clutch mechanism 12 are provided on the side of only one of the axles (on the side of the left-wheel axle 13 in this embodiment).

The above-described speed change mechanism 62 is constructed of three sets of planetary gear mechanisms connected in series to one another. On the side of the left-wheel axle 13, there are provided a large-diameter sun gear 62A and a small-diameter sun gear 62D. These sun gears 62A, 62D are at their outer peripheries in meshing engagement with planetary gears (planetary pinions) 62B, 62E, respectively.

These planetary gears 62B, 62E are mounted on a pinion shaft 62C, which is rotatably supported on a common carrier (a stationary part), in such a way that the planetary gears 62B, 62E are rotatable integrally with the pinion shaft 62C. In contrast to the relationship in diameter between the sun gears 62A and 62D, the diameter of the planetary gear 62B is formed smaller than that of the planetary gear 62E.

Another planetary gear 62F is also mounted on the pinion shaft 62C in such a manner that the planetary gear 62F is rotatable integrally with the pinion shaft 62C. Another sun gear 62G fixed on the hollow axle 11 is disposed in meshing engagement with the planetary gear 62F. Incidentally, the diameter of the sun gear 62G is set smaller than that of the sun gear 62A but greater than that of the sun gear 62D, while the diameter of the planetary gear 62F is set greater than that of the planetary gear 62B but smaller than that of the planetary gear 62E.

The change-over mechanism 63 is provided between the sun gears 62A, 62D and the left-wheel axle 13. This change-over mechanism 63 is constructed of an electromagnetic actuator (solenoid) 63A, a slide lever 63B driven by the actuator 63A, a connector member 63C driven by the slide lever 63B, a hub 64 provided on the left-wheel axle 13, a hub 65 provided on an inner periphery of the sun gear 62A and a hub 66 provided on an inner periphery of the sun gear 62D. The electromagnetic actuator 63A is provided in such a manner that its operation is governed by the control unit 18.

The connector member 63C is serration-connected at its inner periphery with the hub 64. Depending on the axial position of the connector member 63C, the connector member 63C can be serration-connected at the inner periphery thereof with the hub 65 or the hub 66 so that they can rotate together as an integral unit.

When the connector member 63C is driven by the slide lever 63B to a retreated position (namely, to the position moved leftwards as viewed in FIG. 15), its outer periphery is brought into engagement with the hub 65 through serrations formed therein so that the connector member 63C rotates integrally with the hub 65. When the connector member 63C is driven by the slide lever 63B to an advanced position (namely, to the position moved rightwards as viewed in FIG. 15), its outer periphery is brought into engagement with the hub 66 through serrations formed therein so that the connector member 63C rotates integrally with the hub 66.

When the connector member 63C is at the retreated position, the left-wheel axle 13 is therefore connected to the sun gear 62A via the hub 64, the connector member 63C and the hub 65 so that rotation of the left-wheel axle 13 is outputted from the sun gear 62A, the planetary gear 62B and the pinion shaft 62C to the hollow axle 11 via the planetary gear 62F and sun gear 62G. Since the diameter of the sun gear 62G is smaller than the diameter of the sun gear 62A and the diameter of the planetary gear 62F is greater than the diameter of the planetary gear 62B, the sun gear 62G rotates at a higher speed than the sun gear 62A. In other words, the hollow axle 11 rotates at a higher speed than the left-wheel axle 13. The speed change mechanism 62 therefore functions as an accelerating mechanism.

When the connector member 63C is at the advanced position, on the other hand, the left-wheel axle 13 is connected to the sun gear 62D via the hub 64, the connector member 63C and the hub 66 so that rotation of the left-wheel axle 13 is outputted from the sun gear 62D, the planetary gear 62E and the pinion shaft 62C to the hollow axle 11 via the planetary gear 62F and the sun gear 62G. Since the diameter of the sun gear 62G is greater than the diameter of the sun gear 62D and the diameter of the planetary gear 62F is smaller than the diameter of the planetary gear 62E, the sun gear 62G rotates at a lower speed than the sun gear 62D. In other words, the hollow axle 11 rotates at a lower speed than the left-wheel axle 13. The speed change mechanism 62 therefore functions as a decelerating mechanism.

The multi-plate clutch mechanism 12 is interposed between the hollow axle 11 and the differential case 8A which is disposed on the side of the input shaft 6C. By coupling the multi-plate clutch mechanism 12, drive torque can be transferred between the differential case 8A and the hollow axle 11.

When the connector member 63C is placed at the retreated position, for example, the hollow axle 11 as the output means of the speed change mechanism 62 rotates at a higher speed than the left-wheel axle 13 so that drive torque is returned from the side of the hollow axle 11, which is rotating at the higher speed, to the side of the differential case 8A. The drive torque to be distributed to the side of the left-wheel axle 13 is decreased by the amount of drive torque so returned and in contrast, the drive torque to be distributed to the side of the right-wheel axle 14 is increased by the amount of drive torque so returned.

When the connector member 63C is placed at the advanced position, for example, the hollow axle 11 as the output means of the speed change mechanism 62 rotates at a lower speed than the left-wheel axle 13 so that drive torque is returned from the side of the differential case 8, which is rotating at the higher speed, to the side of the hollow axle 11. The drive torque to be distributed to the side of the left-wheel axle 13 is increased by the amount of drive torque so returned and in contrast, the drive torque to be distributed to the side of the right-wheel axle 14 is decreased by the amount of drive torque so returned.

Further, the control unit 18 is constructed as in the first embodiment (see FIG. 3) so that, when one of the wheels is in a state of slipping, the multi-plate clutch mechanism 12 which is not the multi-plate clutch mechanism 12 to be coupled fundamentally but is the multi-plate clutch mechanism 12 not to be coupled basically is coupled.

When the wheel is not in a state of slipping, the control unit 18 sets, as in the first embodiment, a torque amount DT desired to be transferred according to target torques for the left and right wheels, respectively, When the left/right wheel speed ratio is not greater than the predetermined value, the above-described states of coupling of the left and right multi-plate clutch mechanisms 12 are controlled in accordance with the torque amount DT desired to be transferred.

When the left/right wheel speed ratio increases beyond the predetermined value during turning of the vehicle, the control unit 18, as in the first embodiment, makes both the multi-plate clutch mechanisms 12, 12 free. When it is possible to achieve transmission of torque in a desired direction by each of the multi-plate clutch mechanisms 12, 12, the control unit 18 controls the coupling of one of the multi-plate clutch mechanisms 12, said one multi-plate clutch mechanism having a smaller difference in speed between its clutch disks 12A and 12B, whereby the one multi-plate clutch mechanism is controlled to achieve the transmission of the torque.

Since the vehicular left/right drive torque adjusting apparatus according to the seventh embodiment of the present invention is constructed as described above, it can bring about similar advantages to the respective embodiments described above.

In addition, the seventh embodiment requires only one speed change mechanism 62 and only one multi-plate clutch mechanism 12, resulting in further advantages in both space and cost.

A description will next be made of the eighth embodiment. The overall construction of a drive system of an automobile equipped with the system is substantially the same as that described above in connection with the first embodiment shown in FIG. 1. Description of the overall construction is therefore omitted herein.

Figure 21:
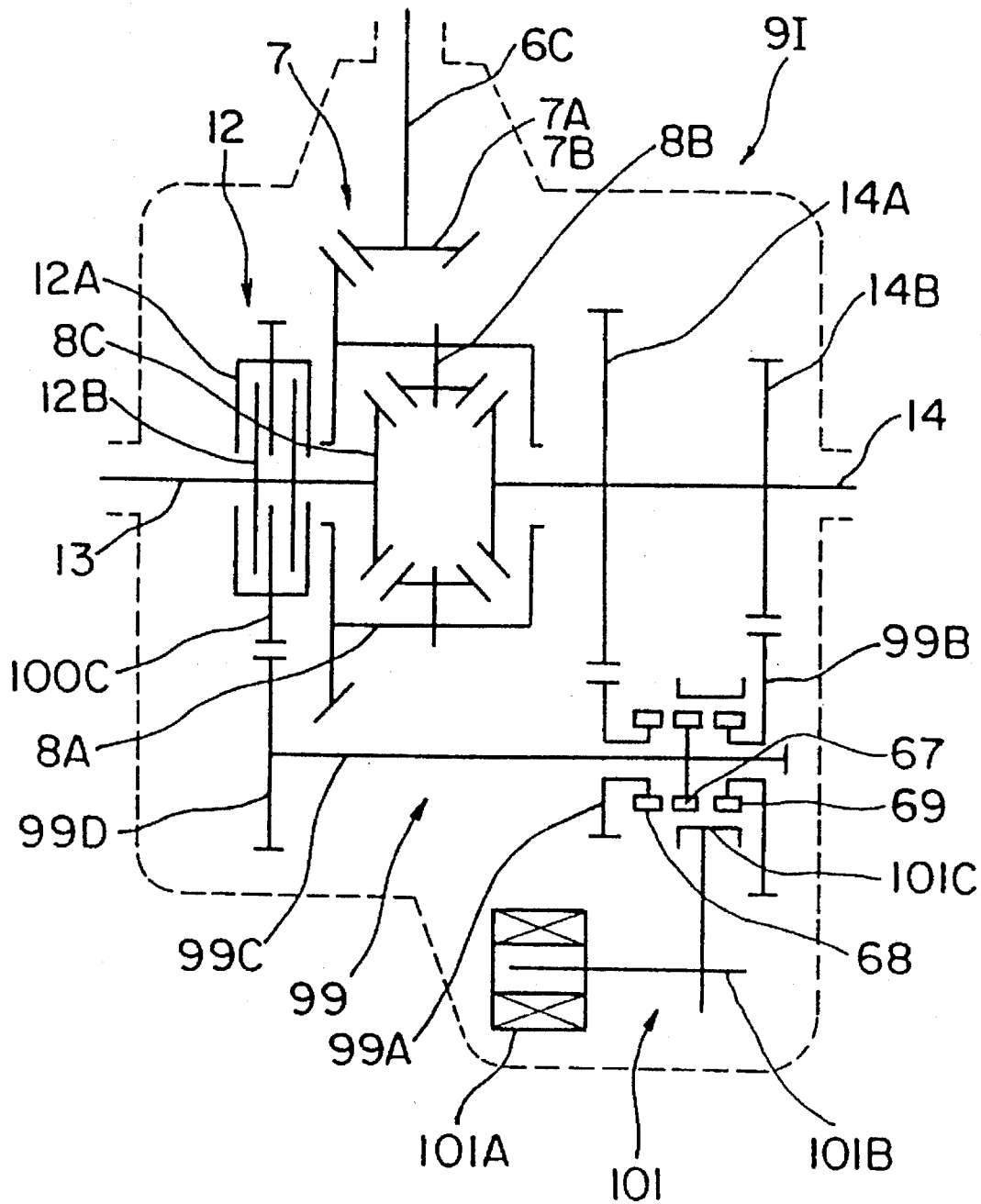
FIG. 21 is a schematic skeleton diagram depicting the vehicular left/right drive torque adjusting apparatus which relates to an eighth embodiment of the present invention and is useful in the practice of the vehicular left/right drive torque adjusting method according to the eighth embodiment of the present invention.

In the eighth embodiment, as in the first embodiment (see FIGS. 1 and 2), there are provided, as shown in FIG. 21, the input shaft 6C, to which rotational drive torque is inputted, and the left-wheel and right-wheel axles 13, 14 for outputting drive torque inputted from the input shaft 6C. The system of the fifteenth embodiment is interposed between the left-wheel axle 13 and the right-wheel axle 14.

Owing to the construction to be described below, a drive torque transmission control system 9I of the vehicle drive torque distribution control system can distribute drive torque, which is to be transmitted to the left-wheel axle 13 and the right-wheel axle 14, at a desired ratio while permitting a differential motion between the left-wheel axle 13 and the right-wheel axle 14.

Between the left-wheel axle 13 and the right-wheel axle 14, a speed change mechanism 99 and the multi-plate clutch mechanism 12 are interposed. This speed change mechanism 99 can output a rotational speed of the right-wheel axle 14 after either accelerating or decelerating it, and is provided with a change-over mechanism 101 for changing over a state in which the rotational speed of the right-wheel axle 14 is outputted after acceleration (an accelerated output state) and a state in which the rotational speed is outputted after deceleration (a decelerated output state). Because of this, only one speed change mechanism 99 and only one multi-plate clutch mechanism 12 are provided.

The speed change mechanism 99 is constructed of three sets of gear mechanisms which are disposed between the left-wheel axle 13 and a shaft (countershaft) 99C extending in parallel with the left-wheel axle 13. Namely, a small-diameter gear 99A and a large-diameter gear 99B are provided on the side of the counter shaft 99C while a large-diameter gear 14A and a small gear 14B are mounted on the left-wheel axle 13. The gear 99A and the gear 14A are meshed, whereas the gear 99B and the gear 14B are meshed. However, the gears 99A, 99B are connected to the countershaft 99C via the change-over mechanism 101 and, depending on the state of the change-over mechanism 101, rotate relative to or integrally with the countershaft 99C.

An intermediate-diameter gear 99D is mounted on a left-wheel end of the countershaft 99C, and another intermediate-diameter gear 100C is disposed on the side of the left-wheel axle 13. These gears 99D and 100C are meshed. Further, the multi-plate clutch mechanism 12 is interposed between the gear 100C and the left-wheel axle 13.

The change-over mechanism 101 is constructed of an electromagnetic actuator (solenoid) 101A, a slide lever 101B driven by the actuator 101A, a connector member 101C driven by the slide lever 101B, a hub 67 provided on the countershaft 99C, a hub 68 connected to the gear 99A, and a hub 69 connected to the sun gear 99B. The electromagnetic actuator 101A is provided in such a manner that its operation is governed by the control unit 18.

The connector member 101C is displaceable between a position where the connector member 101C is serration-connected with the hubs 67, 68 and rotate integrally with the hubs 67, 68 and another position where the connector member 101C is serration-connected with the hubs 67, 69 and rotate integrally with the hubs 67, 69.

When the connector member 101C is driven by the slide lever 101B to a retreated position (namely, to the position moved leftwards as viewed in FIG. 16), the hub 67 and the hub 68 integrally rotate via the connector member 101C. When the connector member 101C is driven by the slide lever 101B to an advanced position (namely, to the position moved rightwards as viewed in FIG. 16), the hub 67 and the hub 69 integrally rotate via the connector member 101C.

When the connector member 101C is at the retreated position, the rotation of the right-wheel axle 14 is transmitted to the countershaft 99C via the gears 14A, 99A, the hub 67, the connector member 101C and the hub 68, and further to the multi-plate clutch mechanism 12 via a gear 99E and the gear 100C. At this time, because of the sizes (the numbers of teeth) of the gears 14A, 99A, 99E and 100C, the gear 100C rotates at a higher speed than the right-wheel axle 14. In other words, the rotation of the right-wheel axle 14 is accelerated and then outputted to the gear 100C.

When the connector member 101C is at the advanced position, on the other hand, the rotation of the right-wheel axle 14 is transmitted to the countershaft 99C via the gears 14B, 99B, the hub 67, the connector member 101C and the hub 69, and further to the multi-plate clutch mechanism 12 via the gears 99E, 100C. At this time, because of the sizes (the numbers of teeth) of the gears 14B, 99B, 99E and 100C, the gear 100C rotates at a lower speed than the right-wheel axle 14. In other words, the rotation of the right-wheel axle 14 is decelerated and then outputted to the gear 100C.

When the multi-plate clutch mechanism 12 is coupled with the connector member 101C being held at the retreated position, the clutch plates on the side of the accelerated gear 100C rotate at a higher speed than the clutch plates on the side of the left-wheel axle 13 so that torque is transmitted from the side of the right-wheel axle 14 to the side of the left-wheel axle 13.

When the multi-plate clutch mechanism 12 is coupled with the connector member 101C being placed at the advanced position, on the other hand, the clutch plates on the side of the decelerated gear 100C rotate at a lower speed than the clutch plates on the side of the left-wheel axle 13 so that torque is transmitted from the side of the left-wheel axle 13 to the side of the right-wheel axle 14.

Further, the control unit 18 is constructed as in the first embodiment (see FIG. 3) so that, when one of the wheels is in a state of slipping, the multi-plate clutch mechanism 12 which is not the multi-plate clutch mechanism 12 to be coupled fundamentally but is the multi-plate clutch mechanism 12 not to be coupled basically is coupled.

When the wheel is not in a state of slipping, the control unit 18 sets, as in the first embodiment, a torque amount DT desired to be transferred according to target torques for the left and right wheels, respectively, When the left/right wheel speed ratio is not greater than the predetermined value, the above-described states of coupling of the left and right multi-plate clutch mechanisms 12 are controlled in accordance with the torque amount DT desired to be transferred.

When the left/right wheel speed ratio increases beyond the predetermined value during turning of the vehicle, the control unit 18, as in the first embodiment, makes both the multi-plate clutch mechanisms 12, 12 free. When it is possible to achieve transmission of torque in a desired direction by each of the multi-plate clutch mechanisms 12, 12, the control unit 18 controls the coupling of one of the multi-plate clutch mechanisms 12, said one multi-plate clutch mechanism having a smaller difference in speed between its clutch disks 12A and 12B, whereby the one multi-plate clutch mechanism is controlled to achieve the transmission of the torque.

Since the vehicular left/right drive torque adjusting apparatus according to the eighth embodiment of the present invention is constructed as described above, it can bring about similar advantages to the respective embodiments described above.

In addition, the eighth embodiment also requires only one speed change mechanism 99 and only one multi-plate clutch mechanism 12, resulting in further advantages in both space and cost.

The vehicle drive torque distribution adjusting system according to the ninth embodiment will next be described. The overall construction of a drive system of an automobile equipped with the system is substantially the same as that described above in connection with the first embodiment shown in FIG. 1. Description of the overall construction is therefore omitted herein.

Figure 22:
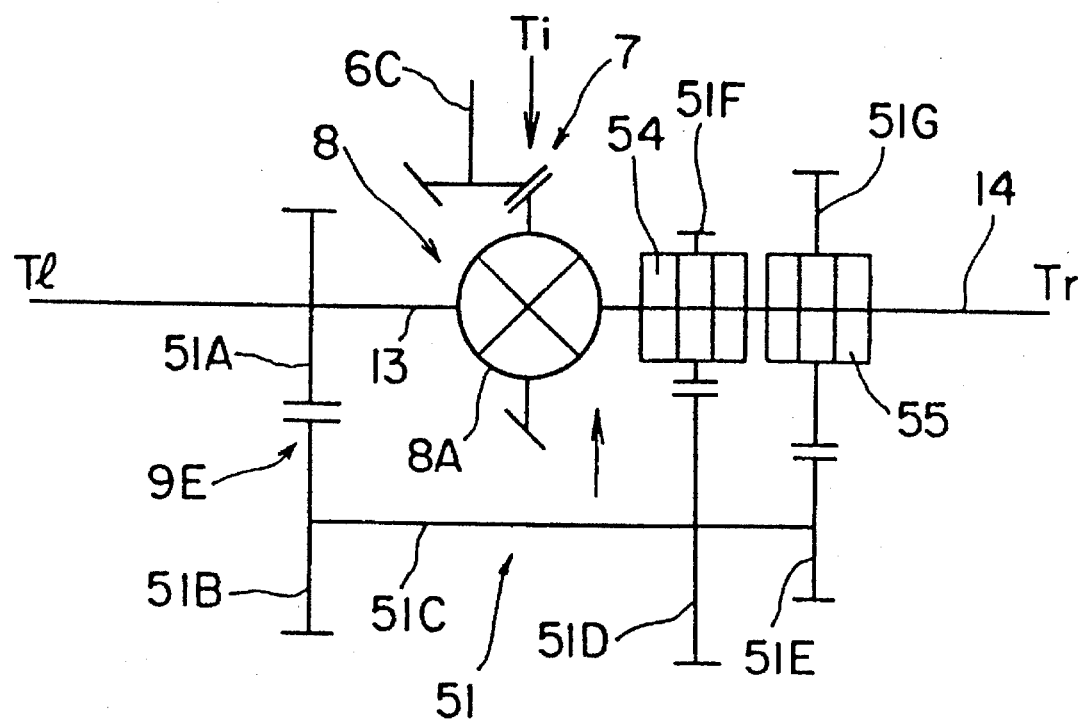
FIG. 22 is a schematic skeleton diagram depicting the vehicular left/right drive torque adjusting apparatus which relates to a ninth embodiment of the present invention and is useful in the practice of the vehicular left/right drive torque adjusting method according to the ninth embodiment of the present invention.

In a drive torque transmission control system 9E arranged in the vehicle drive torque distribution control system, a shaft (countershaft) 51C is provided in parallel with the axles 13, 14 as illustrated in FIG. 22. The shaft 51C is provided with an intermediate-diameter gear 51B, a large-diameter gear 51D and a small-diameter gear 51E, one of the axles, i.e., the axle 13 is provided with an intermediate gear 51A rotatable in mesh with the intermediate gear 51B, and the other axle, i.e., the axle 14 is provided with a small-diameter gear 51F rotatable in mesh with the large-diameter gear 51D and also with a large-diameter gear 51G rotatable in mesh with the small-diameter gear 51E. These gears 51A, 51B, 51D and 51F, in combination, make up an accelerating mechanism as a speed change mechanism whereas the gears 51A, 51B, 51E and 51G, in combination, constitutes a decelerating mechanism as another speed change mechanism.

Between the axle 14 and the small-diameter gear 51F and between the axle 14 and the large-diameter gear 51G, hydraulic multi-plate clutches 54, 55 are interposed, respectively. Incidentally, the multi-plate clutches 54, 55 may be mounted on the countershaft 51C.

As a consequence, the countershaft 51C rotates at the same speed as the axle 13 but the small-diameter gear 51F on the axle 14 rotates at a higher speed than these countershaft 51C and the axle 13, whereby the small-diameter gear 51F rotates at a higher speed than the axle 14 during normal running in which no substantial differential motion occurs between the left wheel and the right wheel. On the other hand, the large-diameter gear 51G mounted on the axle 14 rotates at a lower speed than the countershaft 51C and the axle 13 so that the large-diameter gear 51G rotates at a lower speed than the axle 14 during normal running in which no substantial differential motion takes place between the left wheel and the right wheel.

When the multi-plate clutch 54 is coupled, torque is therefore transmitted from the side of the small-diameter gear 51F, which is rotating at the higher speed than the axle 14, to the side of the axle 14 so that the torque to be transmitted to the side of the axle 13 is decreased by the amount of torque so transmitted.

When the multi-plate clutch 55 is coupled, on the other hand, torque is returned from the side of the axle 14 to the side of the large-diameter gear 51G which is rotating at the lower speed than the axle 14, so that the torque to be transmitted to the side of the axle 13 is increased by the amount of torque so returned.

Since the multi-plate clutch mechanisms 54, 55 are of the hydraulically driven type, the states of coupling of the multi-plate clutch mechanisms 54, 55 can be controlled by adjusting the level of the hydraulic pressure so that the amount of drive torque to be fed to the left-wheel axle 13 or the right-wheel axle 14 from the input shaft 6C (namely, the left/right distribution ratio of the drive torque) can be controlled at an appropriate accuracy.

The two multi-plate clutch mechanisms 54, 55 are arranged such that they are prevented from being fully coupled at the same time. They are designed in such a manner that, when one of the two multi-plate clutch mechanisms 54, 55 is fully coupled, the other multi-plate clutch mechanism undergoes slipping.

Further, the control unit 18 is constructed as in the first embodiment (see FIG. 3) so that, when one of the wheels is in a state of slipping, the multi-plate clutch mechanisms 54, 55 which are not the multi-plate clutch mechanisms 54, 55 to be coupled fundamentally but are the multi-plate clutch mechanisms 54, 55 not to be coupled basically is coupled.

When the wheel is not in a state of slipping, the control unit 18 sets, as in the first embodiment, a torque amount DT desired to be transferred according to target torques for the left and right wheels, respectively. When the left/right wheel speed ratio is not greater than the predetermined value, the above-described states of coupling of the left and right multi-plate clutch mechanisms 54, 55 are controlled in accordance with the torque amount DT desired to be transferred.

When the left/right wheel speed ratio increases beyond the predetermined value during turning of the vehicle, the control unit 18, as in the first embodiment, makes both the multi-plate clutch mechanisms 54, 55 free. When it is possible to achieve transmission of torque in a desired direction by each of the multi-plate clutch mechanisms 54, 55, the control unit 18 controls the coupling of one of the multi-plate clutch mechanisms 54, 55, said one multi-plate clutch mechanism having a smaller difference in speed between its clutch disks, whereby the one multi-plate clutch mechanism is controlled to achieve the transmission of the torque.

Since the vehicular left/right drive torque adjusting apparatus according to the ninth embodiment of the present invention is constructed as described above, it can bring about similar advantages to the respective embodiments described above.

Next, the tenth embodiment will be described. An automobile equipped with the vehicle drive torque distribution control system is an FWD vehicle, and the control system is provided on the side of the rear wheels 15, 16 which are non-drive wheels (i.e., wheels to which no engine output is applied). Its drive torque transmission control mechanism 90A is arranged between the axle 13 for the rear wheel 15 and the axle 14 for the rear wheel 16, and the drive torque transmission adjusting system 9A of the first embodiment is applied to the non-drive wheels.

Figure 23:
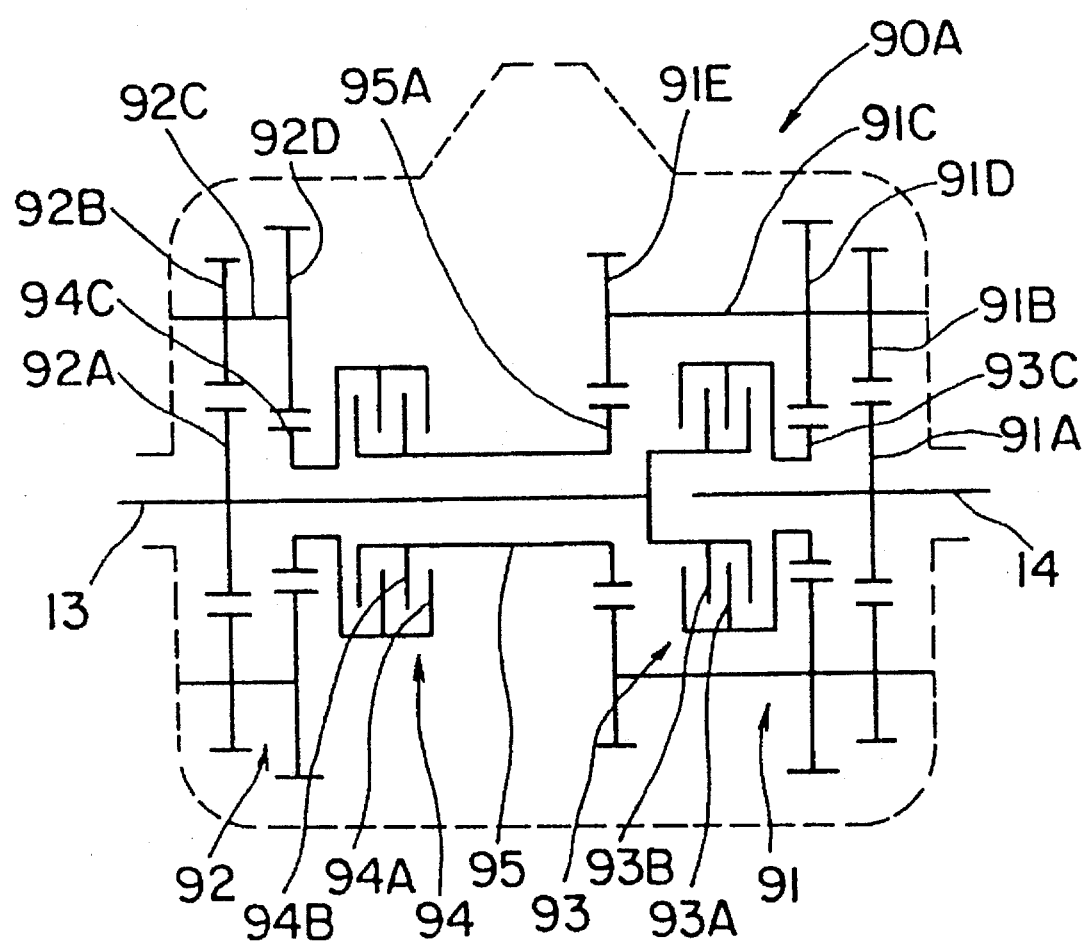
FIG. 23 is a schematic skeleton diagram depicting the vehicular left/right drive torque adjusting apparatus which relates to a tenth embodiment of the present invention and is useful in the practice of the vehicular left/right drive torque adjusting method according to the tenth embodiment of the present invention.

As is illustrated in FIG. 23, the axles 13, 14 for the rear wheels 15, 16 are independent from each other. A speed change mechanism 91 is provided on the side of the right-wheel axle 14 while another speed change mechanism 92 is provided on the side of the left-wheel axle 13. Between an output means of the speed change mechanism 91 and the left-wheel axle 13, a hydraulic multi-plate clutch mechanism 93 is interposed. Between an output means of the speed change mechanism 92 and a hollow axle 95 which rotates in association with and at the same speed as the left-wheel axle 13, there is interposed a hydraulic multi-plate clutch mechanism 94 which is controlled by the controller 18 as in the first embodiment. Designated at 93A, 93B, 94A and 94B are clutch plates.

Of these speed change mechanisms, the speed change mechanism 91 is constructed of a sun gear 91A mounted for integral rotation on the right-wheel axle 14, a planetary gear 91B rotatable in mesh with the sun gear 91A, a planetary gear 91D provided on a planetary shaft 91C, on which the planetary gear 91B is pivotally supported, and rotatable integrally with the planetary gear 91B, and a sun gear 93C rotatable in mesh with the planetary gear 91D.

The sun gear 93C is formed smaller in diameter than the sun gear 91A and the planetary gear 91D is formed larger in diameter than the planetary gear 91B, so that the sun gear 93C rotates at a higher speed than the sun gear 91A. Accordingly, the speed change mechanism 91 accelerates the rotation of the right-wheel axle 14 and outputs the thus-accelerated rotation as rotation of the sun gear 93C.

When the hydraulic multi-plate clutch mechanism 93 is coupled, the clutch plates 93B on the side of the left-wheel axle 13 therefore rotate at a lower speed than the clutch plates 93A on the accelerated sun gear 93C so that drive torque is transmitted from the side of the sun gear 93C, namely, from the side of the right-wheel axle 14 to the side of the left-wheel axle 13.

Since the left-wheel axle 13 and the right-wheel axle 14 are both axles for the non-drive wheels in this case, no drive torque is supplied to them from the engine. However, the left-wheel axle 13 applies rotational reaction force, which is received from the road surface, to the right-wheel axle 14. In other words, the left wheel 15 connected to the left-wheel axle 13 receives rotational reaction force from the road surface while applying brake force to the road surface. 10 Further, the right wheel 16 connected to the right-wheel axle 14 applies drive torque, which is received from the left-wheel axle 13, to the road surface. Since brake force is considered to be negative drive torque, the distribution of drive torque between the left-wheel axle 13 and the right-wheel axle 14 is controlled although their associated wheels 15, 16 are non-drive wheels.

The speed change mechanism 92, on the other hand, is constructed of a sun gear 92A mounted for integral rotation on the left-wheel axle 13, a planetary gear 92B rotatable in mesh with the sun gear 92A, a planetary gear 92D provided on the planetary shaft 92C, on which the planetary gear 92B is pivotally supported, and rotatable integrally with the planetary gear 92B, and a sun gear 94C rotatable in mesh with the planetary gear 92D.

The sun gear 94C is formed smaller in diameter than the sun gear 92A and the planetary gear 92D is formed larger in diameter than the planetary gear 92B, so that the sun gear 94C rotates at a higher speed than the sun gear 92A. Accordingly, the speed change mechanism 92 accelerates the rotation of the left-wheel axle 13 and outputs the thus-accelerated rotation as rotation of the sun gear 94C.

The hollow axle 95 on which one group of the clutch plates the hydraulic multi-plate clutch mechanism 94, namely, the clutch plates 94B are fixed is associated with the right-wheel axle 14 via a sun gear 95A rotatable integrally with the hollow axle 95, a planetary gear 91E mounted on the planetary shaft 91C and rotatable in mesh with the sun gear 95A, the planetary shaft 91C, the planetary gear 91B and the sun gear 91A.

The sun gear 95A has the same diameter as the sun gear 91A and the planetary gear 91E has the same diameter as the planetary gear 91B, whereby the hollow axle 95 is always associated at the same speed with the right-wheel axle 14.

When the hydraulic multi-plate clutch mechanism 94 is coupled, the clutch plates 94B on the side of the hollow axle 95 (namely, on the side of the right-wheel axle 14) therefore rotate at a lower speed than the clutch plates 94A on the side of the accelerated sun gear 94C so that drive torque is transmitted from the side of the left-wheel axle 13 to the side of the right-wheel axle 14.

Since the left-wheel axle 13 and the right-wheel axle 14 are both axles for the non-drive wheels in this case, no drive torque is supplied to them from the engine. However, the left-wheel axle 13 applies rotational reaction force, which has been received from the road surface, to the right-wheel axle 14. In other words, the left wheel 15 connected to the left-wheel axle 13 receives rotational reaction force from the road surface while applying brake force to the road surface. Further, the right wheel 16 connected to the right-wheel axle 14 applies drive torque, which is received from the left-wheel axle 13, to the road surface. The distribution of drive torque between the left-wheel axle 13 and the right-wheel axle 14 is therefore controlled although their associated wheels 15, 16 are non-drive wheels.

Further, the control unit 18 is constructed as in the first embodiment (see FIG. 3) so that, when one of the wheels is in a state of slipping, the multi-plate clutch mechanisms 93, 94 which are not the multi-plate clutch mechanisms 93, 94 to be coupled fundamentally but are the multi-plate clutch mechanisms 93, 94 not to be coupled basically is coupled.

When the wheel is not in a state of slipping, the control unit 18 sets, as in the first embodiment, a torque amount DT desired to be transferred according to target torques for the left and right wheels, respectively, When the left/right wheel speed ratio is not greater than the predetermined value, the above-described states of coupling of the left and right multi-plate clutch mechanisms 93, 94 are controlled in accordance with the torque amount DT desired to be transferred.

When the left/right wheel speed ratio increases beyond the predetermined value during turning of the vehicle, the control unit 18, as in the first embodiment, makes both the multi-plate clutch mechanisms 93, 94 free. When it is possible to achieve transmission of torque in a desired direction by each of the multi-plate clutch mechanisms 93, 94, the control unit 18 controls the coupling of one of the multi-plate clutch mechanisms 93, 94, said one multi-plate clutch mechanism having a smaller difference in speed between its clutch disks, whereby the one multi-plate clutch mechanism is controlled to achieve the transmission of the torque.

Since the vehicular left/right drive torque adjusting apparatus according to the tenth embodiment of the present invention is constructed as described above, it can bring about similar advantages to the respective embodiments described above.

A description will next be made of the eleventh embodiment. The automotive equipped with the vehicular left/right drive torque adjusting apparatus is a FWD vehicle. The apparatus is arranged on the side of the rear wheels 15, 16, which are non-drive wheels (i.e., wheels to which no engine output is applied). Its drive power transmission control mechanism 90A is arranged between the axle 13 for the rear wheel 15 and the axle 14 for the rear wheel 16, the drive power transmission control system 9A of the second embodiment is applied to the non-drive wheels, and the speed change mechanism of the tenth embodiment has been modified.

Figure 24:
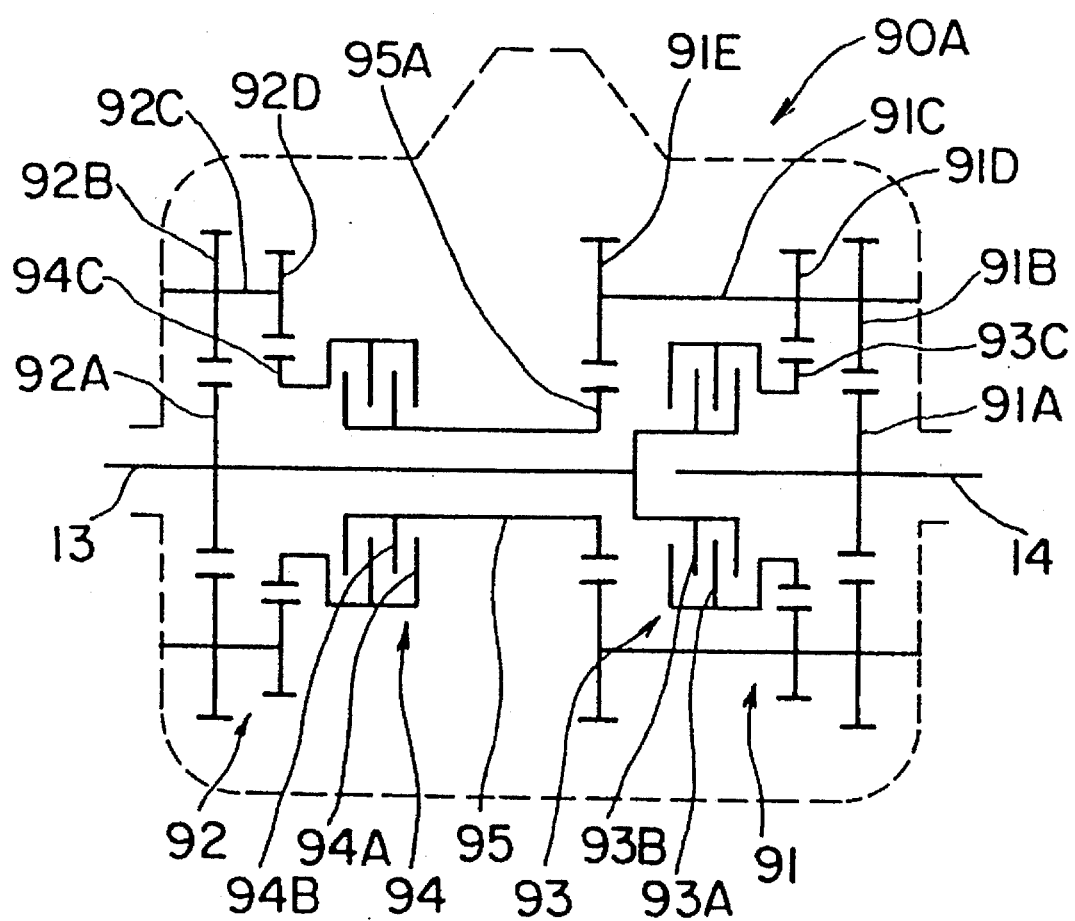
FIG. 24 is a schematic skeleton diagram depicting the vehicular left/right drive torque adjusting apparatus which relates to an eleventh embodiment of the present invention and is useful in the practice of the vehicular left/right drive torque adjusting method according to the eleventh embodiment of the present invention.

Namely, as is shown in FIG. 24, the axles 13, 14 for the rear wheels 15, 16 are independent from each other. The speed change mechanism 91 is arranged on the side of the right-wheel axle 14, while the speed change mechanism 92 is disposed on the side of the left-wheel axle 13. The hydraulic multi-plate clutch mechanism 93 is interposed between the output means of the speed change mechanism 91 and the left-wheel axle 13, while the hydraulic multi-plate clutch mechanism 94 controlled by the controller 18 as in the first embodiment is interposed between the output means of the left-wheel axle 14 and the hollow axle 95 rotatable at the same speed in association with the left-wheel axle 14. Designated at 93A, 93B, 94A and 94B are clutch plates.

Of these, the speed change mechanism 91 is constructed of the sun gear 91A mounted for integral rotation on the right-wheel axle 14, a planetary gear 91B rotatable in mesh with the sun gear 91A, a planetary gear 91D provided on a planetary shaft 91C, on which the planetary gear 91B is pivotally supported, and rotatable integrally with the planetary gear 91B, and a sun gear 93C rotatable in mesh with the planetary gear 91D.

The sun gear 93C is formed larger in diameter than the sun gear 91A and the planetary gear 91D is formed larger in diameter than the planetary gear 91B, so that the sun gear 93C rotates at a lower speed than the sun gear 91A. Accordingly, the speed change mechanism 91 decelerates the rotation of the right-wheel axle 14 and outputs the thus-decelerated rotation as rotation of the sun gear 93C.

When the hydraulic multi-plate clutch mechanism 93 is coupled, the clutch plates 93B on the side of the left-wheel axle 13 therefore rotate at a higher speed than the clutch plates 93A on the side of the decelerated sun gear 93C so that drive torque is transmitted from the side of the left-wheel axle 13 to the side of the sun gear 93C, namely, to the side of the right-wheel axle 14.

Since the left-wheel axle 13 and the right-wheel axle 14 are both axles for the non-drive wheels in this case, no drive torque is supplied to them from the engine. However, the left-wheel axle 13 applies rotational reaction force, which is received from the road surface, to the right-wheel axle 14. In other words, the left wheel 15 connected to the left-wheel axle 13 receives rotational reaction force from the road surface while applying brake force to the road surface. Further, the right wheel 16 connected to the right-wheel axle 14 applies drive torque, which is received from the left-wheel axle 13, to the road surface. Since brake force is considered to be negative drive torque, the distribution of drive torque between the left-wheel axle 13 and the right-wheel axle 14 is controlled although their associated wheels 15, 16 are non-drive wheels.

The speed change mechanism 92, on the other hand, is constructed of a sun gear 92A mounted for integral rotation on the left-wheel axle 13, the planetary gear 92B rotatable in mesh with the sun gear 92A, a planetary gear 92D provided on the planetary shaft 92C, on which the planetary gear 92B is pivotally supported, and rotatable integrally with the planetary gear 92B, and the sun gear 94C rotatable in mesh with the planetary gear 92D.

The sun gear 94C is formed larger in diameter than the sun gear 92A but the planetary gear 92D is formed smaller in diameter than the planetary gear 92B, so that the sun gear 94C rotates at a higher speed than the sun gear 92A. Accordingly, the speed change mechanism 92 decelerates the rotation of the left-wheel axle 13 and outputs the thus-decelerated rotation as rotation of the sun gear 94C.

The hollow axle 95 on which one group of the clutch plates of the hydraulic multi-plate clutch mechanism 94, namely, the clutch plates 94B are fixed is associated with the right-wheel axle 14 via the sun gear 95A rotatable integrally with the hollow axle 95, the planetary gear 91E mounted on the planetary shaft 91C and rotatable in mesh with the sun gear 95A, the planetary shaft 91C, the planetary gear 91B and the sun gear 91A.

The sun gear 95A has the same diameter as the sun gear 91A and the planetary gear 91E has the same diameter as the planetary gear 91B, whereby the hollow axle 95 is always associated at the same speed with the right-wheel axle 14.

When the hydraulic multi-plate clutch mechanism 94 is coupled, the clutch plates 94B on the side of the hollow axle 95 (namely, on the side of the right-wheel axle 14) therefore rotate at a higher speed than the clutch plates 94A on the side of the decelerated sun gear 94C so that drive torque is transmitted from the side of the right-wheel axle 14 to the side of the left-wheel axle 13.

Since the left-wheel axle 13 and the right-wheel axle 14 are also axles for the non-drive wheels in this case, no drive torque is supplied to them from the engine. However, the right-wheel axle 14 applies rotational reaction force, which is received from the road surface, to the left-wheel axle 13. In other words, the right wheel 16 connected to the right-wheel axle 14 receives rotational reaction force from the road surface while applying brake force to the road surface. Further, the left wheel 15 connected to the left-wheel axle 13 applies drive torque, which is received from the right-wheel axle 14, to the road surface. The distribution of drive torque between the left-wheel axle 13 and the right-wheel axle 14 is therefore controlled although their associated wheels 15, 16 are non-drive wheels.

Further, the control unit 18 is constructed as in the first embodiment (see FIG. 3) so that, when one of the wheels is in a state of slipping, the multi-plate clutch mechanisms 93, 94 which are not the multi-plate clutch mechanisms 93, 94 to be coupled fundamentally but are the multi-plate clutch mechanisms 93, 94 not to be coupled basically is coupled.

When the wheel is not in a state of slipping, the control unit 18 sets, as in the first embodiment, a torque amount DT desired to be transferred according to target torques for the left and right wheels, respectively, When the left/right wheel speed ratio is not greater than the predetermined value, the above-described states of coupling of the left and right multi-plate clutch mechanisms 93, 94 are controlled in accordance with the torque amount DT desired to be transferred.

When the left/right wheel speed ratio increases beyond the predetermined value during turning of the vehicle, the control unit 18, as in the first embodiment, makes both the multi-plate clutch mechanisms 93, 94 free. When it is possible to achieve transmission of torque in a desired direction by each of the multi-plate clutch mechanisms 93, 94, the control unit 18 controls the coupling of one of the multi-plate clutch mechanisms 93, 94, said one multi-plate clutch mechanism having a smaller difference in speed between its clutch disks, whereby the one multi-plate clutch mechanism is controlled to achieve the transmission of the torque.

Since the vehicular left/right drive torque adjusting apparatus according to the eleventh embodiment of the present invention is constructed as described above, it can bring about similar advantages to the respective embodiments described above.

Next, the twelfth embodiment will be described. An automobile equipped with the vehicle drive torque distribution adjusting apparatus is an FWD vehicle, and the adjusting apparatus is provided on the side of the rear wheels 15, 16 which are non-drive wheels. Its drive torque transmission control mechanism 90D is arranged between the axle 13 for the rear wheel 15 and the axle 14 for the rear wheel 16, and the drive torque transmission control system 9H of the seventh embodiment is applied to the non-drive wheels.

Figure 25:
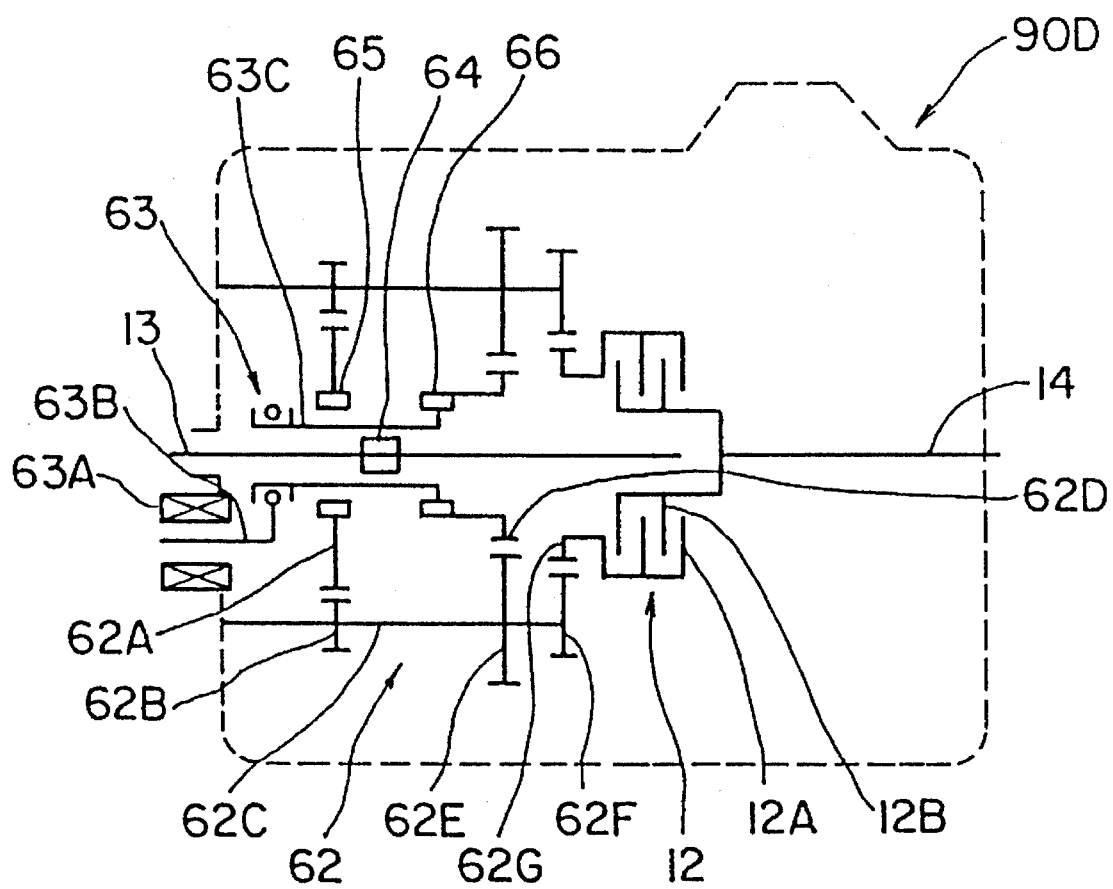
FIG. 25 is a schematic skeleton diagram depicting the vehicular left/right drive torque adjusting apparatus which relates to a twelfth embodiment of the present invention and is useful in the practice of the vehicular left/right drive torque adjusting method according to the twelfth embodiment of the present invention.

As is illustrated in FIG. 25, the axles 13, 14 for the rear wheels 15, 16 are independent from each other. The speed change mechanism 62 and the multi-plate clutch mechanism 12 are interposed between the left-wheel axle 13 and the right-wheel axle 14. The speed change mechanism 62 is provided with the change-over mechanism 63 for changing over a state in which a rotational speed is outputted at an output means after acceleration (an accelerated output state) and a state in which a rotational speed is outputted after deceleration (a decelerated output state). Because of this, only one speed change mechanism 62 and only one multi-plate clutch mechanism 12 are provided on the side of only one of the axles (on the side of the left-wheel axle 13 in the illustrated embodiment).

The above-described speed change mechanism 62 is constructed of three sets of planetary gear mechanisms connected in series to one another. On the side of the left-wheel axle 13, there are provided a large-diameter sun gear 62A and a small-diameter sun gear 62D. These sun gears 62A,62D are at their outer peripheries in meshing engagement with planetary gears (planetary pinions) 62B, 62E, respectively.

These planetary gears 62B, 62E are mounted on a pinion shaft 62C, which is rotatably supported on a common carrier (a stationary part), in such a way that the planetary gears 62B, 62E are rotatable integrally with the pinion shaft 62C. In contrast to the relationship in diameter between the sun gears 62A and 62D, the diameter of the planetary gear 62B is formed smaller than that of the planetary gear 62E.

Another planetary gear 62F is also mounted on the pinion shaft 62C in such a manner that the planetary gear 62F is rotatable integrally with the pinion shaft 62C. Another sun gear 62G fixed on the hollow axle 11 is disposed in meshing engagement with the planetary gear 62F. Incidentally, the diameter of the sun gear 62G is set smaller than that of the sun gear 62A but greater than that of the sun gear 62D, while the diameter of the planetary gear 62F is set greater than that of the planetary gear 62B but smaller than that of the planetary gear 62E.

The change-over mechanism 63 is provided between the sun gears 62A,62D and the left-wheel axle 13. This change-over mechanism 63 is constructed of an electromagnetic actuator (solenoid) 63A, a slide lever 63B driven by the actuator 63A, a connector member 63C driven by the slide lever 63B, a hub 64 provided on the left-wheel axle 13, a hub 65 provided on an inner periphery of the sun gear 62A and a hub 66 provided on an inner periphery of the sun gear 62D. The electromagnetic actuator 63A is provided in such a manner that its operation is governed by the control unit 18.

The connector member 63C is serration-connected at its inner periphery with the hub 64. Depending on the axial position of the connector member 63C, the connector member 63C can be serration-connected at the inner periphery thereof with the hub 65 or the hub 66 so that they can rotate together as an integral unit.

When the connector member 63C is driven by the slide lever 63B to a retreated position (namely, to the position moved leftwards as viewed in FIG. 17), its outer periphery is brought into engagement with the hub 65 through serrations formed therein so that the connector member 63C rotates integrally with the hub 65. When the connector member 63C is driven by the slide lever 63B to an advanced position (namely, to the position moved rightwards as viewed in FIG. 17), its outer periphery is brought into engagement with the hub 66 through serrations formed therein so that the connector member 63C rotates integrally with the hub 66.

When the connector member 63C is at the retreated position, the left-wheel axle 13 is therefore connected to the sun gear 62A via the hub 64, the connector member 63C and the hub 65 so that rotation of the left-wheel axle 13 is outputted from the sun gear 62A, the planetary gear 62B and the pinion shaft 62C to the hollow axle 11 via the planetary gear 62F and sun gear 62G. Since the diameter of the sun gear 62G is smaller than the diameter of the sun gear 62A and the diameter of the planetary gear 62F is greater than the diameter of the planetary gear 62B, the sun gear 62G rotates at a higher speed than the sun gear 62A. In other words, the hollow axle 11 rotates at a higher speed than the left-wheel axle 13. The speed change mechanism 62 therefore functions as an accelerating mechanism.

When the connector member 63C is at the advanced position, on the other hand, the left-wheel axle 13 is connected to the sun gear 62D via the hub 64, the connector member 63C and the hub 66 so that rotation of the left-wheel axle 13 is outputted from the sun gear 62D, the planetary gear 62E and the pinion shaft 62C to the hollow axle 11 via the planetary gear 62F and the sun gear 62G. Since the diameter of the sun gear 62G is greater than the diameter of the sun gear 62D and the diameter of the planetary gear 62F is smaller than the diameter of the planetary gear 62E, the sun gear 62G rotates at a lower speed than the sun gear 62D. In other words, the hollow axle 11 rotates at a lower speed than the left-wheel axle 13. The speed change mechanism 62 therefore functions as a decelerating mechanism.

The multi-plate clutch mechanism 12 is interposed between the hollow axle 11 and the differential case 8A which is disposed on the side of the input shaft 6C. By coupling the multi-plate clutch mechanism 12, drive torque can be transferred between the differential case 8A and the hollow axle 11.

When the connector member 63C is placed at the retreated position, for example, the hollow axle 11 as the output portion of the speed change mechanism 62 rotates at a higher speed than the left-wheel axle 13 so that drive torque is returned from the side of the hollow axle 11, which is rotating at the higher speed, to the side of the differential case 8A. The drive torque to be distributed to the side of the left-wheel axle 13 is decreased by the amount of drive torque so returned and in contrast, the drive torque to be distributed to the side of the right-wheel axle 14 is increased by the amount of drive torque so returned.

When the connector member 63C is placed at the advanced position, for example, the hollow axle 11 as the output means of the speed change mechanism 62 rotates at a lower speed than the left-wheel axle 13 so that drive torque is returned from the side of the differential case 8, which is rotating at the higher speed, to the side of the hollow axle 11. The drive torque to be distributed to the side of the left-wheel axle 13 is increased by the amount of drive torque so returned and in contrast, the drive torque to be distributed to the side of the right-wheel axle 14 is decreased by the amount of drive torque so returned.

Further, the control unit 18 is constructed as in the first embodiment (see FIG. 3) so that, when one of the wheels is in a state of slipping, the multi-plate clutch mechanism 12 which is not the multi-plate clutch mechanism 12 to be coupled fundamentally but is the multi-plate clutch mechanism 12 not to be coupled basically is coupled.

When the wheel is not in a state of slipping, the control unit 18 sets, as in the first embodiment, a torque amount DT desired to be transferred according to target torques for the left and right wheels, respectively, When the left/right wheel speed ratio is not greater than the predetermined value, the above-described states of coupling of the left and right multi-plate clutch mechanisms 12 are controlled in accordance with the torque amount DT desired to be transferred.

When the left/right wheel speed ratio increases beyond the predetermined value during turning of the vehicle, the control unit 18, as in the first embodiment, makes both the multi-plate clutch mechanisms 12, 12 free. When it is possible to achieve transmission of torque in a desired direction by each of the multi-plate clutch mechanisms 12,12, the control unit 18 controls the coupling of one of the multi-plate clutch mechanisms 12, said one multi-plate clutch mechanism having a smaller difference in speed between its clutch disks 12A and 12B, whereby the one multi-plate clutch mechanism is controlled to achieve the transmission of the torque.

Since the vehicular left/right drive torque adjusting apparatus according to the twelfth embodiment of the present invention is constructed as described above, it can bring about similar advantages to the respective embodiments described above.

In addition, the twelfth embodiment requires only one speed change mechanism 62 and only one multi-plate clutch mechanism 12, resulting in further advantages in both space and cost.

Next, the vehicle drive torque distribution adjusting apparatus according to the thirteenth embodiment of the present invention will be described. An automobile equipped with the vehicle drive torque distribution adjusting apparatus is an FWD vehicle, and the adjusting apparatus is provided on the side of the rear wheels 15, 16 which are non-drive wheels. Its drive torque transmission control mechanism 90C is arranged between the axle 13 for the rear wheel 15 and the axle 14 for the rear wheel 16, and the drive torque transmission control system 91 of the eighth embodiment is applied to the non-drive wheels.

Figure 26:
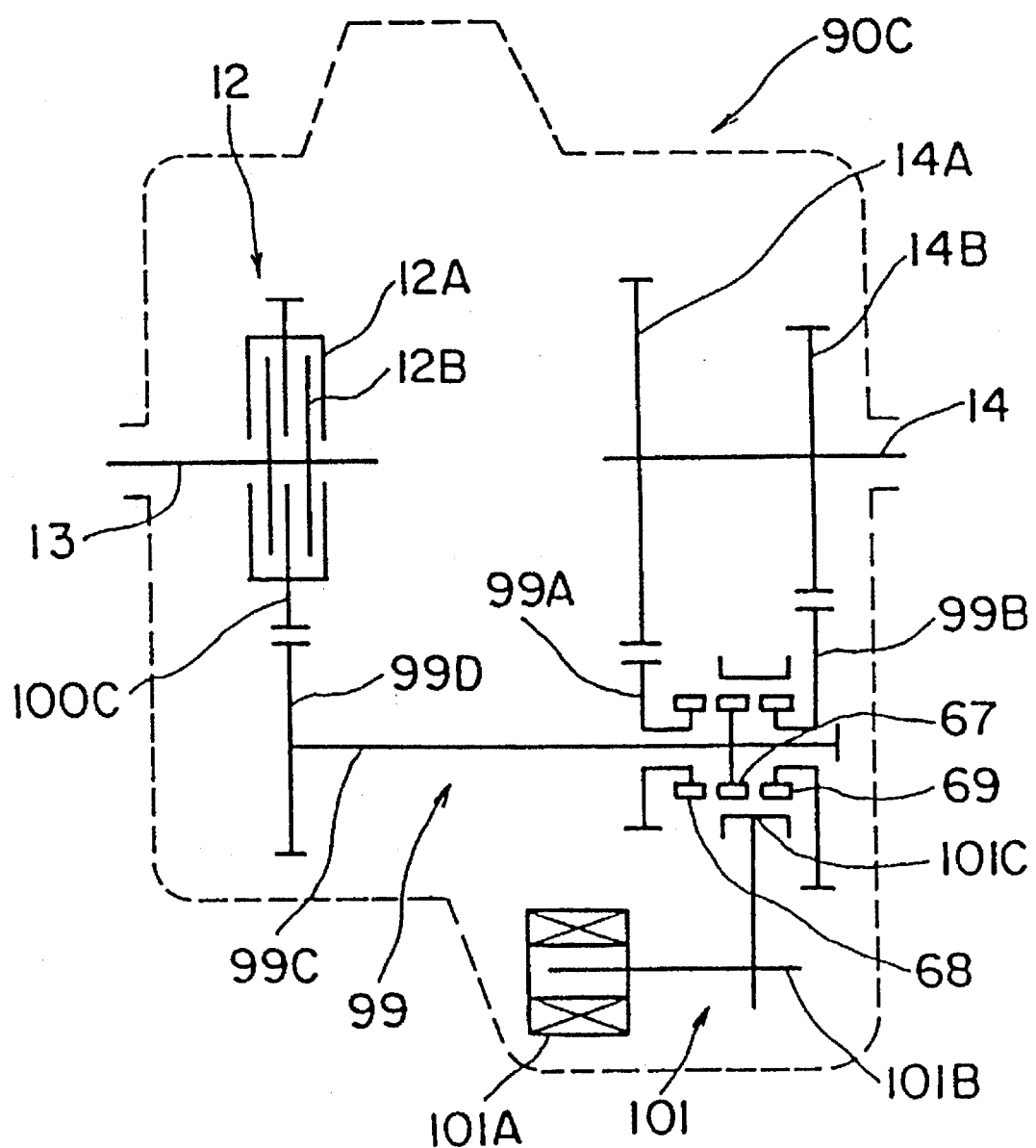
FIG. 26 is a schematic skeleton diagram depicting the vehicular left/right drive torque adjusting apparatus which relates to a thirteenth embodiment of the present invention and is useful in the practice of the vehicular left/right drive torque adjusting method according to the thirteenth embodiment of the present invention.

As is illustrated in FIG. 26, the axles 13, 14 for the rear wheels 15, 16 are independent from each other. The speed change mechanism 99 and the multi-plate clutch mechanism 12 are interposed between the left-wheel axle 13 and the right-wheel axle 14. The speed change mechanism 99 can output the rotational speed of the right-wheel axle 14 after either acceleration or deceleration. It is provided with the change-over mechanism 101 which changes over a state in which the rotational speed is outputted after acceleration (an accelerated output state) and a state in which the rotational speed is outputted after deceleration (a decelerated output state). Because of this, only one speed change mechanism 99 and only one multi-plate clutch mechanism 12 are provided.

The speed change mechanism 99 is constructed of three sets of gear mechanisms which are disposed between the left-wheel axle 13 and a shaft (countershaft) 99C extending in parallel with the left-wheel axle 13. Namely, a small-diameter gear 99A and a large-diameter gear 99B are provided on the side of the counter shaft 99C while a large-diameter gear 14A and a small gear 14B are mounted on the left-wheel axle 13. The gear 99A and the gear 14A are meshed, whereas the 10 gear 99B and the gear 14B are meshed.

However, the gears 99A,99B are connected to the countershaft 99C via the change-over mechanism 101 and, depending on the state of the change-over mechanism 101, rotate relative to or integrally with the counter-shaft 99C.

An intermediate-diameter gear 99E is mounted on the side of the countershaft 99C, and another intermediate-diameter gear 100C is disposed on the side of the left-wheel axle 13. These gears 99E and 100C are meshed. Further, the multi-plate clutch mechanism 12 is interposed between the gear 100C and the left-wheel axle 13.

The change-over mechanism 101 is constructed of an electromagnetic actuator (solenoid) 101A, a slide lever 101B driven by the actuator 101A, a connector member 101C driven by the slide lever 101B, a hub 67 provided on the countershaft 99C, a hub 68 connected to the gear 99A, and a hub 69 connected to the sun gear 99B. The electromagnetic actuator 101A is provided in such a manner that its operation is governed by the control unit 18.

The connector member 101C is displaceable between a position where the connector member 101C is serration-connected with the hubs 67, 68 and rotate integrally with the hubs 67, 68 and another position where the connector member 101C is serration-connected with the hubs 67, 69 and rotate integrally with the hubs 67, 69.

When the connector member 101C is driven by the slide lever 101B to a retreated position (namely, to the position moved leftwards as viewed in FIG. 19), the hub 67 and the hub 68 integrally rotate via the connector member 101C. When the connector member 101C is driven by the slide lever 101B to an advanced position (namely, to the position moved rightwards as viewed in FIG. 19), the hub 67 and the hub 69 integrally rotate via the connector member 101C.

When the connector member 101C is at the retreated position, the rotation of the right-wheel axle 14 is transmitted to the countershaft 99C via the gears 14A, 99A, the hub 67, the connector member 101C and the hub 68, and further to the multi-plate clutch mechanism 12 via a gear 99E and the gear 100C. At this time, because of the sizes (the numbers of teeth) of the gears 14A, 99A, 99E and 100C, the gear 100C rotates at a higher speed than the right-wheel axle 14. In other words, the rotation of the right-wheel axle 14 is accelerated and then outputted to the gear 100C.

When the connector member 101C is at the advanced position, on the other hand, the rotation of the right-wheel axle 14 is transmitted to the countershaft 99C via the gears 14B, 99B, the hub 67, the connector member 101C and the hub 69, and further to the multi-plate clutch mechanism 12 via the gears 99E, 100C. At this time, because of the sizes (the numbers of teeth) of the gears 14B, 99B, 99E and 100C, the gear 100C rotates at a lower speed than the right-wheel axle 14. In other words, the rotation of the right-wheel axle 14 is decelerated and then outputted to the gear 100C.

When the multi-plate clutch mechanism 12 is coupled with the connector member 101C being held at the retreated position, the clutch plates on the side of the accelerated gear 100C rotate at a higher speed than the clutch plates on the side of the left-wheel axle 13 so that torque is transmitted from the side of the right-wheel axle 14 to the side of the left-wheel axle 13.

When the multi-plate clutch mechanism 12 is coupled with the connector member 101C being placed at the advanced position, on the other hand, the clutch plates on the side of the decelerated gear 100C rotate at a lower speed than the clutch plates on the side of the left-wheel axle 13 so that torque is transmitted from the side of the left-wheel axle 13 to the side of the right-wheel axle 14.

Further, the control unit 18 is constructed as in the first embodiment (see FIG. 3) so that, when one of the wheels is in a state of slipping, the multi-plate clutch mechanism 12 which is not the multi-plate clutch mechanism 12 to be coupled fundamentally but is the multi-plate clutch mechanism 12 not to be coupled basically is coupled.

When the wheel is not in a state of slipping, the control unit 18 sets, as in the first embodiment, a torque amount DT desired to be transferred according to target torques for the left and right wheels, respectively, When the left/right wheel speed ratio is not greater than the predetermined value, the above-described states of coupling of the left and right multi-plate clutch mechanisms 12 are controlled in accordance with the torque amount DT desired to be transferred.

When the left/right wheel speed ratio increases beyond the predetermined value during turning of the vehicle, the control unit 18, as in the first embodiment, makes both the multi-plate clutch mechanisms 12, 12 free. When it is possible to achieve transmission of torque in a desired direction by each of the multi-plate clutch mechanisms 12, 12, the control unit 18 controls the coupling of one of the multi-plate clutch mechanisms 12, said one multi-plate clutch mechanism having a smaller difference in speed between its clutch disks 12A and 12B, whereby the one multi-plate clutch mechanism is controlled to achieve the transmission of the torque.

Since the vehicular left/right drive torque adjusting apparatus according to the thirteenth embodiment of the present invention is constructed as described above, it can bring about similar advantages to the respective embodiments described above.

In addition, the thirteenth embodiment also requires only one speed change mechanism 99 and only one multi-plate clutch mechanism 12, resulting in further advantages in both space and cost.

Like the first embodiment, the apparatus of this embodiment makes it possible to control the left/right distribution of torque as desired without being affected by the friction coefficient $\mu$ of the running road surface or the state of acceleration, thereby contributing to an improvement in the moving performance of a vehicle such as the turning performance and also to an improvement in the running stability of the vehicle.

Next, the fourteenth embodiment will be described. An automobile equipped with the vehicle drive torque distribution adjusting apparatus is an FWD vehicle, and the adjusting apparatus is provided on the side of the rear wheels 15, 16 which are non-drive wheels. Its drive torque transmission control mechanism 90B is arranged between the axle 13 for the rear wheel 15 and the axle 14 for the rear wheel 16, and the drive torque transmission control system 9E of the ninth embodiment is applied to the non-drive wheels.

Figure 27:
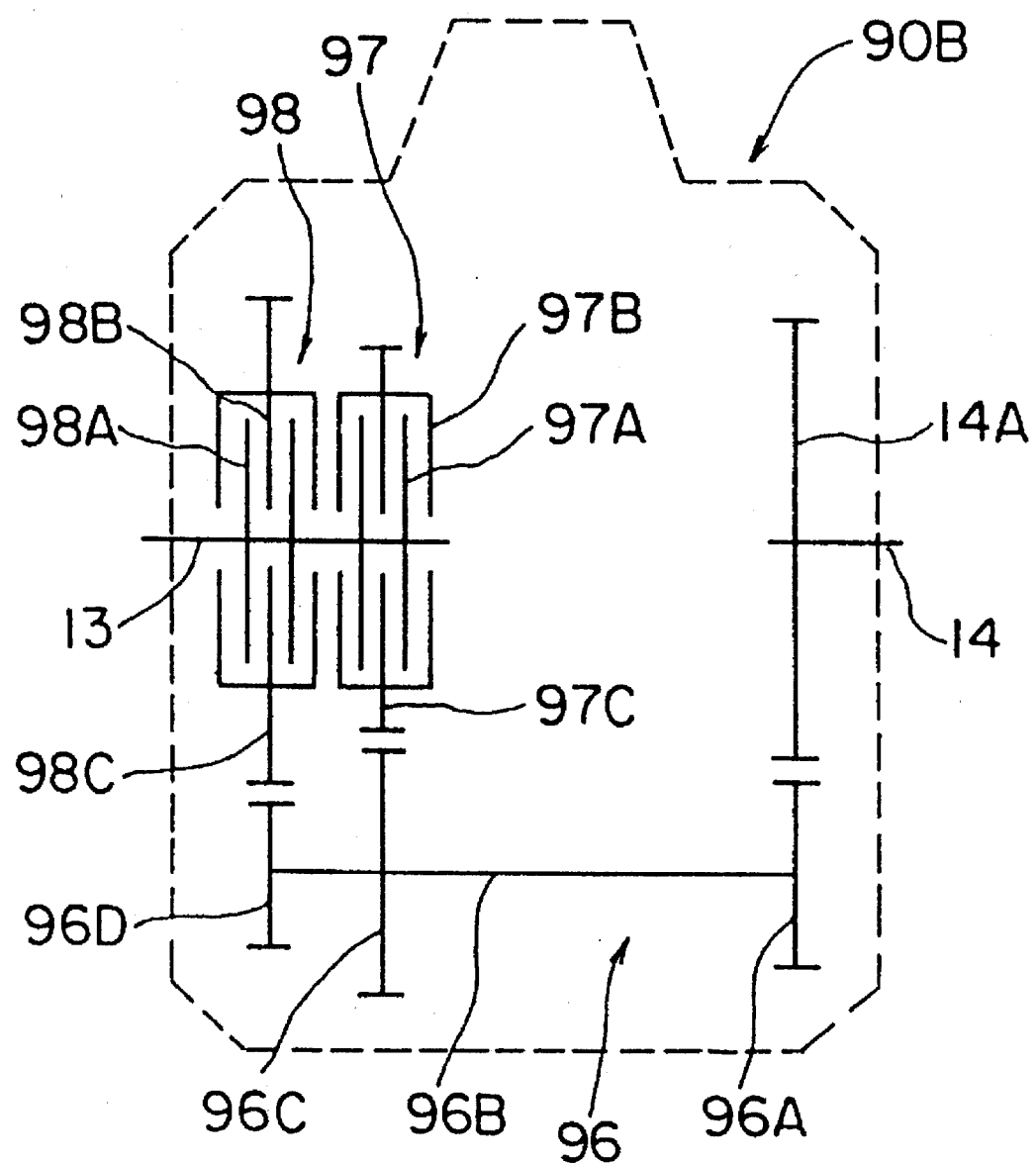
FIG. 27 is a schematic skeleton diagram depicting the vehicular left/right drive torque adjusting apparatus which relates to a fourteenth embodiment of the present invention and is useful in the practice of the vehicular left/right drive torque adjusting method according to the fourteenth embodiment of the present invention.
Figure 28:
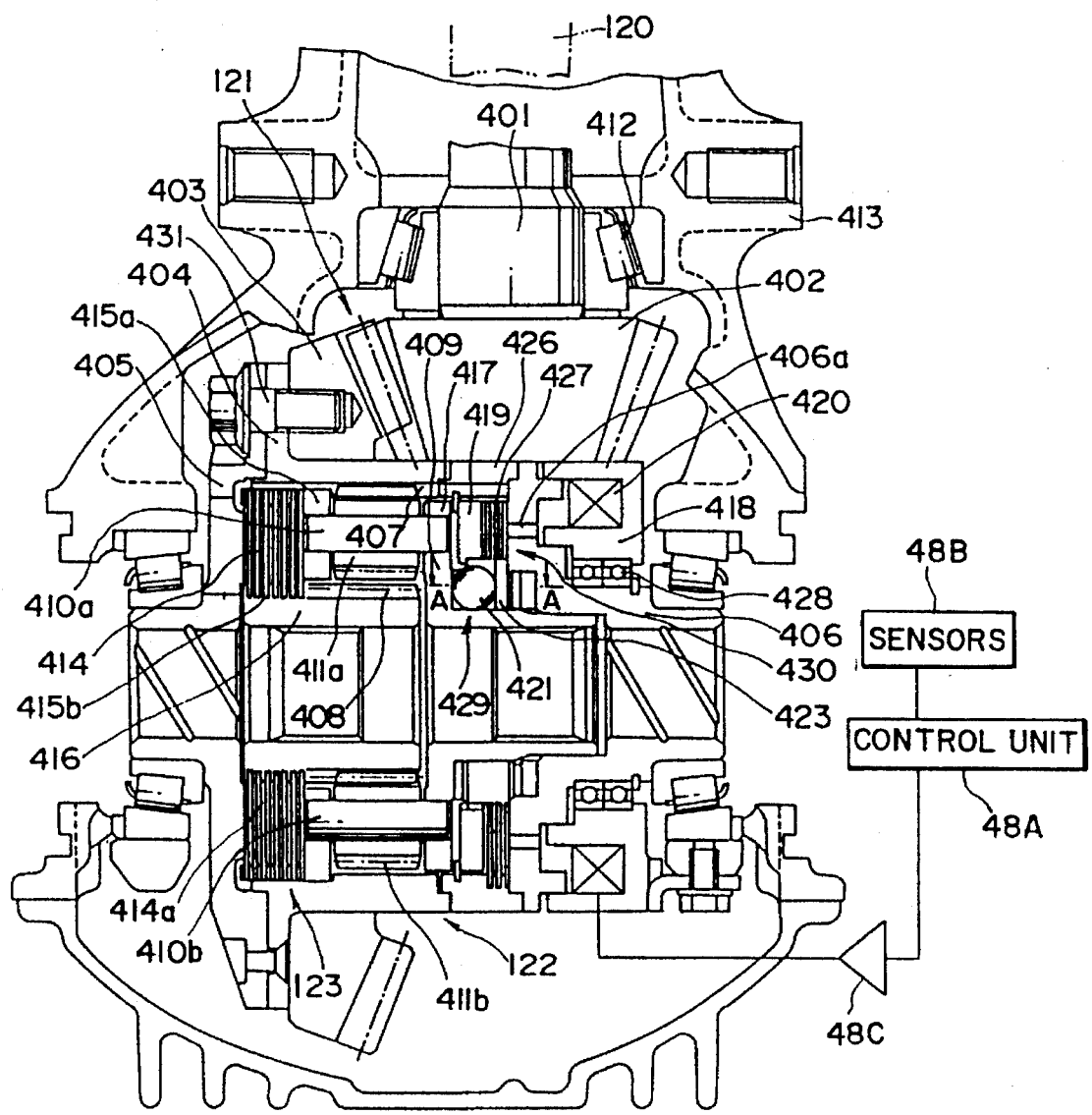
FIG. 28 is a simplified horizontal cross-sectional view showing a conventional left/right drive torque adjusting apparatus for a vehicle.
Figure 29:
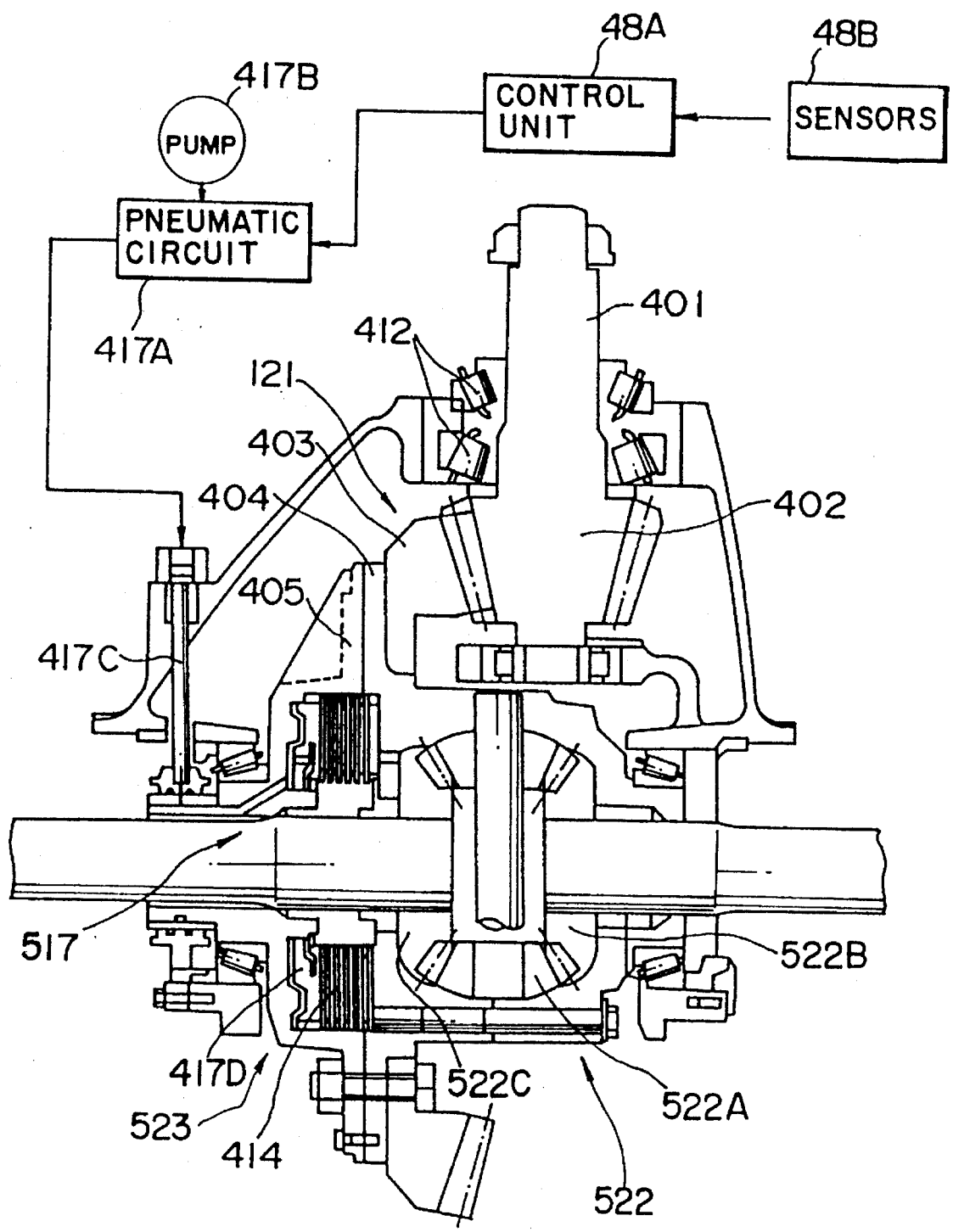
FIG. 29 is a simplified horizontal cross-sectional view showing another conventional left/right drive torque adjusting apparatus for a vehicle.
Figure 30:
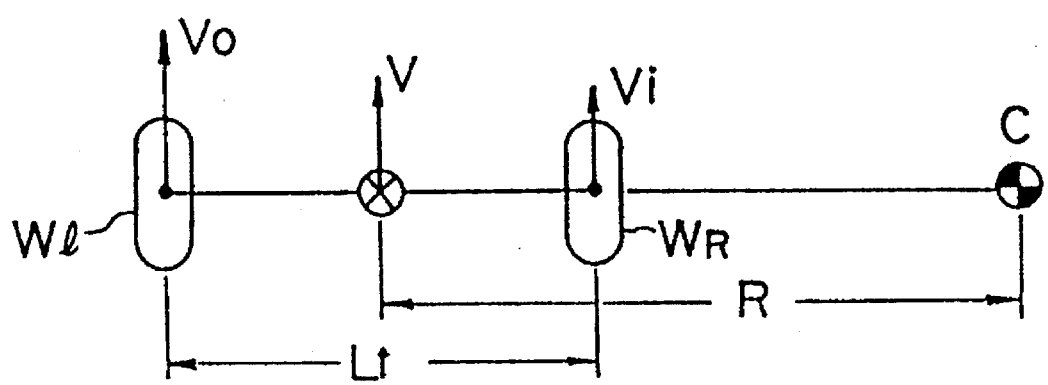
FIG. 30 is a schematic diagram illustrating a difference in rotational speed between inner and outer wheels during turning of a vehicle.
Figure 31:
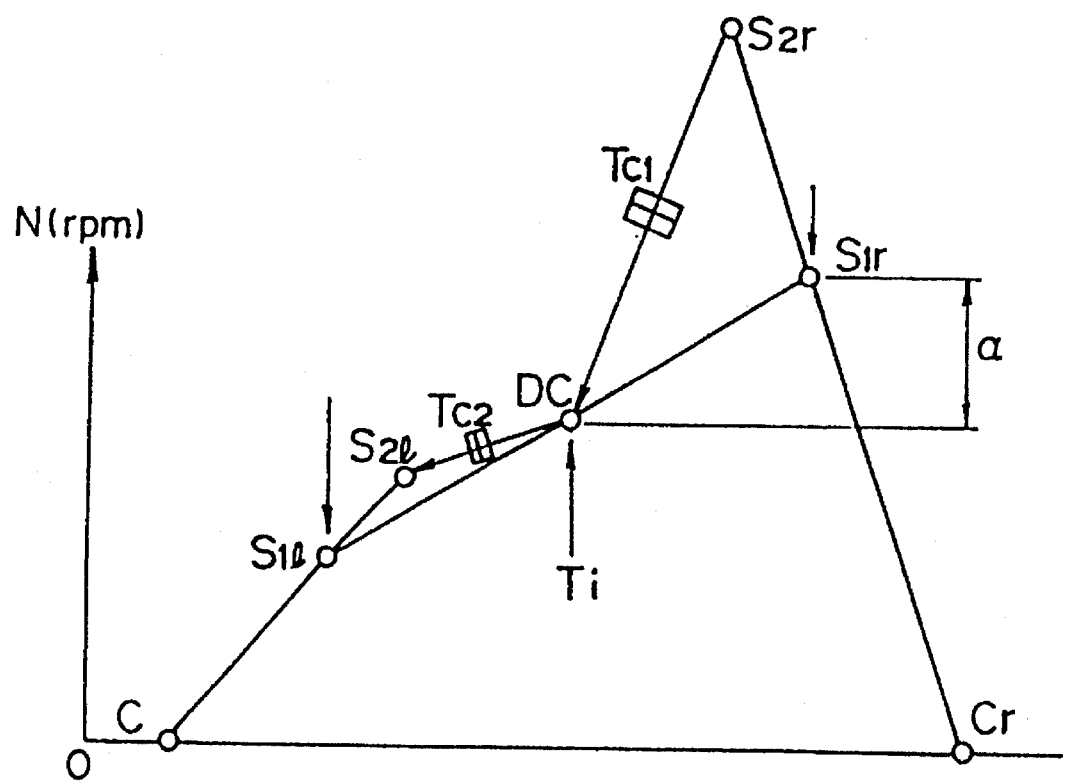
FIG. 31 is a speed diagram showing a problem of a vehicular left/right drive torque adjusting apparatus contemplated in the course of the development of the present invention.

As is illustrated in FIG. 27, the axles 13, 14 for the rear wheels 15, 16 are independent from each other. A speed change mechanism 96 is provided between these axles 13 and 14 and on the side of the left-wheel axle 13, there are provided a hydraulic multi-plate clutch mechanism 97 between the axle 13 and the accelerated output portion of the speed change mechanism 96 and another hydraulic multi-plate clutch mechanism 98 between the axle 13 and the decelerated output portion of the speed change mechanism 96.

The speed change mechanism 96 is composed of the gear 14A provided on the right-wheel axle 14, a shaft (countershaft) 96B disposed in parallel with the axles 13, 14, a gear 96A provided on the countershaft 96B and rotatable in mesh with the gear 14A, a gear 97C provided on the side of the left-wheel axle 13 via the hydraulic multi-plate clutch mechanism 97, a gear 98C provided on the side of the left-wheel axle 13 via the hydraulic multi-plate clutch mechanism 98, a gear 96C provided on the countershaft 96B and rotatable in mesh with the gear 97C, and a gear 96D provided on the countershaft 96B and rotatable in mesh with the gear 98C.

The gear 97C is set smaller in diameter than the gear 14A, the gear 98C is set larger in diameter than the gear 14A, the gear 96C is set larger in diameter than the gear 96A, and the gear 96D is set smaller than the gear 96A.

Accordingly, rotational force is transmitted to the gear 97C through the route of the gear 14A, the gear 96A, the gear 96C and the gear 97C, whereby the gear 97C rotates at a higher speed than the gear 14A. This gear 97C serves as the accelerated output means of the speed change mechanism 96. On the other hand, rotational force is transmitted to the gear 98C through the route of the gear 14A, the gear 96A, the gear 96D and the gear 98C, whereby the gear 98C rotates at a lower speed than the gear 14A. This gear 98C serves as the decelerated output means of the speed change mechanism 96.

When the hydraulic multi-plate clutch mechanism 97 is coupled, the clutch plates 97A on the side of the left-wheel axle 13 therefore rotate at a lower speed than the clutch plates 97B on the side of the accelerated gear 97C so that drive torque is transmitted from the side of the right-wheel axle 14 to the side of the left-wheel axle 13.

When the hydraulic multi-plate clutch mechanism 98 is coupled, conversely, the clutch plates 98A on the side of the left-wheel axle 13 therefore rotate at a higher speed than the clutch plates 98B on the side of the decelerated gear 98C so that drive torque is transmitted from the side of the left-wheel axle 13 to the side of the right-wheel axle 14.

Since the left-wheel axle 13 and the right-wheel axle 14 are also axles for the non-drive wheels in this case, no drive torque is supplied to them from the engine. However, one of the axles 13, 14, said one axle being on the drive side, applies rotational reaction force, which is received from the road surface, to the other axle. In other words, the wheel 15 or 16 connected to the axle 13 or 14, said axle being on the drive side, receives rotational reaction force from the road surface while applying brake force to the road surface. Further, the wheel 16 or 15 connected to the axle 14 or 13, said axle being on the driven side, receives the rotational reaction force and transmits it as drive torque to the road surface.

Further, the control unit 18 is constructed as in the first embodiment (see FIG. 3) so that, when one of the wheels is in a state of slipping, the multi-plate clutch mechanisms 97, 98 which are not the multi-plate clutch mechanism 97, 98 to be coupled fundamentally but are the multi-plate clutch mechanism 97, 98 not to be coupled basically are coupled.

When the wheel is not in a state of slipping, the control unit 18 sets, as in the first embodiment, a torque amount DT desired to be transferred according to target torques for the left and right wheels, respectively, When the left/right wheel speed ratio is not greater than the predetermined value, the above-described states of coupling of the left and right multi-plate clutch mechanisms 97, 98 are controlled in accordance with the torque amount DT desired to be transferred.

When the left/right wheel speed ratio increases beyond the predetermined value during turning of the vehicle, the control unit 18, as in the first embodiment, makes both the multi-plate clutch mechanisms 12, 12 free. When it is possible to achieve transmission of torque in a desired direction by each of the multi-plate clutch mechanisms 97, 98, the control unit 18 controls the coupling of one of the multi-plate clutch mechanisms 97, 98, said one multi-plate clutch mechanism having a smaller difference in speed between its clutch disks 97A and 97B and its clutch disks 98A and 98B, whereby the one multi-plate clutch mechanism is controlled to achieve the transmission of the torque.

Since the vehicular left/right drive torque adjusting apparatus according to the fourteenth embodiment of the present invention is constructed as described above, it can bring about similar advantages to the respective embodiments described above.

Where the left/right wheel speed ratio is greater than the predetermined amount and the above-described formula (2) is satisfied upon setting a control amount for the linear region, it is also possible, as shown in FIG. 9, to design to stop all the controls in the above-described second to fourteenth embodiments. It is also possible to construct the slip judgment unit 18B in such a way that, like the slip judgment unit 18BB shown in FIG. 10, whether at least one of the left and right wheels is in a state of slipping is determined based solely on the wheel speeds Vl, Vr of the left and right wheels.

In each of the embodiments described above, the vehicular left/right drive torque adjusting apparatus is applied to the rear wheels. Needless to say, such a left/right drive torque adjusting apparatus can also be applied to the front wheels. In each of the above-described first to ninth embodiments, especially, the vehicular left/right drive torque distribution adjusting apparatus is applied to the drive system of the rear wheels in the 4WD vehicle. Such a left/right drive torque distribution adjusting apparatus, of course, can also be applied to the drive system of the front wheels in a 4WD vehicle, to the drive system of the rear wheels in a RWD vehicle, or to the drive system of the front wheels in a FWD vehicle. In each of the tenth to thirteenth embodiments described above, the vehicular left/right drive torque distribution adjusting apparatus is applied to the rear wheels, i.e., the non-drive wheels in the FWD vehicle. Needless to say, such a left/right drive torque distribution adjusting apparatus can also be applied to the front wheels, i.e., non-drive wheels in a RWD vehicle.

In each of the embodiments described above, one or two hydraulic multi-plate clutch mechanisms 12 are provided as torque transmission mechanism(s) of the variable transmitted capacity type. No particular limitation is however imposed on such torque transmission mechanism(s) of the variable transmitted capacity type as long as they are torque transmission mechanisms whose torque transmission capacities are variable and controllable. Besides the above-exemplified mechanisms, it is also possible to use other multi-plate clutch mechanisms such as electromagnetic multi-plate clutch mechanisms and, in addition to these multi-plate clutch mechanisms, hydraulic or electromagnetic friction clutches, hydraulically or electromagnetic controllable VCUs (viscous coupling units), hydraulically or electromagnetic controllable HCUs (hydraulic coupling units, i.e., hydraulic couplings of the differential pump type), and other couplings such as electromagnetic fluid or electromagnetic powder clutches.

In the case of friction clutches, those capable

Of adjusting their coupling force by hydraulic pressure or the like, similar to multi-plate clutch mechanisms, can be used. In particular, friction clutches each of which can transmit torque in one direction can be arranged in predetermined directions (namely, with their torque transmitting directions aligned with the predetermined torque transmitting directions).

Further, it may be contemplated of using conventional VCUs or HCUs having fixed power transmission characteristics. Those permitting control of their power transmission characteristics are however suited. Adjustment or control of their coupling force and power transmission characteristics can be conducted using a drive means other than hydraulic pressure, such as electromagnetic force.

What is claimed is:

1. A left/right drive torque adjusting apparatus for a vehicle, the apparatus being arranged between a left-wheel axle and a right-wheel axle in the vehicle to permit transfer of drive torque between the left-wheel and right-wheel axles so that drive torques for left and right wheels of the vehicle can be adjusted, the apparatus comprising:

a speed change mechanism connected to a side of at least one of the left-wheel and right-wheel axles, whereby a rotational speed of said at least one axle is shifted at a predetermined constant shift ratio;

a torque transmission mechanism, of a variable transmitted capacity control type, interposed between a side of at least the other one of the left-wheel and right-wheel axles and a side of an output portion of the speed change mechanism so that, when coupled, drive torque is transferred between the left-wheel and right-wheel axles;

running state detection means for detecting a running state of the vehicle;

control means for controlling an operation state of the torque transmission mechanism, on the basis of information detected by said running state detection means, so that torque of a desired capacity can be transferred between the left-wheel and right-wheel axles;

rotational speed ratio judging means for judging whether or not a rotational speed ratio $\alpha$, of the left wheel to the right wheel obtained based on the detected running state of the vehicle, is greater than a threshold value Smax across which a predetermined high/low relationship between a rotational speed of the output portion of the speed change mechanism and a rotational speed of the other axle changes; and large-difference-rotation-time control means arranged in association with said control means, for, when the rotational speed ratio $\alpha$ of the left wheel to the right wheel is judged to be greater than the threshold value Smax by said rotational speed ratio judging means, cancelling transfer of torque by the torque transmission mechanism to discontinue drive torque transmission control.

2. A left/right drive torque adjusting apparatus of claim 1, wherein the speed change mechanism and the torque transmission mechanism of the variable transmitted capacity control type are disposed in combination on a side of one of the left and right wheels, the apparatus further including an additional speed change mechanism and an additional torque transmission mechanism of the variable transmitted capacity control type, said additional speed change and torque transmission mechanisms being of the same type as the speed change and torque transmission mechanisms, respectively, and being disposed in combination on a side of the other wheel.

3. A left/right drive torque adjusting apparatus of claim 2, wherein said large-difference-rotation-time control means is set so that, even when the rotational speed ratio $\alpha$ of the left wheel to the right wheel is judged to be greater than the threshold value Smax, the drive torque transmission control is not cancelled and is continued without interruption as long as a direction of transfer of the torque of the desired capacity is from a side of one of the left-wheel and right-wheel axles, said one axle rotating at a higher rotational speed than the other axle, to a side of the other axle.

4. A left/right drive torque adjusting apparatus of claim 3, wherein said large-difference-rotation-time control means is set so that, even when the rotational speed ratio $\alpha$ of the left wheel to the right wheel is judged to be greater than the threshold value Smax, the drive torque transmission control is not cancelled and is continued without interruption while operating one of the combined torque transmission mechanisms of the variable transmitted capacity control type, said one torque transmission mechanism being on a side of a smaller difference in rotational speed between the axle of the corresponding wheel and said output portion of the associated speed change mechanism, as long as the direction of transfer of the torque of the desired capacity is from a side of one of the left-wheel and right-wheel axles, said one axle rotating at a higher rotational speed than the other axle, to a side of the other axle.

5. A left/right drive torque adjusting apparatus for a vehicle, the apparatus being arranged between a left-wheel axle and a right-wheel axle in the vehicle to permit transfer of drive torque between the left-wheel and right-wheel axles so that drive torques for left and right wheels of the vehicle can be adjusted, the apparatus comprising:

input means for receiving drive torque from an engine of the vehicle;

a differential mechanism for transmitting the drive torque, which has been received by said input means, to the left-wheel and right-wheel axles while permitting differential motion between the left-wheel and right-wheel axles in the vehicle;

a speed change mechanism connected to a side of at least one of the left-wheel and right-wheel axles, whereby a rotational speed of said at least one axle is shifted at a predetermined constant shift ratio;

a torque transmission mechanism, of a variable transmitted capacity control type, interposed between a side of an output portion of the speed change mechanism and a side of said input means so that, when coupled, drive torque is transferred between the left-wheel and right-wheel axles;

running state detection means for detecting a running state of the vehicle;

control means for controlling an operation state of the torque transmission mechanism, on the basis of information detected by said running state detection means, so that torque of a desired capacity can be transferred between the left-wheel and right-wheel axles;

rotational speed ratio judging means for judging whether or not a rotational speed ratio $\alpha$, of the left wheel to the right wheel obtained based on the detected running state of the vehicle, is greater than a threshold value Smax across which a predetermined high/low relationship between a rotational speed of the output portion of the speed change mechanism and a rotational speed of the other axle changes; and large-difference-rotation-time control means arranged in association with said control means, for, when the rotational speed ratio $\alpha$ of the left wheel to the right wheel is judged to be greater than the threshold value Smax by said rotational speed ratio judging means, cancelling transfer of torque by the torque transmission mechanism to discontinue drive torque transmission control.

6. A left/right drive torque adjusting apparatus of claim 5, wherein the speed change mechanism and the torque transmission mechanism of the variable transmitted capacity control type are disposed in combination on a side of one of the left and right wheels, the apparatus further including an additional speed change mechanism and an additional torque transmission mechanism of the variable transmitted capacity control type, said additional speed change and torque transmission mechanisms being of the same type as the speed change and torque transmission mechanisms, respectively, and being disposed in combination on a side of the other wheel.

7. A left/right drive torque adjusting apparatus of claim 6, wherein said large-difference-rotation-time control means is set so that, even when the rotational speed ratio α of the left wheel to the right wheel is judged to be greater than the threshold value Smax, the drive torque transmission control is not cancelled and is continued without interruption as long as a direction of transfer of the torque of the desired capacity is from a side of one of the left-wheel and right-wheel axles, said one axle rotating at a higher rotational speed than the other axle, to a side of the other axle.

8. A left/right drive torque adjusting apparatus of claim 7, wherein said large-difference-rotation-time control means is set so that, even when the rotational speed ratio α of the left wheel to the right wheel is judged to be greater than the threshold value Smax, the drive torque transmission control is not cancelled and is continued without interruption while operating one of the torque transmission mechanisms of the variable transmitted capacity control type, said one torque transmission mechanism being on a side of a smaller difference in rotational speed between the axle of the corresponding wheel and said output portion of the associated speed change mechanism, as long as the direction of transfer of the torque of the desired capacity is from a side of one of the left-wheel and right-wheel axles, said one axle rotating at a higher rotational speed than the other axle, to a side of the other axle.

9. A left/right drive torque adjusting apparatus for a vehicle, the apparatus being arranged between a left-wheel axle and a right-wheel axle in the vehicle to permit transfer of drive torque between the left-wheel and right-wheel axles so that drive torques for left and right wheels of the vehicle can be adjusted, the apparatus comprising:

input means for receiving drive torque from an engine of the vehicle;

a differential mechanism for transmitting the drive torque, which has been received by said input means, to the left-wheel and right-wheel axles while permitting differential motion between the left-wheel and right-wheel axles in the vehicle;

a speed change mechanism connected to a side of said input means, whereby a rotational speed on the side of said input means is shifted at a predetermined constant shift ratio;

a torque transmission mechanism, of a variable transmitted capacity control type, interposed between a side of at least the other one of the left-wheel and right-wheel axles and a side of an output portion of the speed change mechanism so that, when coupled, drive torque is transferred between the left-wheel and right-wheel axles;

running state detection means for detecting a running state of the vehicle;

control means for controlling an operation state of the torque transmission mechanism, on the basis of information detected by said running state detection means, so that torque of a desired capacity can be transferred between the left-wheel and right-wheel axles;

rotational speed ratio judging means for judging whether or not a rotational speed ratio α, of the left wheel to the right wheel obtained based on the detected running state of the vehicle, is greater than a threshold value Smax across which a predetermined high/low relationship between a rotational speed of said output portion of the speed change mechanism and a rotational speed of the other axle changes; and large-difference-rotation-time control means arranged in association with said control means, for, when the rotational speed ratio α of the left wheel to the right wheel is judged to be greater than the threshold value Smax by said rotational speed ratio judging means, cancelling transfer of torque by the torque transmission mechanism to discontinue drive torque transmission control.

10. A left-right drive torque adjusting apparatus of claim 9, wherein the speed change mechanism and the torque transmission mechanism of the variable transmitted capacity control type are disposed in combination on a side of one of the left and right wheels, the apparatus further including an additional speed change mechanism and an additional torque transmission mechanism of the variable transmitted capacity control type, said additional speed change and torque transmission mechanisms being of the same type as the speed change and torque transmission mechanisms, respectively, and being disposed in combination on a side of the other wheel.

11. A left-right drive torque adjusting apparatus of claim 10, wherein said large-difference-rotation-time control means is set so that, even when the rotational speed ratio α of the left wheel to the right wheel is judged to be greater than the threshold value Smax, the drive torque transmission control is not cancelled and is continued without interruption as long as a direction of transfer of the torque of the desired capacity is from a side of one of the left-wheel and right-wheel axles, said one axle rotating at a higher rotational speed than the other axle, to a side of the other axle.

12. A left/right drive torque adjusting apparatus of claim 11, wherein said large-difference-rotation-time control means is set so that, even when the rotational speed ratio α of the left wheel to the right wheel is judged to be greater than the threshold value Smax, the drive torque transmission control is not cancelled and is continued without interruption while operating one of the combined torque transmission mechanisms of the variable transmitted capacity control type, said one torque transmission mechanism being on a side of a smaller difference in rotational speed between the axle of the corresponding wheel and said output portion of the associated speed change mechanism, as long as the direction of transfer of the torque of the desired capacity is from a side of one of the left-wheel and right-wheel axles, said one axle rotating at a higher rotational speed than the other axle, to a side of the other axle.

13. A left/right drive torque adjusting apparatus for a vehicle, the apparatus being arranged between a left-wheel axle and a right-wheel axle in the vehicle to permit transfer of drive torque between the left-wheel and right-wheel axles so that drive torques for left and right wheels of the vehicle can be adjusted, the apparatus comprising:

a combination of speed change mechanisms connected to the left-wheel and right-wheel axles, respectively, whereby rotational speeds on sides of the left-wheel and right-wheel axles are shifted at a predetermined constant shift ratio;

a combination of torque transmission mechanisms, each of a variable transmitted capacity control type, interposed between sides of the left-wheel and right-wheel axles and sides of an output portion of the speed change mechanisms, respectively, so that, when coupled, drive torque is transferred between the left-wheel and right-wheel axles;

running state detecting means for detecting a running state of the vehicle;

control means for controlling an operation state of the torque transmission mechanisms, on the basis of information detected by said running state detection means, so that torque of a desired capacity can be transferred between the left-wheel and right-wheel axles;

wheel slip judging means for judging a slipping state of the left and right wheels; and setting means for setting amounts of control of the combined torque transmission mechanisms so that, when one of the left and right wheels is judged to be slipping by said wheel slip judging means, one of the torque transmission mechanisms, said one torque transmission mechanism being the one opposite to the one which would be coupled if the direction of transfer of torque were based upon a desired capacity, is coupled.

14. A left/right drive torque adjusting apparatus of claim 13, wherein said wheel slip judging means judges slipping state of the right and left wheels on the basis of a vehicle body speed VB and speeds of the left and right wheels, respectively.

15. A left/right drive torque adjusting apparatus of claim 13, wherein said wheel slip judging means judges slipping state of the left and right wheels on the basis of the state of differential motion in one of the torque transmission mechanisms, said one torque transmission mechanism being on the side that drive torque transmission control is being performed.

16. A left/right drive torque adjusting apparatus for a vehicle, the apparatus being arranged between a left-wheel axle and a right-wheel axle in the vehicle to permit transfer of drive torque between the left-wheel and right-wheel axles so that drive torques for left and right wheels of the vehicle can be adjusted, the apparatus comprising:

input means for receiving drive torque from an engine of the vehicle;

a differential mechanism for transmitting the drive torque, which has been received by said input means, to the left-wheel and right-wheel axles while permitting differential motion between the left-wheel and right-wheel axles in the vehicle;

a combination of speed change mechanisms connected to the left-wheel and right-wheel axles, respectively, whereby rotational speeds on sides of the left-wheel and right-wheel axles are shifted at a predetermined constant shift ratio;

a combination of torque transmission mechanisms, each of a variable transmitted capacity control type, interposed between sides of an output portion of the speed change mechanism and a side of said input means, respectively, so that, when coupled, drive torque is transferred between the left-wheel and right-wheel axles;

running state detection means for detecting a running state of the vehicle;

control means for controlling an operation state of the torque transmission mechanism, on the basis of information detected by said running state detecting means, so that torque of a desired capacity can be transferred between the left-wheel and right-wheel axles;

wheel slip judging means for judging a slipping state of the left and right wheels; and setting means for setting amounts of control of the combined torque transmission mechanisms so that, when one of the left and right wheels is judged to be slipping by said wheel slip judging means, one of the torque transmission mechanisms, said one torque transmission mechanism being the one opposite to the one which would be coupled if the direction of transfer of torque were based upon a desired capacity, is coupled.

17. A left/right drive torque adjusting apparatus of claim 16, wherein said wheel slip judging means judges slipping states of the right and left wheels on the basis of a vehicle body speed and speeds of the left and right wheels, respectively.

18. A left/right drive torque adjusting apparatus of claim 16, wherein said wheel slip judging means judges slipping states of the left and right wheels on the basis of a state of differential motion in one of the torque transmission mechanisms, said one torque transmission mechanism being on the side that drive torque transmission control is being performed.

19. A left-right drive torque adjusting apparatus for a vehicle, the apparatus being arranged between a left-wheel axle and a right-wheel axle in the vehicle to permit transfer of drive torque between the left-wheel and right-wheel axles so that drive torques for left and right wheels of the vehicle can be adjusted, the apparatus comprising:

input means for receiving drive torque from an engine of the vehicle;

a differential mechanism for transmitting the drive torque, which has been received by said input means, to the left-wheel and right-wheel axles while permitting differential motion between the left-wheel and right-wheel axles in the vehicle;

a speed change mechanism connected to a side of said input means, whereby a rotational speed on the side of said input means is shifted at a predetermined constant shift ratio;

a combination of torque transmission mechanisms, each of a variable transmitted capacity control type, interposed between the sides of the left-wheel and right-wheel axles and sides of an output portion of the speed change mechanisms, respectively, so that, when coupled, drive torque is transferred between the left-wheel and right-wheel axles;

running state detection means for detecting a running state of the vehicle;

control means for controlling an operation state of the torque transmission mechanism on the basis of detected information outputted from said running state detection means so that torque of a desired capacity can be transferred between the left-wheel and right-wheel axles;

wheel slip judging means for judging a slipping state of the left and right wheels; and setting means for setting amounts of control of the combined torque transmission mechanisms so that, when one of the left and right wheels is judged to be slipping by said wheel slip judging means, one of the combined torque transmission mechanisms, said one torque transmission mechanism being the one opposite to the one which would be coupled if the direction of transfer of torque were based upon a desired capacity, is coupled.

20. A left/right drive torque adjusting apparatus of claim 19, wherein said wheel slip judging means judges slipping states of the right and left wheels on the basis of a vehicle body speed and speeds of the left and right wheels, respectively.

21. A left/right drive torque adjusting apparatus of claim 19, wherein said wheel slip judging means judges slipping states of the left and right wheels on the basis of a state of differential motion in one of the torque transmission mechanisms, said one torque transmission mechanism being on the side that drive torque transmission control is being performed.

22. A left/right drive torque adjusting method for a vehicle, the vehicle having a speed change mechanism and a torque transmission mechanism of the variable transmitted capacity control type between a left-wheel axle and a right-wheel axle, the speed change mechanism being connected to a side of at least one of the left-wheel and right-wheel axles to shift a rotational speed of the at least one axle at a predetermined constant shift ratio, and the torque transmission mechanism being interposed between a side of at least the other one of the left-wheel and right-wheel axles and a side of an output portion of the speed change mechanism so that, when coupled, drive torque is transferred between the left-wheel and right-wheel axles, the method including controlling a coupling state of the torque transmission mechanism of the variable transmitted capacity control type, thereby transferring drive torque between the left-wheel and right-wheel axles to adjust drive torques for the left and right wheels, the method comprising the steps of:

i) detecting a running state of the vehicle;

ii) judging whether or not a rotational speed ratio α, of the left wheel to the right wheel obtained based on the detected running state of the vehicle, is greater than a threshold value Smax across which a predetermined high/low relationship between a rotational speed on a side of the output portion of the speed change mechanism and a rotational speed of the other axle changes; and iii) controlling an operation state of the torque transmission mechanism of the variable transmitted capacity control type so that, when the rotational speed ratio α of the left wheel to the right wheel is judged not to be greater than the threshold value Smax, the torque transmission mechanism is coupled based on information about the detected running state of the vehicle to transfer torque of a desired capacity between the left-wheel and right-wheel axles, and when the rotational speed ratio α of the left wheel to the right wheel is judged to be greater than the threshold value Smax, the transfer of torque by the torque transmission mechanism is cancelled to discontinue the drive torque transmission control.

23. A left-right drive torque adjusting method of claim 22, wherein the step iii) is set so that, even when the rotational speed ratio α of the left wheel to the right wheel is judged to be greater than the threshold value Smax, the drive torque transmission control is not cancelled and is continued without interruption as long as a direction of transfer of the torque of the desired capacity is from a side of one of the left-wheel and right-wheel axles, the one axle rotating at a higher rotational speed than the other axle, to a side of the other axle.

24. A left-right drive torque adjusting method of claim 23, wherein an additional torque transmission mechanism of the variable transmitted capacity control type of the torque transmission mechanism is provided in combination with the torque transmission mechanism, the coupling states of the torque transmission mechanisms of the variable transmitted capacity control type being controlled, whereby drive torque is transferred between the left-wheel and right-wheel axles to adjust drive torques for the left and right wheels, and the step iii) is set so that, even when the rotational speed ratio α of the left wheel to the right wheel is judged to be greater than the threshold value Smax, the drive torque transmission control is not cancelled and is continued while operating one of the combined torque transmission mechanisms of the variable transmitted capacity control type, the one torque transmission mechanism being on a side of a smaller difference in rotational speed between the axle of the corresponding wheel and the output portion of the associated speed change mechanism, as long as the direction of transfer of the torque of the desired capacity is from a side of one of the left-wheel and right-wheel axles, the one axle rotating at a higher rotational speed than the other axle, to a side of the other axle.

25. A left/right drive torque adjusting method for a vehicle, the vehicle having an input device, a differential mechanism, a speed change mechanism and a torque transmission mechanism of the variable transmitted capacity control type, all between a left-wheel axle and a right-wheel axle, [said] the input device being adapted to receive drive torque from an engine of the vehicle, the differential mechanism being adapted to transmit the drive torque, which has been received through the input device, to the left-wheel and right-wheel axles while permitting differential motion between the left-wheel and right-wheel axles in the vehicle, the speed change mechanism being connected to a side of at least one of the left-wheel and right-wheel axles to shift a rotational speed on a side of the one axle at a predetermined constant shift ratio, and the torque transmission mechanism being interposed between a side of an output portion of the speed change mechanism and a side of the input device so that, when coupled, drive torque is transferred between the left-wheel and right-wheel axles, the method including controlling a coupling state of the torque transmission mechanism of the variable transmitted capacity control type, thereby transferring drive torque between the left-wheel and right-wheel axles to adjust drive torques for the left and right wheels, the method comprising the steps of:

i) detecting a running state of the vehicle;

ii) judging whether or not a rotational speed ratio α, of the left wheel to the right wheel obtained based on the detected running state of the vehicle, is greater than a threshold value Smax across which a predetermined high/low relationship between a rotational speed on a side of the output portion of the speed change mechanism and a rotational speed of the other axle changes; and iii) controlling an operation state of the torque transmission mechanism of the variable transmitted capacity control type so that, when the rotational speed ratio α of the left wheel to the right wheel is judged not to be greater than the threshold value Smax, the torque transmission mechanism is coupled based on information about the detected running state of the vehicle to transfer torque of a desired capacity between the left-wheel and right-wheel axles, and when the rotational speed ratio α of the left wheel to the right wheel is judged to be greater than the threshold value Smax, the transfer of torque by the torque transmission mechanism is cancelled to discontinue the drive torque transmission control.

26. A left-right drive torque adjusting method of claim 25, wherein the step iii) is set so that, even when the rotational speed ratio α of the left wheel to the right wheel is judged to be greater than the threshold value Smax, the drive torque transmission control is not cancelled and is continued without interruption as long as a direction of transfer of the torque of the desired capacity is from a side of one of the left-wheel and right-wheel axles, the one axle rotating at a higher rotational speed than the other axle, to a side of the other axle.

27. A left-right drive torque adjusting method of claim 26, wherein an additional torque transmission mechanism of the variable transmitted capacity control type of the torque transmission mechanism is provided in combination with the torque transmission mechanism, the coupling states of the torque transmission mechanisms of the variable transmitted capacity control type are controlled, whereby drive torque is transferred between the left-wheel and right-wheel axles to adjust drive torques for the left and right wheels, and the step iii) is set so that, even when the rotational speed ratio α of the left wheel to the right wheel is judged to be greater than the threshold value Smax, the drive torque transmission control is not cancelled and is continued while operating one of the combined torque transmission mechanism of the variable transmitted capacity control type, the one torque transmission mechanism being on a side of a smaller difference in rotational speed between the axle of the corresponding wheel and the output portion of the associated speed change mechanism, as long as the direction of transfer of the torque of the desired capacity is from a side of one of the left-wheel and right-wheel axles, the one axle rotating at a higher rotational speed than the other axle, to a side of the other axle.

28. A left/right drive torque adjusting method for a vehicle, the vehicle having an input device, a differential mechanism, a speed change mechanism and a torque transmission mechanism of the variable transmitted capacity control type, all between a left-wheel axle and a right-wheel axle, the input device being adapted to receive drive torque from an engine of the vehicle, the differential mechanism being adapted to transmit the drive torque, which has been inputted through the input device, to the left-wheel and right-wheel axles while permitting differential motion between the left-wheel and right-wheel axles in the vehicle, the speed change mechanism being connected to a side of the input device to shift a rotational speed on the side of the input device at a predetermined constant shift ratio, and the torque transmission mechanism being interposed between a side of at least one of the left-wheel and right-wheel axles and a side of an output portion of the speed change mechanism so that, when coupled, drive torque is transferred between the left-wheel and right-wheel axles, the method including controlling a coupling state of the torque transmission mechanism of the variable transmitted capacity control type, thereby transferring drive torque between the left-wheel and right-wheel axles to adjust drive torques for the left and right wheels, the method comprising the steps of:

i) detecting a running state of the vehicle;

ii) judging whether or not a rotational speed ratio α, of the left wheel to the right wheel obtained based on the detected running state of the vehicle, is greater than a threshold value Smax across which a predetermined high/low relationship between a rotational speed on a side of the output portion of the speed change mechanism and a rotational speed of the other axles changes; and iii) controlling an operation state of the torque transmission mechanism of the variable transmitted capacity control type so that, when the rotational speed ratio α of the left wheel to the right wheel is judged not to be greater than the threshold value Smax, the torque transmission mechanism is coupled based on information about the detected running state of the vehicle to transfer torque of a desired capacity between the left-wheel and right-wheel axles, and when the rotational speed ratio α of the left wheel to the right wheel is judged to be greater than the threshold value Smax, the transfer of torque by the torque transmission mechanism is cancelled to discontinue the drive torque transmission control.

29. A left-right drive torque adjusting method of claim 28, wherein the step iii) is set so that, even when the rotation speed ratio α of the left wheel to the right wheel is judged to be greater than the threshold value Smax, the drive torque transmission control is not cancelled and is continued without interruption as long as a direction of transfer of the torque of the desired capacity is from a side of one of the left-wheel and right-wheel axles, the one axle rotating at a higher rotational speed than the other axle, to a side of the other axle.

30. A left-right drive torque adjusting method of claim 29, wherein an additional torque transmission mechanism of the variable transmitted capacity control type of the torque transmission mechanism is provided in combination with the torque transmission mechanism, the coupling states of the torque transmission mechanisms of the variable transmitted capacity control type are controlled, whereby drive torque is transferred between the left-wheel and right-wheel axles to adjust drive torques for the left and right wheels, and the step iii) is set so that, even when the rotational speed ratio α of the left wheel to the right wheel is judged to be greater than the threshold value Smax, the drive torque transmission control is not cancelled and is continued while operating one of the combined torque transmission mechanisms of the variable transmitted capacity control type, the one torque transmission mechanism being on a side of a smaller difference in rotational speed between the axle of the corresponding wheel and the output portion of the associated speed change mechanism, as long as the direction of transfer of the torque of the desired capacity is from a side of one of the lefty-wheel and right-wheel axles, the one axle rotating at a higher rotational speed than the other axle, to a side of the other axle.

31. A left/right drive torque adjusting method for a vehicle, the vehicle having a combination of speed change mechanisms and a combination of torque transmission mechanisms of the variable transmitted capacity control type between a left-wheel axle and a right-wheel axle in the vehicle, the speed change mechanisms being connected to the left-wheel and right-wheel axles to shift rotational speeds on the sides of the axles at a predetermined constant shift ratio, and the torque transmission mechanisms being interposed between the sides of the left-wheel and right-wheel axles and a side of an output portion of the speed change mechanisms so that, when coupled, drive torque is transferred between the left-wheel and right-wheel axles, the method including controlling coupling states of the torque transmission mechanisms of the variable transmitted capacity control type, thereby transferring drive torque between the left-wheel and right-wheel axles to adjust drive torques for the left and right wheels, the method comprising the steps of:

i) judging slipping states of the left and right wheels;

ii) setting amounts of control of the torque transmission mechanisms so that, when one of the left and right wheels is judged to be slipping in step i), one of the combined torque transmission mechanisms, the one torque transmission mechanism being the one opposite to the one which would be coupled if the direction of transfer of torque were based upon a desired capacity, is coupled; and iii) controlling operation of the torque transmission mechanisms of the variable transmitted capacity control type on the basis of the amounts of control set in step ii).

32. A left/right drive torque adjusting method of claim 31, wherein step i) includes the substep of, judging slipping states of the right and left wheels on the basis of a vehicle body speed of the vehicle and speeds of the left and right wheels, respectively.

33. A left/right drive torque adjusting method of claim 32, wherein step i) includes the substeps of, calculating an average of the speeds of the left and right wheels, calculating a slip rate for the wheels from a ratio of the calculated average to the vehicle body speed, judging whether or not the calculated slip rate is within a non-linear region for the drive torque and, when the calculated slip rate is judged as being within the non-linear region for the drive torque, then judging that at least one of the left and right wheels is in a slipping state.

34. A left/right drive torque adjusting method of claim 31, wherein step i) includes the substep of, judging a slipping state of at least one of the left and right wheels on the basis of a state of differential motion in one of the torque transmission mechanisms of the variable transmitted capacity control type, the one torque transmission mechanism being on the side that drive torque transmission control is being performed.

35. A left/right drive torque adjusting method for a vehicle, the vehicle having an input device, a differential mechanism, a combination of speed change mechanisms and a combination of torque transmission mechanisms of the variable transmitted capacity control type, all between a left-wheel axle and a right-wheel axle in the vehicle, the input device being adapted to receive drive torque from an engine of the vehicle, the differential mechanism being adapted to transmit the drive torque, which has been received through the input device, to the left-wheel and right-wheel axles while permitting differential motion between the left-wheel and right-wheel axles in the vehicle, the speed change mechanisms being connected to the left-wheel and right-wheel axles, respectively, to shift rotational speeds on sides of the axles at a predetermined constant shift ratio, and the torque transmission mechanisms being interposed between sides of an output portion of the respective speed change mechanisms and a side of the input device so that, when coupled, drive torque is transferred between the left-wheel and right-wheel axles, the method including controlling coupling states of the torque transmission mechanisms of the variable transmitted capacity control type, thereby transferring drive torque between the left-wheel and right-wheel axles to adjust drive torques for the left and right wheels, the method comprising the steps of:

i) judging slipping states of the left and right wheels;

ii) setting amounts of control of the torque transmission mechanisms so that, when one of the left and right wheels is judged to be slipping in step i), one of the combined torque transmission mechanisms, the one torque transmission mechanism being the one opposite to the one which would be coupled if the direction of transfer of torque were based upon a desired capacity, is coupled; and iii) controlling operation of the torque transmission mechanisms of the variable transmitted capacity control type on the basis of the amounts of control set in step ii).

36. A left/right drive torque adjusting method of claim 35, wherein step i) includes the substep of, judging the slipping states of the right and left wheels on the basis of a vehicle body speed of the vehicle and speeds of the left and right wheels, respectively.

37. A left/right drive torque adjusting method of claim 36, wherein step i) includes the substeps of, calculating an average of the speeds of the left and right wheels, calculating a slip rate for the wheels from a ratio of the calculated average to the vehicle body speed, judging whether or not the calculated slip rate is within a non-linear region for the drive torque and, when the calculated slip rate is judged as being within the non-linear region for the drive torque, then judging that at least one of the left and right wheels is in a slipping state.

38. A left/right drive torque adjusting method of claim 35, wherein step i) includes the substep of, judging a slipping state of at least one of the left and right wheels on the basis of a state of differential motion in one of the torque transmission mechanisms of the variable transmitted capacity control type, the one torque transmission mechanism being on the side that drive torque transmission control is being performed.

39. A left/right drive torque adjusting method for a vehicle, said vehicle having an input device, a differential mechanism, a combination of speed change mechanisms and a combination of torque transmission mechanisms of the variable transmitted capacity control type, all between a left-wheel axle and a right-wheel axle in the vehicle, the input device being adapted to receive drive torque from an engine, the differential mechanism being adapted to transmit the drive torque, which has been received through the input device, to the left-wheel and right-wheel axles while permitting differential motion between the left-wheel and right-wheel axles in the vehicle, the speed change mechanisms being connected to a side of the input device to shift a rotational speed on the side of the input device at a predetermined constant shift ratio, and the torque transmission mechanisms being interposed between sides of the axles and the speed change mechanisms, respectively, so that, when coupled, drive torque is transferred between the left-wheel and right-wheel axles, the method including controlling coupling states of the torque transmission mechanisms of the variable transmitted capacity control type, thereby transferring drive torque between the left-wheel and right-wheel axles to adjust drive torques for the left and right wheels, the method comprising the steps of:

i) judging slipping states of the left and right wheels;

ii) setting amounts of control of the torque transmission mechanisms so that, when one of the left and right wheels is judged to be slipping in the i), one of the combined torque transmission mechanisms, the one torque transmission mechanism being the one opposite to the one which would be coupled if the direction for transfer of torque were based upon a desired capacity, is coupled; and iii) controlling operation of the torque transmission mechanisms of the variable transmitted capacity control type on the basis of the amounts of control set in step ii).

40. A left/right drive torque adjusting method of claim 39, wherein step i) includes the substep of, judging the slipping states of the right and left wheels on the basis of a vehicle body speed of the vehicle and speeds of the left and right wheels, respectively.

41. A left/right drive torque adjusting method of claim 40, wherein step i) includes the substeps of, calculating an average of the speeds of the left and right wheels, calculating a slip rate for the wheels from a ratio of the calculated average to the vehicle body speed, judging whether or not the calculated slip rate is within a non-linear region for the drive torque and, when the average slip rate is judged as being within the non-linear region for the drive torque, then judging that at least one of the left and right wheels is in a slipping state.

42. A left/right drive torque adjusting method of claim 39, wherein step i) includes the substep of, judging a slipping state of at least one of the left and right wheels on the basis of a state of differential motion in at least one of the torque transmission mechanisms of the variable transmitted capacity control type, the one torque transmission mechanism being on the side that drive torque transmission control is being performed.

* * * * *